United States Patent
Kuribayashi et al.

(10) Patent No.: US 10,122,023 B2
(45) Date of Patent: Nov. 6, 2018

(54) FUEL CELL WITH SEPARATOR, METHOD FOR MANUFACTURING SAME, AND FUEL CELL STACK

(71) Applicant: NGK SPARK PLUG CO., LTD., Aichi (JP)

(72) Inventors: Makoto Kuribayashi, Aichi (JP); Etsuya Ikeda, Aichi (JP); Wataru Matsutani, Nagoya (JP); Yosuke Yatsuya, Aichi (JP); Masaaki Murase, Aichi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 682 days.

(21) Appl. No.: 14/423,610

(22) PCT Filed: Aug. 26, 2013

(86) PCT No.: PCT/JP2013/072743
§ 371 (c)(1),
(2) Date: Feb. 24, 2015

(87) PCT Pub. No.: WO2014/034608
PCT Pub. Date: Mar. 6, 2014

(65) Prior Publication Data
US 2015/0318563 A1    Nov. 5, 2015

(30) Foreign Application Priority Data

Aug. 31, 2012  (JP) .................................. 2012-192303
Aug. 31, 2012  (JP) .................................. 2012-192304
(Continued)

(51) Int. Cl.
*H01M 8/02*  (2016.01)
*H01M 8/0206*  (2016.01)
(Continued)

(52) U.S. Cl.
CPC ....... *H01M 8/0206* (2013.01); *H01M 8/0247* (2013.01); *H01M 8/0273* (2013.01);
(Continued)

(58) Field of Classification Search
CPC ............. H01M 8/0206; H01M 8/1246; H01M 8/1004; H01M 8/0282; H01M 8/0273;
(Continued)

(56) References Cited

U.S. PATENT DOCUMENTS 7,855,030 B2    12/2010  DeRose et al.
9,252,435 B2 *  2/2016   Kakinuma .......... H01M 8/1213
(Continued)

FOREIGN PATENT DOCUMENTS

EP    2 246 925       11/2010
JP    2000-331692     11/2000
(Continued)

OTHER PUBLICATIONS

Jeffrey W. Fergus. "Sealants for solid oxide fuel cells" Journal of Power Sources 147 (2005) 46-57, available Jun. 2005.*
(Continued)

*Primary Examiner* — Michael L Dignan
(74) *Attorney, Agent, or Firm* — Greenblum & Bernstein, P.L.C.

(57) ABSTRACT

A fuel cell with separator includes a fuel cell body having a cathode, an anode, and a solid electrolyte layer disposed between the cathode and the anode; a plate-like metal separator having first and second main surfaces and an opening which opens at the first and second main surfaces; a joint formed of an Ag-containing brazing filler metal and adapted to join the fuel cell body and the first main surface of the metal separator; and a seal formed of a glass-containing sealing material and disposed closer to the opening than is the joint, the seal being located between the first
(Continued)

main surface and the fuel cell body and extending along the entire perimeter of the opening.

31 Claims, 33 Drawing Sheets

(30) Foreign Application Priority Data

| Aug. 31, 2012 | (JP) | 2012-192305 |
|---|---|---|
| Aug. 31, 2012 | (JP) | 2012-192306 |
| Aug. 31, 2012 | (JP) | 2012-192307 |

(51) Int. Cl.
| H01M 8/1246 | (2016.01) |
|---|---|
| H01M 8/1004 | (2016.01) |
| H01M 8/0247 | (2016.01) |
| H01M 8/0282 | (2016.01) |
| H01M 8/0273 | (2016.01) |
| H01M 8/124 | (2016.01) |

(52) U.S. Cl.
CPC ....... *H01M 8/0282* (2013.01); *H01M 8/1004* (2013.01); *H01M 8/1246* (2013.01); *H01M 2008/1293* (2013.01); *H01M 2300/0074* (2013.01); *Y02P 70/56* (2015.11)

(58) Field of Classification Search
CPC ....... H01M 8/0247; H01M 2300/0074; H01M 2008/1293; Y02P 70/56
See application file for complete search history.

(56) References Cited

U.S. PATENT DOCUMENTS

| 2006/0147782 | A1* | 7/2006 | Reisdorf | B23K 1/0008 |
| | | | | 429/468 |
| 2007/0065707 | A1* | 3/2007 | Zerfass | H01M 8/028 |
| | | | | 429/469 |
| 2008/0217382 | A1* | 9/2008 | Kim | B23K 35/22 |
| | | | | 228/177 |
| 2008/0268323 | A1* | 10/2008 | Tucker | C04B 35/016 |
| | | | | 429/402 |
| 2009/0016953 | A1* | 1/2009 | Weil | B23K 35/0244 |
| | | | | 423/593.1 |
| 2009/0214923 | A1 | 8/2009 | Takahashi et al. | |
| 2009/0311570 | A1* | 12/2009 | Chou | H01M 8/0271 |
| | | | | 429/469 |
| 2010/0143760 | A1* | 6/2010 | DeRose | H01M 8/0271 |
| | | | | 429/495 |
| 2011/0003228 | A1 | 1/2011 | Zerfass et al. | |
| 2011/0165494 | A1* | 7/2011 | Yamanis | H01M 8/0276 |
| | | | | 429/468 |
| 2011/0171554 | A1* | 7/2011 | Hayashi | H01M 8/12 |
| | | | | 429/456 |
| 2011/0209618 | A1 | 9/2011 | Takahashi et al. | |
| 2014/0227623 | A1* | 8/2014 | Kakinuma | H01M 8/1213 |
| | | | | 429/465 |

FOREIGN PATENT DOCUMENTS

| JP | 3466960 | | 11/2003 | |
| JP | 2004-319286 | | 11/2004 | |
| JP | 2006-236600 | * | 9/2006 | ............. H01M 8/04 |
| JP | 2007-331026 | | 12/2007 | |
| JP | 2009-9802 | | 1/2009 | |
| JP | 2009-199970 | | 9/2009 | |
| JP | 2010-021038 | | 1/2010 | |
| JP | 2010-207863 | | 9/2010 | |
| JP | 2011-522353 | | 7/2011 | |

OTHER PUBLICATIONS

Kim et al. "Mechanical properties and dual atmosphere tolerance of Ag—Al based braze." International Journal of Hydrogen Energy 33 (2008) 3952-3961, available Mar. 2008.*
Machine English translation of JP 2006-236600.*
International Search Report issued in .PCT/JP2013/072743 dated Nov. 26, 2013.
Extended European Search Report issued in Patent Application No. 13892876.0, dated Mar. 18, 2016.

* cited by examiner

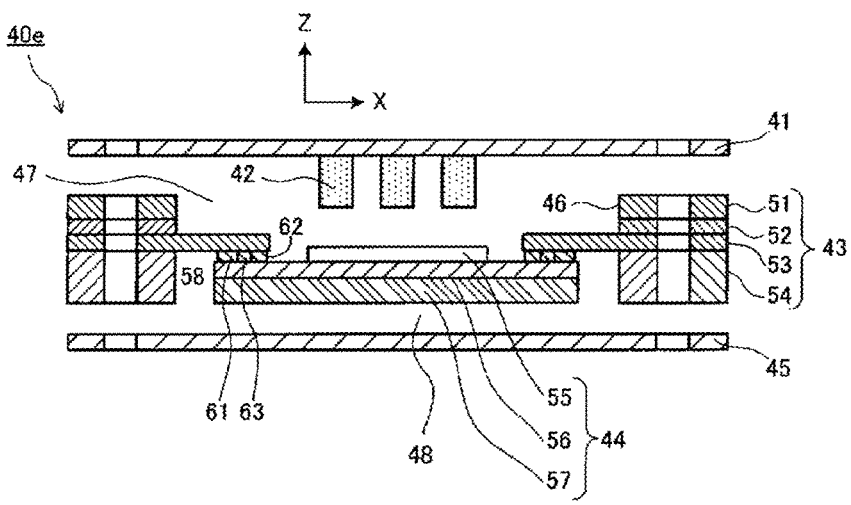
FIG. 21
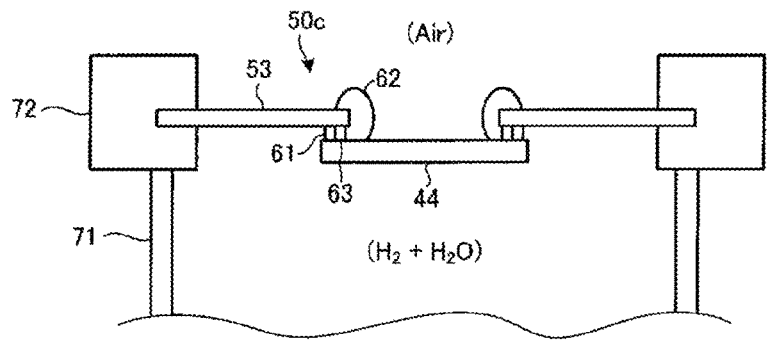
FIG. 22
| Provision of sealing part | Composition of separator | Leakage (before heating test in hydrogen/air) | Leakage (after heating test in hydrogen/air) |
|---|---|---|---|
| YES | Fe-22Cr-0.5Al | OK | OK |
| YES | Fe-22Cr-1Al | OK | OK |
| YES | Fe-18Cr-3Al | OK | OK |
| YES | Fe-20Cr-5Al | OK | OK |
| YES | Fe-10Cr-10Al | OK | OK |
| YES | Fe-10Cr-13Al | NG | - |
| YES | Fe-18Cr-3Al | OK | OK |
| YES | Fe-18Cr-3Al | OK | OK |
| NO | Fe-18Cr-3Al | OK | NG |
| NO | Fe-18Cr-3Al | OK | NG |
FIG. 23

| Provision of sealing part | Composition of separator | Leakage (before heating test in hydrogen/air) | Leakage (after heating test in hydrogen/air) |
|---|---|---|---|
| YES | Fe-22Cr-0.5Al | OK | NG |
| YES | Fe-22Cr-1Al | OK | OK |
| YES | Fe-18Cr-3Al | OK | OK |
| YES | Fe-20Cr-5Al | OK | OK |
| YES | Fe-10Cr-10Al | OK | OK |
| YES | Fe-10Cr-13Al | NG | - |
| YES | Fe-18Cr-3Al | OK | OK |
| YES | Fe-18Cr-3Al | OK | OK |
| NO | Fe-18Cr-3Al | OK | NG |
| NO | Fe-18Cr-3Al | OK | NG |

FIG. 24

| Thermal expansion coefficient (ppm/K) | Width of mixed layer (μm) | Leakage (after heat cycle test) | Cracking of glass | Leakage (after heating test in hydrogen/air) |
|---|---|---|---|---|
| 5 | 50 | OK | YES | NG |
| 7 | 10 | OK | YES | NG |
| 7 | 50 | OK | YES | NG |
| 7 | 150 | OK | YES | NG |
| 8 | 10 | OK | YES | NG |
| 8 | 50 | OK | NO | OK |
| 8 | 150 | OK | NO | OK |
| 12 | 10 | OK | YES | NG |
| 12 | 50 | OK | NO | OK |
| 12 | 150 | OK | NO | OK |
| 15 | 10 | OK | YES | NG |
| 15 | 50 | OK | YES | NG |
| 15 | 150 | OK | YES | NG |

FIG. 25

| Separator | Ag brazing filler metal | | Glass | Separator | | Ag brazing filler metal | | Glass | | Remarks |
|---|---|---|---|---|---|---|---|---|---|---|
| Amount of addition (wt%) | Additive | Amount of addition (vol%) | Amount of Al$_2$O$_3$ (wt%) | Oxidation resistance | Deformability | Repellence | Strength | Repellence | Cracking | |
| 22Cr-0.5Al | Al2O3 | 7.5 | 5 | NG | OK | YES (S) | NG | YES (S) | NO | Comp. example |
| 22Cr-1Al | Al2O3 | 7.5 | 5 | OK | OK | NO | NG | NO | NO | Comp. example |
| 22Cr-1.5Al | Al2O3 | 7.5 | 5 | OK | OK | NO | OK | NO | NO | Example |
| 18Cr-3Al | Al2O3 | 28 | 5 | OK | OK | NO | NG | NO | NO | Comp. example |
| 18Cr-3Al | Al2O3 | 25 | 5 | OK | OK | NO | OK | NO | NO | Example |
| 18Cr-3Al | Al2O3 | 15 | 5 | OK | OK | NO | OK | NO | NO | Example |
| 18Cr-3Al | Al2O3 | 7.5 | 5 | OK | OK | NO | OK | NO | NO | Example |
| 18Cr-3Al | Al2O3 | 5 | 5 | OK | OK | NO | OK | NO | NO | Example |
| 18Cr-3Al | Al2O3 | 2 | 5 | OK | OK | NO | OK | NO | NO | Example |
| 18Cr-3Al | Al2O3 | 1 | 5 | OK | OK | NO | OK | NO | NO | Example |
| 18Cr-3Al | Al2O3 | 0.5 | 5 | OK | OK | YES (S,G) | NG | YES (A) | NO | Comp. example |
| 18Cr-3Al | Al2O3 | 7.5 | 0.5 | OK | OK | YES (G) | OK | YES (S,A) | NO | Comp. example |
| 18Cr-3Al | Al2O3 | 7.5 | 1 | OK | OK | NO | OK | NO | NO | Example |
| 18Cr-3Al | Al2O3 | 7.5 | 2 | OK | OK | NO | OK | NO | NO | Example |
| 18Cr-3Al | Al2O3 | 7.5 | 10 | OK | OK | NO | OK | NO | NO | Example |
| 18Cr-3Al | Al2O3 | 7.5 | 20 | OK | OK | NO | OK | NO | NO | Example |
| 18Cr-3Al | Al2O3 | 7.5 | 30 | OK | OK | NO | OK | NO | NO | Example |
| 18Cr-3Al | Al2O3 | 7.5 | 35 | OK | OK | NO | OK | NO | YES | Comp. example |
| 20Cr-5Al | Al2O3 | 7.5 | 5 | OK | OK | NO | OK | NO | NO | Example |
| 10Cr-10Al | Al2O3 | 7.5 | 5 | OK | OK | NO | OK | NO | NO | Example |
| 10Cr-13Al | Al2O3 | 7.5 | 5 | OK | NG | NO | OK | NO | NO | Comp. example |
| 18Cr-3Al | MgAl2O4 | 7.5 | 5 | OK | OK | NO | OK | NO | NO | Example |
| 18Cr-3Al | MgAl2O4 | 7.5 | 5 | OK | OK | NO | OK | NO | NO | Example |
| 18Cr-3Al | Al2TiO5 | 7.5 | 5 | OK | OK | NO | OK | NO | NO | Example |

FIG. 37

FUEL CELL WITH SEPARATOR, METHOD FOR MANUFACTURING SAME, AND FUEL CELL STACK

TECHNICAL FIELD

The present invention relates to a fuel cell with separator, a method for manufacturing the same, and a fuel cell stack.

BACKGROUND ART

Known fuel cell stacks include a solid oxide fuel cell (hereinafter, may be referred to as "SOFC" or merely as "fuel cell") stack which uses a solid oxide as an electrolyte. The SOFC stack is, for example, a stack of a number of fuel cells, each having an anode and a cathode provided on respective opposite sides of a plate-like solid electrolyte layer. Fuel gas (e.g., hydrogen) and oxidizer gas (e.g., oxygen in air) are supplied to the anode and the cathode, respectively, for their chemical reaction through the solid electrolyte layer, thereby generating electricity.

Generally, the fuel cell is connected, for use, to a separator which separates a fuel gas section and an oxidizer gas section. This connection is usually established through a joint formed of a brazing filler metal such as Ag brazing filler metal, whereby fuel gas and oxidizer gas are separated from each other.

The following technique is disclosed for joining the fuel cell and the separator. The disclosed technique uses a glass sealing material for providing a seal between the separator and the fuel cell (refer to Patent Document 1).

According to another disclosed technique, a refractory metal and ceramic are brazed together in the atmosphere by use of Ag brazing filler metal to which a nonreducing oxide such as $Al_2O_3$ is added (refer to Patent Document 2). A further technique discloses a glass material which contains $Al_2O_3$, for use with the SOFC (refer to Patent Document 3).

Meanwhile, in some cases, sufficient reliability is not necessarily secured in joining the fuel cell and the separator by use of glass or a certain brazing filler metal. For example, in joining by use of Ag brazing filler metal only, for a structural reason, an Ag brazing filler metal joint is disposed at the boundary between oxidizer gas and fuel gas. Thus, the following possibility exists: in use over a long period of time, component atoms (oxygen atoms) of oxidizer gas and component atoms (hydrogen atoms) of fuel gas enter the Ag brazing filler metal joint from the oxidizer gas section and the fuel gas section, respectively, and diffuse and react in the Ag brazing filler metal joint, whereby voids (pores) are generated in the Ag brazing filler metal joint, resulting in leakage of the gases.

Techniques for preventing the generation of voids are disclosed (refer to Patent Documents 4 and 5). Through use of various Ag alloys having low gas diffusion speed, the life of a brazing filler metal can be prolonged.

However, although the techniques disclosed in Patent Documents 4 and 5 can prolong the life of the joint (fuel cell), it is not easy for them to ensure a practically sufficient life of tens of thousands of hours.

PRIOR ART DOCUMENTS

Patent Documents

Patent Document 1: Japanese Patent No. 3466960
Patent Document 2: Japanese Patent Application Laid-Open (kokai) No. 2007-331026
Patent Document 3: Japanese Patent Application Laid-Open (kokai) No. 2009-199970
Patent Document 4: Japanese Patent Application Laid-Open (kokai) No. 2010-207863
Patent Document 5: Japanese Kohyo (PCT) Patent Publication No. 2011-522353

SUMMARY OF THE INVENTION

Problem to be Solved by the Invention

An object of the present invention is to provide a fuel cell with separator having improved reliability or life of the joining of the fuel cell and the separator, a method for manufacturing the same, and a fuel cell stack.

Means for Solving the Problem

A. Fuel Cell with Separator
1. (1) A fuel cell with separator according to a first mode of the present invention comprises
    a fuel cell body having a cathode disposed on one side of a solid electrolyte layer and an anode disposed on the opposite side of the solid electrolyte layer;
    a frame-like metal separator having an opening and attached to the fuel cell body through a joint part formed of an Ag-containing brazing filler metal; and
    a sealing part formed of a glass-containing sealing material and disposed closer to the opening than is the brazing filler metal such that the sealing part is located between the metal separator and the fuel cell body.

Since the metal separator is joined to the fuel cell body by means of the joint part formed of the Ag-containing brazing filler metal, at the time of reception of external stress, deformation of the seal formed of the glass-containing sealing material is prevented, whereby the possibility of occurrence of cracking of the sealing part can be reduced.

Also, since the sealing part is disposed closer to the opening than is the joint part, the joint part is not in direct contact with oxidizer gas; thus, movement of oxidizer gas to the joint part is hindered. As a result, diffusion of oxidizer gas in the joint part is restrained, whereby generation of voids through reaction of hydrogen and oxygen can be prevented.

Furthermore, since the sealing part is disposed between the plate-like metal separator and the fuel cell body, thermal stress acting on the sealing material becomes shear stress. Thus, the sealing material becomes unlikely to crack, and separation at the interface between the sealing part and the metal separator or the fuel cell body can be restrained, whereby the reliability of the sealing part can be improved.
(2) The joint part may comprise a first joint portion and a second joint portion located closer to the opening than is the first joint portion, and the second joint portion may be lower in oxygen diffusion coefficient than the first joint portion.

The second joint portion lower in oxygen diffusion coefficient than the first joint portion is disposed between the sealing part and the first joint portion. As a result, diffusion of oxygen to the first joint portion is restrained, whereby generation of voids in the first joint portion can be prevented, whereby the reliability of the joint as a whole can be improved.
(3) Preferably, the metal separator contains Al in an amount of 0.1% by mass to 10% by mass.

In the case where the metal separator is formed of a metal material which forms a chromia (chromium oxide) coating film (e.g., stainless steel), the reliability of the sealing part deteriorates, since glass in the sealing material is apt to react with chromia. In the case where the metal separator contains Al in an amount of 0.1% by mass or more, an alumina coating film is formed on its surface, whereby the reliability of the sealing part and the oxidation resistant durability of the metal separator are improved. By contrast, in the case where the metal separator contains Al in an amount of more than 10% by mass, the material of the metal separator becomes hard and thus difficulty is encountered in machining.

More preferably, the metal separator contains Al in an amount of 1.5% by mass to 10% by mass. Far more preferably, the metal separator contains Al in an amount of 2.0% by mass to 10% by mass.

(4) Preferably, the metal separator has a thickness of 0.5 mm or less.

If the metal separator is thicker than 0.5 mm, the following problem may arise: in forming a fuel cell stack by stacking a plurality of fuel cell bodies, stress applied to the fuel cell bodies is not relaxed, resulting in occurrence of cracking of (damage to) the sealing parts and the joint parts for joining the fuel cell bodies and the corresponding metal separators. If the metal separator has a thickness of 0.5 mm or less, stress applied to the joint part and the sealing part is relaxed, thereby reducing the possibility of occurrence of cracking of the joint part and the sealing part.

(5) A gap may exist between the joint part and the sealing part.

Even though the joint part and the seal part are not in contact with each other, the possibility of occurrence of cracking of the sealing part can be reduced, and the diffusion of oxidizer gas in the joint part can be prevented. Also, even when gas exists in the gap, the amount of the gas is small, so that the gas has only a small effect on the reliability of the joint part and other characteristics.

(6) The brazing filler metal used to form the joint part may be higher in melting temperature than the sealing material.

Even though the brazing filler metal is higher in melting temperature than the sealing material, the fuel cell body and the metal separator can be joined, and a sealing between the fuel cell body and the metal separator is possible. For example, sealing may be performed by use of a sealing material after joining is performed by use of a brazing filler metal. Also, if no large difference in melting temperature exists between the brazing filler metal and the sealing material, joining and sealing can be performed simultaneously.

2. (1) A fuel cell with separator according to a second mode of the present invention comprises a fuel cell body having a cathode, an anode, and a solid electrolyte layer sandwiched between the cathode and the anode;

a frame-like metal separator having an opening and attached to the fuel cell body through a joint part formed of an Ag-containing brazing filler metal;

a sealing part formed of a glass-containing sealing material and disposed closer to the opening than is the joint part such that the sealing part is located between the metal separator and the fuel cell body.

In the fuel cell with separator, a portion of the sealing part located toward the joint part has an Ag-containing mixed layer.

Since the fuel cell with separator has the sealing part formed of a glass-containing sealing material and disposed toward the opening between the metal separator and the fuel cell body, movement of oxidizer gas to the joint part is hindered. As a result, diffusion of oxidizer gas in the joint part is restrained, whereby generation of voids through reaction of hydrogen and oxygen can be prevented.

Also, since a portion of the sealing part located toward the joint part has the Ag-containing mixed layer, the difference in thermal expansion between the sealing part and the joint part is relaxed, whereby the occurrence of damage to (e.g., cracking of) the sealing part can be prevented.

Generally, in many cases, the joint part (Ag-containing brazing filler metal) is flexible, but is high in thermal expansion coefficient. As a result, there is generated thermal stress between the joint part and the sealing part (glass-containing sealing material) being caused by the difference in thermal expansion between the joint part and the sealing part, potentially resulting in the occurrence of damage to (e.g., cracking of) the sealing part. Thus, a portion of the sealing part located toward the joint part is consisted of an Ag-containing mixed layer (i.e., a layer having an intermediate composition which contains both glass and Ag) for mitigating thermal stress at the interface between the joint part and the sealing part, thereby preventing the occurrence of damage to (e.g., cracking of) the sealing part.

(2) Preferably, in the mixed layer, Ag content is highest at a portion located toward the joint part.

No precipitous change in Ag content arises at the interface between the joint (Ag-containing brazing filler metal) and the mixed layer, thereby mitigating thermal stress at the interface.

(3) Preferably, the joint part and the mixed layer are disposed along the entire perimeter of the opening.

Thermal stress can be relaxed along the entire perimeter of the opening.

(4) Preferably, the sealing part has a thermal expansion coefficient of 8 ppm/K to 12 ppm/K within a temperature range of room temperature to 300° C., and the mixed layer has a width of 50 μm or more.

Through impartment to the sealing part of a thermal expansion coefficient of the range and a width of the range, a thermal expansion difference is relaxed, whereby the occurrence of damage to (e.g., cracking of) the sealing part can be prevented.

(5) The joint part may contain an oxide whose oxygen dissociation pressure is lower than $1\times10^{-13}$ Pa at 800° C.

In some cases, the joint part (Ag-containing brazing filler metal) contains an oxide for ensuring an affinity for the fuel cell body. During operation of a fuel cell stack, generally, a hydrogen reduction atmosphere is established in the sealing part (glass-containing sealing material); accordingly, the oxide may undergo reduction. In order to prevent the reduction, the oxygen dissociation pressure of the oxide contained in the joint part (Ag-containing brazing filler metal) is rendered lower than the oxygen dissociation pressure of hydrogen ($1\times10^{-13}$ Pa at 800° C.).

(6) The oxide contained in the joint part may be an oxide of Al or In.

By means of the joint part (brazing filler metal) containing an oxide of Al or In, the thermal expansion coefficient of the brazing filler metal reduces, whereby the occurrence of damage to (e.g., cracking of) the seal part (glass-containing sealing material) can be restrained.

Also, in the case where the metal separator contains Al, an alumina ($Al_2O_3$) film is formed on the surface of the metal separator. In this case, an oxide of Al or In contained in the joint part (brazing filler metal) has an affinity for the alumina film on the metal separator, whereby sufficient joining strength can be ensured.

3. (1) A fuel cell with separator according to a third mode of the present invention comprises a fuel cell body having a cathode disposed on one side of a solid electrolyte layer and an anode disposed on the opposite side of the solid electrolyte layer;

a metal separator having an opening and attached to the fuel cell body through a joint formed of an Ag-containing brazing filler metal; and a sealing part formed of a glass-containing sealing material and disposed closer to the opening than is the joint part such that the sealing part is located between the metal separator and the fuel cell body.

In the fuel cell with separator, the metal separator contains Al in an amount of 1.5% by mass to 10% by mass;

the joint part contains an oxide or compound oxide of Al in an amount of 1% by volume to 25% by volume; and the sealing part contains Al in an amount of 1% by mass to 30% by mass as reduced to $Al_2O_3$.

The metal separator contains Al in an amount of 1.5% by mass to 10% by mass; the joint part contains an oxide or compound oxide of Al in an amount of 1% by volume to 25% by volume; and the sealing part contains Al in an amount of 1% by mass to 30% by mass as reduced to $Al_2O_3$. That is, since the metal separator, the joint part, and the sealing part contain Al, good affinity exists among them, thereby improving reliability in joining and sealing.

Also, since the metal separator is joined to the fuel cell body through the joint part, at the time of reception of external stress, the deformation of the sealing part is prevented, whereby the possibility of occurrence of cracking of the sealing part can be reduced.

Also, since the sealing part is disposed closer to the opening than is the joint part, the joint part is not in direct contact with oxidizer gas; thus, contact of oxygen with the joint part is suppressed. As a result, diffusion of oxygen in the joint part is hindered, whereby generation of voids through reaction of hydrogen and oxygen can be prevented.

(2) More preferably, the metal separator contains Al in an amount of 2% by mass to 10% by mass; the joint part contains an oxide or compound oxide of Al in an amount of 2% by volume to 15% by volume; and the sealing part contains Al in an amount of 2% by mass to 20% by mass as reduced to $Al_2O_3$.

Al further improves an affinity among the metal separator, the joint part, and the sealing part, thereby further improving reliability in joining and sealing.

(3) At least a portion of the oxide or compound oxide of Al may be disposed at the interface between the metal separator and the joint part.

As a result of at least a portion of the oxide or compound oxide of Al being disposed at the interface between the metal separator and the joint part, a good affinity is provided at the interface.

(4) The oxide or compound oxide of Al may be $Al_2O_3$, an Al-containing spinel-type oxide (e.g., $MgAl_2O_4$), or mullite.

Through use of these oxides of Al, a good affinity can be provided.

(5) The metal separator has a plate-like form, and there may be further provided a restraint part formed of the same material as the sealing material and disposed on the surface of the metal separator at a position opposite the sealing part with the metal separator intervening between the restraint and the sealing part.

As a result of provision of the restraint part formed of the same material as the sealing material and disposed on the surface of the metal separator, stress being caused by the difference in thermal expansion between the metal separator and the seal can be canceled, whereby separation can be prevented.

(6) The sealing part and the restraint part may be integrated through a connection disposed on a side surface of the opening of the metal separator.

The connection of the seal part and the restraint part for their integration further improves reliability in joining and sealing.

4. (1) A fuel cell with separator according to a fourth mode of the present invention comprises a fuel cell body having a cathode, an anode, and a solid electrolyte layer sandwiched between the cathode and the anode;

a plate-like metal separator having an opening which opens at its main surface and back surface, and joined, at the back surface, to the fuel cell body through a joint part formed of an Ag-containing joining material;

a sealing part formed of a glass-containing sealing material and disposed closer to the opening than is the joint part such that the sealing part is located between the fuel cell body and the back surface of the metal separator and extends along the entire perimeter of the opening; and a restraint part formed of a material higher in thermal expansion coefficient than the sealing material and disposed on the main surface of the metal separator at a position opposite the sealing part.

The fuel cell with separator has the sealing part provided on the back surface of the metal separator, and the restraint part provided on the main surface of the metal separator and formed of a material higher in thermal expansion coefficient than the sealing part.

The restraint part provided on the main surface of the metal separator is higher in thermal expansion coefficient than the sealing part provided on the back surface of the metal separator. Thus, in the course of use of a fuel cell stack, the metal separator attempts to curve toward the sealing part; accordingly, force acts on the sealing part in a direction of pressing (pressure welding) the sealing part. The force restrains separation at the interface between the seal and the metal separator, so that an airtight seal is improved. As a result, fuel gas or oxidizer gas is restrained from reaching the joint part.

(2) Preferably, the restraint part is disposed along the entire perimeter of the opening.

The sealing part is disposed along the entire perimeter of the opening. Thus, through disposition of the restraint part along the entire perimeter of the opening, the deformation of the metal separator can be restrained along the entire perimeter of the opening.

(3) Preferably, the sealing part and the restraint part are integrated through a connection part disposed on a side surface of the opening of the metal separator.

The integration of the sealing part and the restraint part can further restrain the deformation of the metal separator.

Also, the integration of the sealing part and the restraint part contributes to a substantial increase in the width of the seal, whereby sealing performance of the sealing part is reliably improved.

(4) A material of the restraint part may be lower in thermal expansion coefficient than the metal separator.

The metal separator and the restraint part are formed of metal and glass, respectively; thus, usually, the restraint part is lower in thermal expansion coefficient than the metal separator. Even for this reason, the restraint can restrain the deformation (deflection) of the metal separator.

(5) A gap may exist between the joint part and the sealing part.

Even though the joint part and the seal part are not in contact with each other, the deformation (deflection) of the metal separator can be restrained. Also, even when gas exists in the gap, the amount of the gas is small, so that the gas exerts only a small effect on the reliability of the joint part and other characteristics.

(6) Preferably, the sealing material has a thermal expansion coefficient of 8 ppm/K to 12 ppm/K within a temperature range of room temperature to 300° C.

With a thermal expansion coefficient of this range, the deformation of the metal separator can be restrained in the course of use of a fuel cell stack.

5. (1) A fuel cell with separator according to a fifth mode of the present invention comprises a fuel cell body having a cathode, an anode, and a solid electrolyte layer sandwiched between the cathode and the anode;

a plate-like metal separator having an opening which opens at its front surface and back surface, and joined, at the back surface, to the fuel cell body through a joint part formed of an Ag-containing joining material;

a sealing part formed of a glass-containing sealing material and disposed closer to the opening than is the joint part such that the sealing part is located between the fuel cell body and the back surface of the metal separator and extends along the entire perimeter of the opening; and a restraint part formed of the same material as the sealing material and disposed on the front surface of the metal separator at a position opposite the sealing part.

Since the metal separator is sandwiched between the sealing part and the restraint part which are formed of the same material (i.e., having the same thermal expansion coefficient), the deformation of the metal separator is restrained at the time of operation of a fuel cell stack. As a result, the following problem is restrained: the sealing part breaks as a result of deformation of the metal separator, and consequently, fuel gas or oxidizer gas reaches the joint part.

(2) Preferably, the restraint part is disposed along the entire perimeter of the opening.

The sealing part is disposed along the entire perimeter of the opening. Thus, through disposition of the restraint part along the entire perimeter of the opening, the deformation of the metal separator can be restrained along the entire perimeter of the opening.

(3) Preferably, the sealing part and the restraint part are integrated through a connection part disposed on a side surface of the opening of the metal separator.

The integration of the sealing part and the restraint part can further restrain the deformation (deflection) of the metal separator.

Also, the integration of the sealing part and the restraint part contributes to a substantial increase in the width of the sealing part, whereby sealing performance of the sealing part is improved.

(4) A material of the restraint part may be lower in thermal expansion coefficient than the metal separator.

The metal separator and the restraint part are formed of metal and glass, respectively; thus, usually, the restraint part is lower in thermal expansion coefficient than the metal separator. Even for this reason, the restraint part can restrain the deformation (deflection) of the metal separator.

(5) A gap may exist between the joint part and the sealing part.

Even though the joint part and the sealing part are not in contact with each other, the deformation (deflection) of the metal separator can be restrained. Also, even when gas exists in the gap, the amount of the gas is small, so that the gas exerts only a small effect on the reliability of the joint part and other characteristics.

(6) Preferably, the sealing material has a thermal expansion coefficient of 8 ppm/K to 12 ppm/K within a temperature range of room temperature to 300° C.

With a thermal expansion coefficient of this range, the deformation of the metal separator can be restrained in the course of use of a fuel cell stack.

B. A fuel cell stack comprises the above-mentioned fuel cells with respective separators.

Use of the above-mentioned fuel cells with respective separators improves the reliability of the fuel cell stack as a whole.

C. (1) A method for manufacturing the above-mentioned fuel cell with separator comprises a brazing filler metal disposing step of disposing the brazing filler metal on both of the metal separator and the fuel cell body, and a sealing material disposing step of disposing the glass-containing sealing material on at least one of the metal separator and the fuel cell body.

The brazing filler metal is disposed on both of the metal separator and the fuel cell body; thus, the two pieces of the brazing filler metal disposed beforehand on the metal separator and the fuel cell body, respectively, are melted and fused together, whereby a contact area can be ensured, and thus joining strength can be enhanced.

(2) The manufacturing method may further comprise a joining step of joining the metal separator and the fuel cell body by melting the brazing filler metal disposed on both of the metal separator and the fuel cell body.

By melting the brazing filler metal, the metal separator and the fuel cell body can be joined with high strength.

(3) Preferably, in the joining step, the brazing filler metal is melted in the atmosphere for brazing. This is because a material used to form the cathode changes in characteristics in a vacuum or a reducing atmosphere.

(4) The manufacturing method may further comprise a sealing part forming step of forming the sealing part by melting the glass-containing sealing material disposed on at least one of the metal separator and the fuel cell body.

A sealing part can be provided between the metal separator and the fuel cell body by melting the sealing material.

(5) The joining step and the sealing part forming step may be performed simultaneously.

Joining and sealing can be performed simultaneously, thereby simplifying manufacturing equipment and improving efficiency in terms of manufacturing time.

(6) After the joining step, the sealing material disposing step and the sealing part forming step may be performed.

Separate execution of joining and sealing enables various combinations of brazing filler metals and sealing materials. In order to simultaneously perform joining and sealing, preferably, the joining temperature of a brazing filler metal and the melting temperature of a sealing material are close to each other to a certain extent; therefore, limitations are imposed on brazing filler metals and sealing materials that can be employed.

Effects of the Invention

The present invention can provide a fuel cell with separator having improved reliability in joining a fuel cell and a separator or improved life, a method for manufacturing the same, and a fuel cell stack.

BRIEF DESCRIPTION OF THE DRAWINGS

FIG. 21 Sectional view of a fuel cell 40e according to modification 2 of the third embodiment.

FIG. 22 Sectional view showing a condition of the fuel cell with separator 50c under test.

FIG. 23 Table showing the test results of the fuel cell with separator 50c.

FIG. 24 Table showing the test results of the fuel cell with separator 50c.

FIG. 25 Table showing the test results of the fuel cell with separator 50c.

FIG. 37 Table showing the results of evaluation of fuel cells.

MODES FOR CARRYING OUT THE INVENTION

A solid oxide fuel cell stack according to the present invention will next be described with reference to the drawings.

First Embodiment

Figure 1:
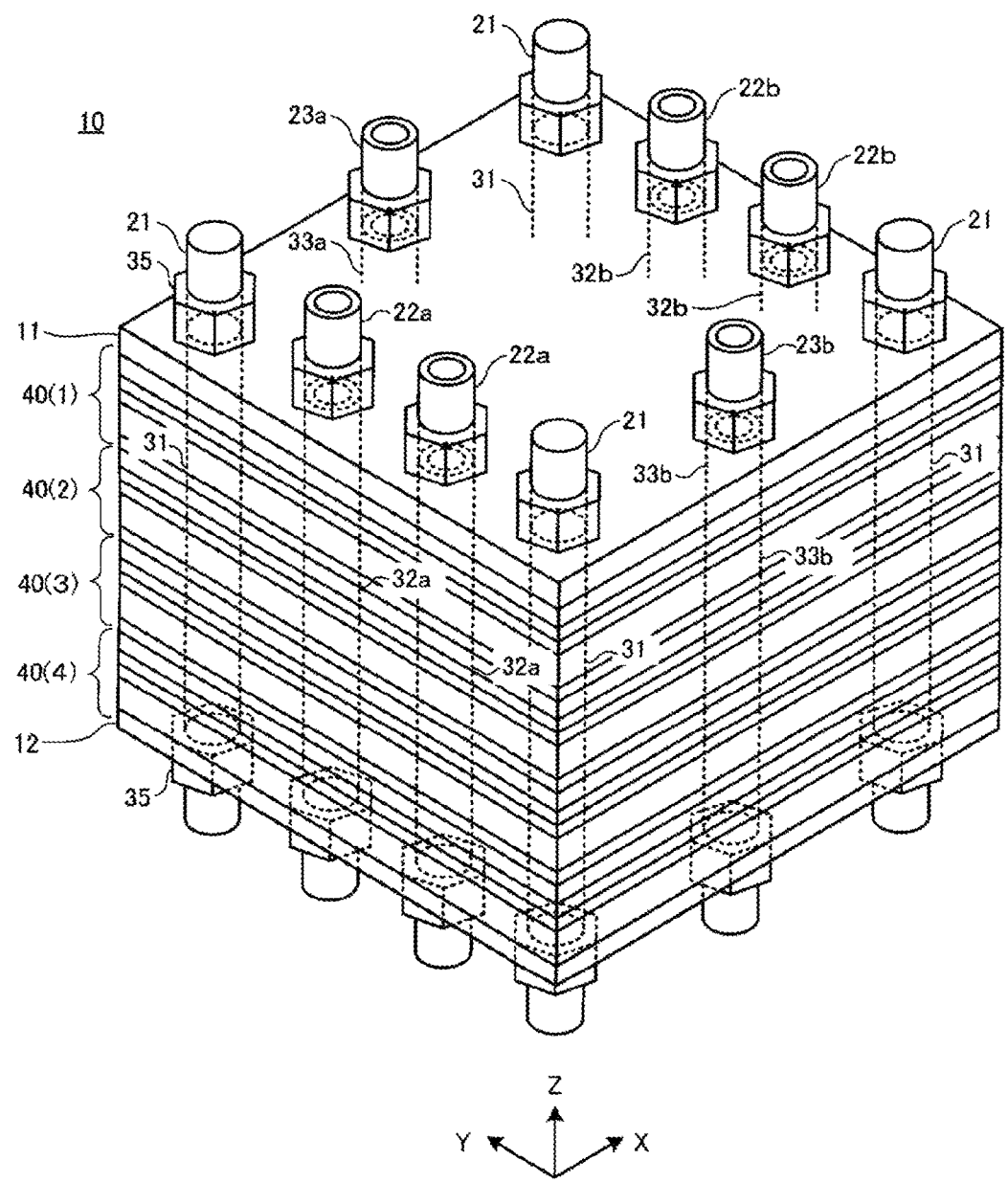
FIG. 1 Perspective view showing a solid oxide fuel cell stack 10 according to a first embodiment of the present invention.

FIG. 1 is a perspective view showing a solid oxide fuel cell stack 10 according to a first embodiment of the present invention. The solid oxide fuel cell stack 10 generates electricity through reception of fuel gas (e.g., hydrogen) and oxidizer gas (e.g., air (specifically, oxygen in air)).

The solid oxide fuel cell stack 10 is configured such that end plates 11 and 12 and fuel cells 40(1) to 40(4) are stacked and fixed together with bolts 21, 22 (22a, 22b), and 23 (23a, 23b) and nuts 35.

Figure 2:
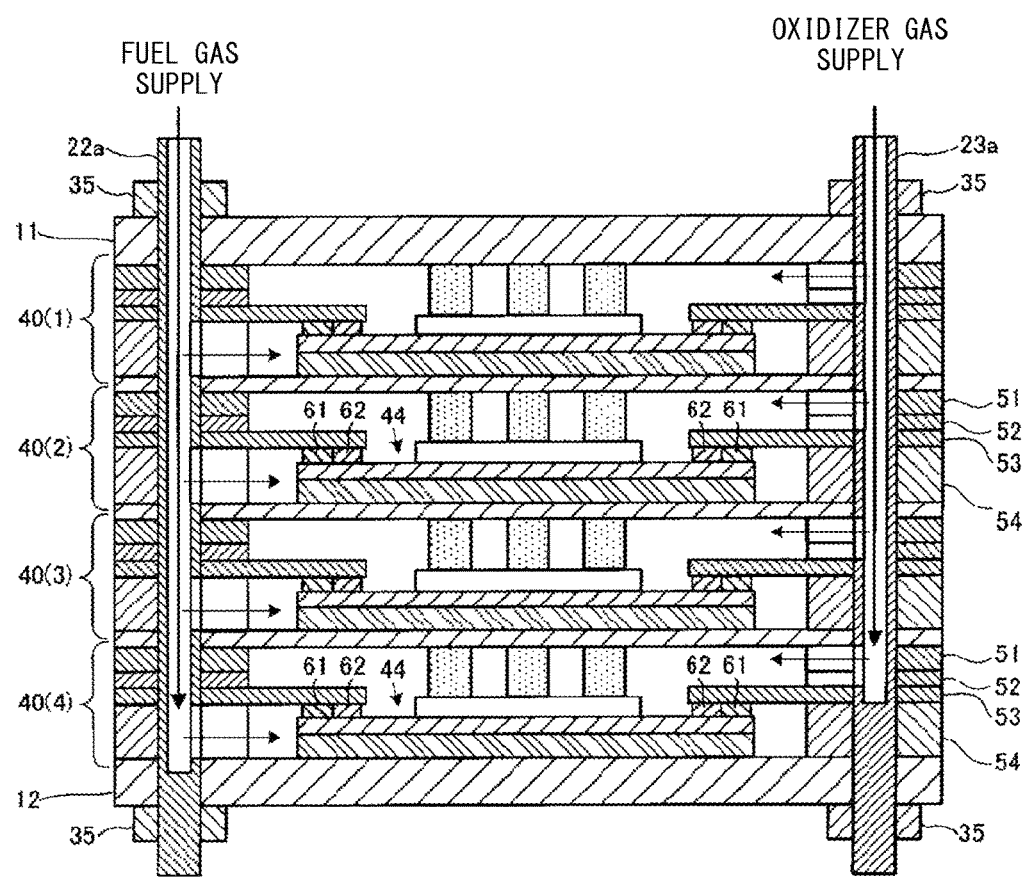
FIG. 2 Schematic sectional view of the solid oxide fuel cell stack 10.

FIG. 2 is a schematic sectional view of the solid oxide fuel cell stack 10.

The solid oxide fuel cell stack 10 is configured to stack the fuel cells 40(1) to 40(4). Herein, for easy understanding, four fuel cells 40(1) to 40(4) are stacked; however, generally, about 20 to 60 fuel cells 40 are stacked in many cases.

The end plates 11 and 12 and the fuel cells 40(1) to 40(4) have through holes 31, 32 (32a, 32b), and 33 (33a, 33b) corresponding to the bolts 21, 22 (22a, 22b), and 23 (23a, 23b).

The end plates 11 and 12 are retaining plates for pressing and retaining the stacked fuel cells 40(1) to 40(4) and also serve as output terminals for electric current from the fuel cells 40(1) to 40(4).

Figure 3:
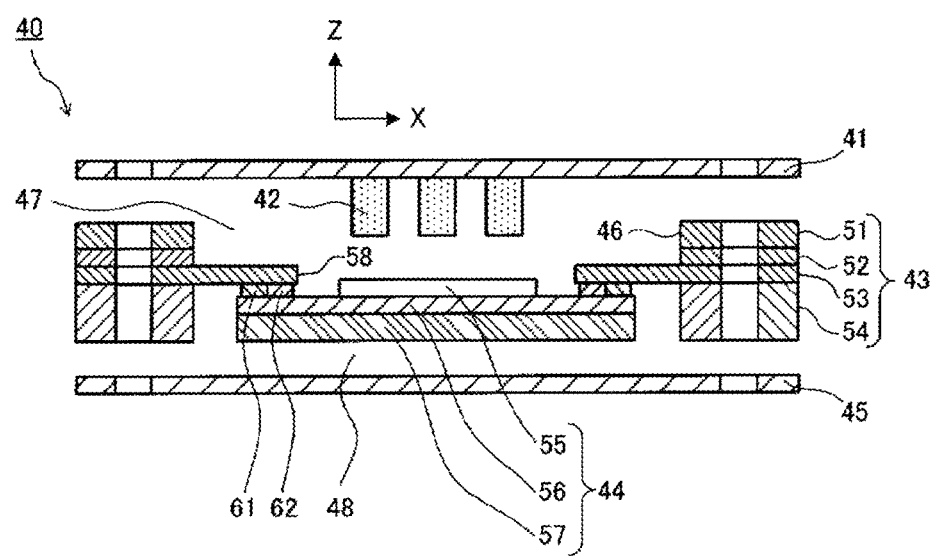
FIG. 3 Sectional view of a fuel cell 40.
Figure 4:
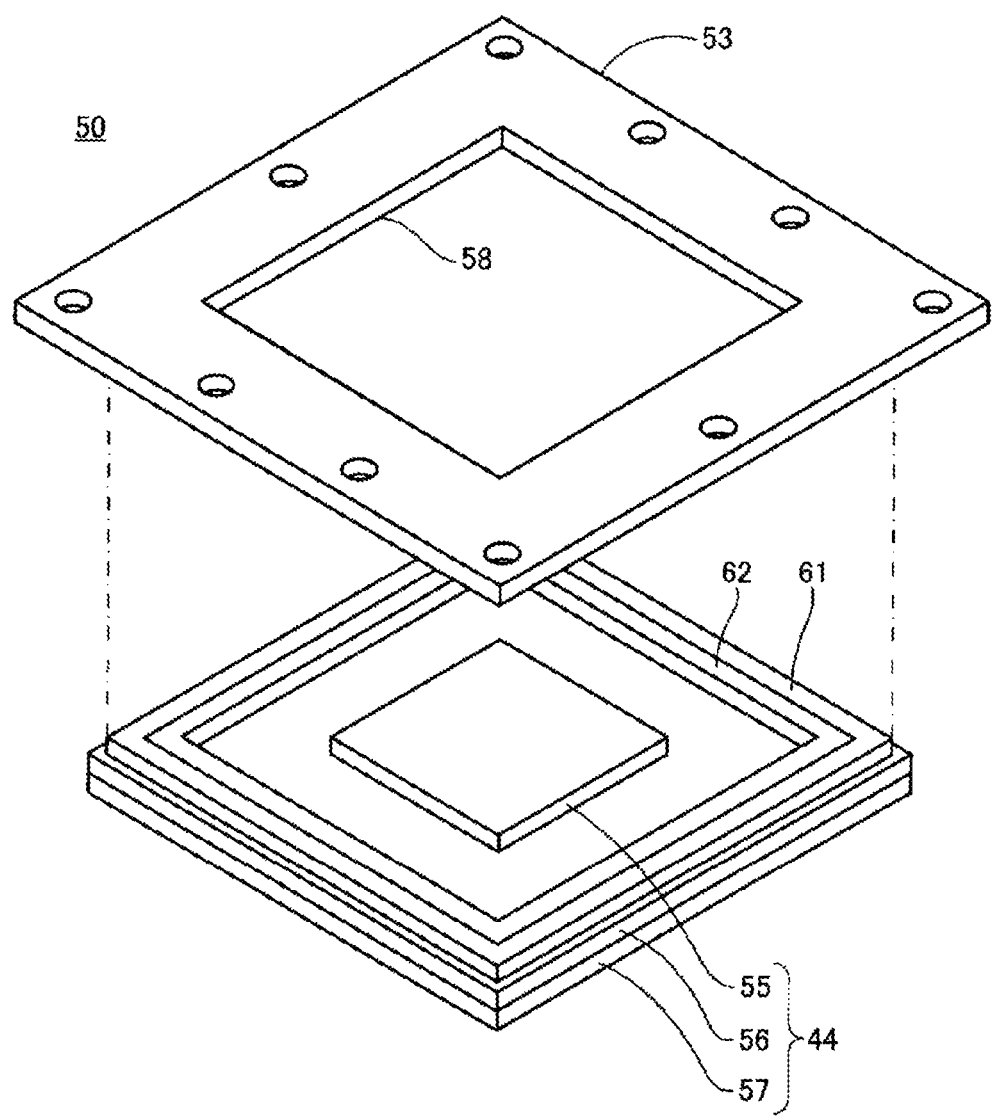
FIG. 4 Exploded perspective view showing, in an exploded condition, a fuel cell body 44 and a metal separator 53 (fuel cell with separator).

FIG. 3 is a sectional view of the fuel cell 40. FIG. 4 is an exploded perspective view showing, in an exploded condition, a fuel cell body 44 and a metal separator 53 (fuel cell with separator).

As shown in FIG. 3, the fuel cell 40 has the metal separator 53 and the fuel cell body 44 and includes interconnectors 41 and 45, current collectors 42, and a frame 43.

The fuel cell body 44 is configured such that a solid electrolyte layer 56 is sandwiched between a cathode (also called an air electrode layer) 55 and an anode (also called a fuel electrode layer) 57. The cathode 55 and the anode 57 are disposed on the solid electrolyte layer 56 on a side toward an oxidizer gas channel 47 and on a side toward a fuel gas channel 48, respectively.

In the present embodiment, all of the solid electrolyte layer 56, the cathode 55, and the anode 57 have the form of a plate; however, they may be formed into respective cylindrical shapes.

Materials usable to form the anode 55 include perovskite-type oxides (e.g., LSFC (lanthanum strontium cobalt ferrite)), LSM (lanthanum strontium manganese oxide), noble metals, and cermets of noble metals and ceramic.

Materials usable to form the solid electrolyte layer 56 include YSZ (yttria-stabilized zirconia), ScSZ (scandia-stabilized zirconia), SDC (samarium-doped ceria), GDC (gadolinium-doped ceria), and perovskite-type oxides.

Metal is preferred to form the anode 57, and materials usable to form the anode 57 include Ni, a cermet of Ni and ceramic, and Ni-based alloys.

The interconnectors 41 and 45 are electrically conductive plate-like members (formed of metal, for example, stainless steel) which ensure electrical connection between the fuel cell bodies 44 and can prevent mixing of gases between the fuel cell bodies 44.

Only a single interconnector (41 or 45) is disposed between the fuel cell bodies 44 (two fuel cell bodies 44 connected in series share a single interconnector disposed therebetween). Also, in place of the interconnectors 41 and 45, the electrically conductive end plates 11 and 12 are disposed on the top fuel cell body 44 and on the bottom fuel cell body 44, respectively.

The current collectors 42 are adapted to ensure electrical connection between the interconnector 41 and the cathode 55 of the fuel cell body 44, and are formed of, for example, a metal material such as a nickel alloy. Also, the current collectors 42 may have elasticity.

The frame 43 has an opening 46 in which oxidizer gas and fuel gas flow. The opening 46 is sealed airtightly and is divided into the oxidizer gas channel 47 in which oxidizer gas flows, and the fuel gas channel 48 in which fuel gas flows. Also, the frame 43 of the present embodiment is composed of a cathode frame 51, an insulation frame 52, the metal separator 53, and an anode frame 54.

The cathode frame 51 is a metal frame disposed on the cathode 55 side and has the opening 46 at a central portion thereof. The opening 46 defines the oxidizer gas channel 47.

The insulation frame 52 electrically insulates the interconnectors 41 and 45 from each other, can be formed of, for example, ceramic such as $Al_2O_3$, mica, or vermiculite, and has the opening 46 at a central portion thereof. The opening 46 defines the oxidizer gas channel 47. Specifically, the insulation frame 52 is disposed between the interconnectors 41 and 45 such that one surface is in contact with the cathode frame 51, and the other surface is in contact with the metal separator 53. As a result, the insulation frame 52 electrically insulates the interconnectors 41 and 45 from each other.

The metal separator 53 is a frame-like metal sheet (e.g., thickness: 0.1 mm) having an opening 58, is attached to the solid electrolyte layer 56 of the fuel cell body 44, and prevents the mixing of oxidizer gas and fuel gas. The metal separator 53 divides the opening 46 of the frame 43 into the oxidizer gas channel 47 and the fuel gas channel 48, thereby preventing the mixing of oxidizer gas and fuel gas.

The metal separator 53 has the opening 58 in the form of a through hole extending therethrough between the upper surface and the lower surface thereof, and the cathode 55 of the fuel cell body 44 is disposed in the opening 58. The fuel cell body 44 to which the metal separator 53 is joined is called "a fuel cell with separator." This will be described later in detail Similar to the insulation frame 52, the anode frame 54 is an insulation frame disposed on the anode 57 side and has the opening 46 at a central portion thereof. The opening 46 defines the fuel gas channel 48.

The cathode frame 51, the insulation frame 52, the metal separator 53, and the anode frame 54 have, at their peripheral portions, the through holes 31, 32 (32a, 32b) and 33 (33a, 33b) through which the corresponding bolts 21, 22 (22a, 22b) and 23 (23a, 23b) are inserted, and oxidizer gas or fuel gas flows through the corresponding bolts.

(Details of a Fuel Cell with Separator)

In the present embodiment, a fuel cell with separator 50 is configured such that a joint part 61 and a sealing part 62 are disposed between the fuel cell body 44 and the metal separator 53. The lower surface of the metal separator 53 and the upper surface of the solid electrolyte layer 56 are joined together by the joint part 61 and are sealed against each other by the sealing part 62, along the opening 58 (see FIG. 4).

The metal separator 53 is formed of a metal material which contains iron (Fe) as a main component. Preferably, the metal material contains Al in an amount of 0.1% by mass to 10% by mass (e.g., 3% by mass).

The metal separator has an alumina film formed on its surface, thereby exhibiting improved oxidation resistant durability and excellent workability.

The metal separator 53 has a thickness of, for example, 0.1 mm.

In forming the solid oxide fuel cell stack 10, the metal separator 53 relaxes stress applied to the joint part 61 and the sealing part 62 which connect the fuel cell body 44 and the metal separator 53, thereby reducing the possibility of occurrence of problems such as damage to (cracking of) the joint part 61 and the sealing part 62.

The joint part 61 is formed of an Ag-containing brazing filler metal and is disposed along the entire perimeter of the opening 58, thereby joining the fuel cell body 44 and the metal separator 53 together. The joint part 61 (Ag brazing filler metal) has, for example, a width of 2 mm to 6 mm and a thickness of 10 μm to 80 μm.

Various brazing filler metals which contain Ag as a main component can be employed for forming the joint part 61. An example brazing filler metal is a mixture of Ag and an oxide, such as Ag—$Al_2O_3$ (a mixture of Ag and $Al_2O_3$ (alumina)). Other examples of a mixture of Ag and an oxide include Ag—CuO, Ag—$TiO_2$, Ag—$Cr_2O_3$, and Ag—$SiO_2$. Also, an alloy of Ag and another metal (e.g., Ag—Ge—Cr, Ag—Ti, or Ag—Al) can be used as the brazing filler metal.

Even in the air atmosphere, an Ag-containing brazing filler metal (Ag brazing filler metal) is unlikely to be oxidized at a brazing temperature. Thus, Ag brazing filler metal is preferred in view of process efficiency, since the fuel cell body 44 and the metal separator 53 can be joined in the air atmosphere by use of Ag brazing filler metal.

The sealing part 62 is disposed closer to the opening 58 (inner perimeter) than is the joint part 61 along the entire perimeter of the opening 58 and provides a seal between the fuel cell body 44 and the metal separator 53 in order to prevent the mixing of oxidizer gas existing in the opening 58 of the metal separator 53 and fuel gas existing externally of the opening 58. Since the sealing part 62 is disposed closer to the opening 58 than is the joint part 61, the joint part 61 is free from contact with oxidizer gas; i.e., movement of oxygen from the oxidizer gas channel 47 to the joint part 61 is suppressed. As a result, gas leakage can be prevented, which could otherwise result from generation of voids in the joint part 61 as a result of reaction of hydrogen and oxygen. Furthermore, since the sealing part 62 is disposed between the metal separator 53 and the fuel cell body 44, thermal stress acting on the sealing part 62 becomes shear stress rather than tensile stress. Thus, the sealing material becomes unlikely to crack, and there can be restrained separation at the interface between the sealing part 62 and the metal separator 53 or the fuel cell body 44, whereby the reliability of the sealing part 62 can be improved.

The sealing part 62 has, for example, a width of 1 mm to 4 mm and a thickness of 80 μm to 200 μm.

The sealing part 62 can be formed of a glass-containing sealing material; specifically, glass, glass-ceramic (crystallized glass), or a composite of glass and ceramic. For example, glass G018-311, a product of SCHOTT, can be used to form the sealing part 62.

(Manufacture of a Fuel Cell with Separator)

A method for manufacturing a fuel cell with separator (the fuel cell body 44 having the metal separator 53 joined thereto) will be described. Herein, two manufacturing methods (manufacturing methods A and B) will be described.

In either of the two manufacturing methods, first, the metal separator 53 having the opening 58 is punched out from, for example, a sheet of SUH21 (18Cr-3Al (Al-containing ferritic stainless steel)). Also, a sheet of the solid electrolyte layer 56 is affixed to one surface of a green sheet of the anode 57 to form a laminate, and the laminate is once fired. Subsequently, a material for the cathode 55 is printed on the fired laminate, followed by firing to form the fuel cell body 44.

1. Manufacturing Method A

Figure 5:
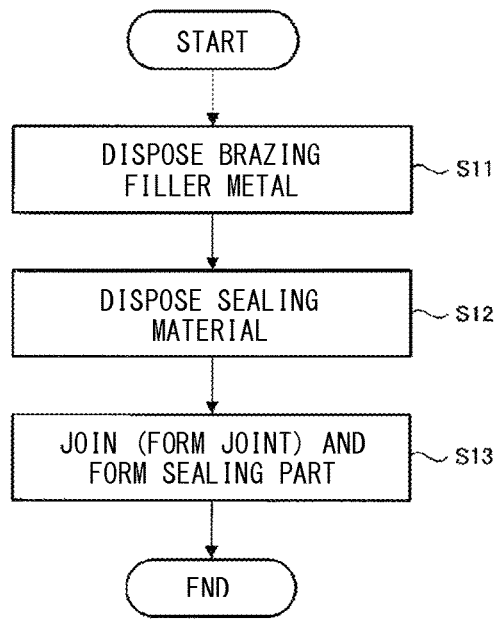
FIG. 5 Flowchart showing a process of manufacturing a fuel cell with separator.

As shown below, in manufacturing method A, joining (forming the joint part 61), and forming the sealing part 62 are performing simultaneously. FIG. 5 is a flowchart showing a process of manufacturing a fuel cell with separator according to manufacturing method A. FIGS. 6A to 6E are sectional views showing the conditions of the fuel cell with separator in the process of manufacture according to manufacturing method A.

Figure 6A:
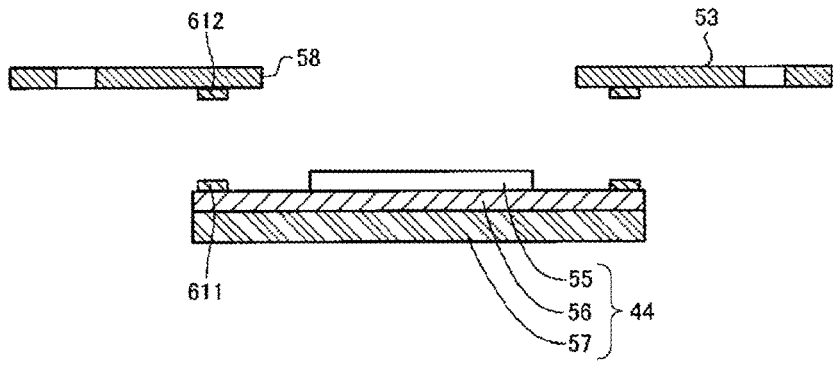
FIG. 6A Sectional view showing a condition of the fuel cell with separator in the process of manufacture.

(1) Disposing Brazing Filler Metals 611 and 612 (Step S11; FIG. 6A)

Brazing filler metals 611 and 612 are disposed on the fuel cell body 44 and the metal separator 53, respectively. For example, a pasty Ag-containing brazing filler metal is printed, in a predetermined shape, on the upper surface of the solid electrolyte layer 56 of the fuel cell body 44 and on the lower surface of the metal separator 53, thereby disposing the brazing filler metals 611 and 612 on the fuel cell body 44 and the metal separator 53, respectively. In place of the above method, a dispenser may be used to dispose the brazing filler metals 611 and 612.

Each of the brazing filler metals 611 and 612 has, for example, a width of 2 mm to 6 mm and a thickness of 10 μm to 80 μm.

The two brazing filler metals 611 and 162 disposed beforehand on the fuel cell body 44 and the metal separator 53, respectively, are melted and fused together, whereby a contact area is ensured, and thus the joining strength of the joint part 61 can be enhanced.

In the case where a brazing filler metal is disposed on only one of the fuel cell body 44 and the metal separator 53, the brazing filler metal melts, wets the surface of the other one, and then solidifies, whereby the brazing filler metal and the other one of the fuel cell body 44 and the metal separator 53 are joined together. In this manner, in the case where the brazing filler metal melts and then comes into contact with the fuel cell body 44 and the metal separator 53, a contact area is apt to reduce, possibly resulting in difficulty in ensuring joining strength. Since wettability of a molten brazing filler metal on the fuel cell body 44 and on the metal separator 53 is not necessarily good, by means of the brazing filler metal being disposed on both of the fuel cell body 44 and the metal separator 53 before joining, the joining strength of the joint part 61 can be enhanced.

Figure 6B:
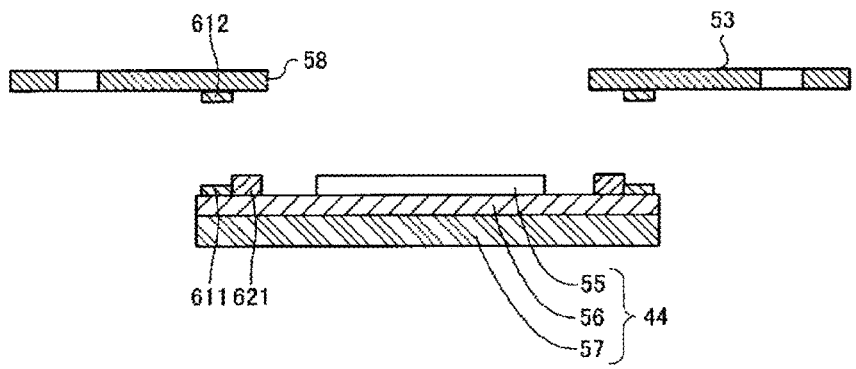
FIG. 6B Sectional view showing a condition of the fuel cell with separator in the process of manufacture.
Figure 6C:
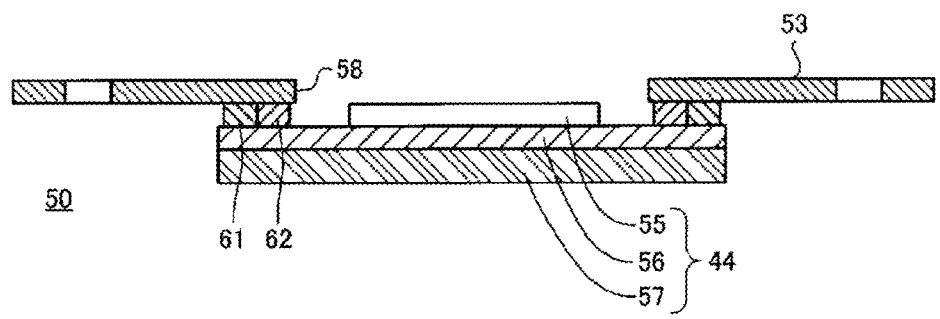
FIG. 6C Sectional view showing a condition of the fuel cell with separator in the process of manufacture.
Figure 6D:
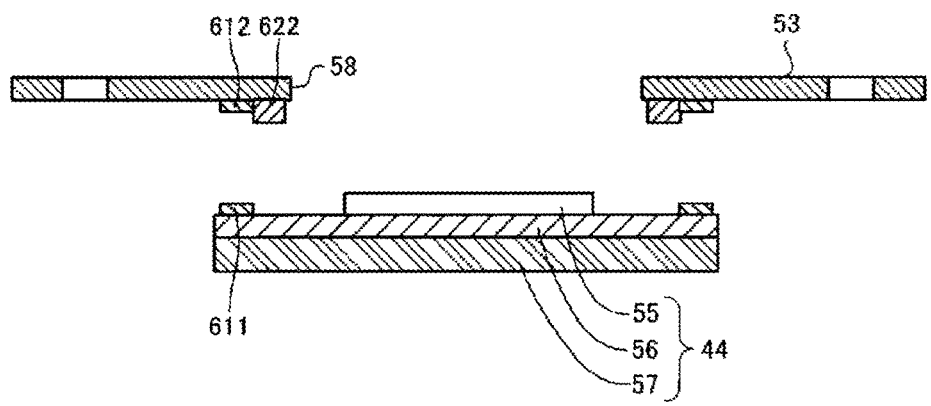
FIG. 6D Sectional view showing a condition of the fuel cell with separator in the process of manufacture.
Figure 6E:
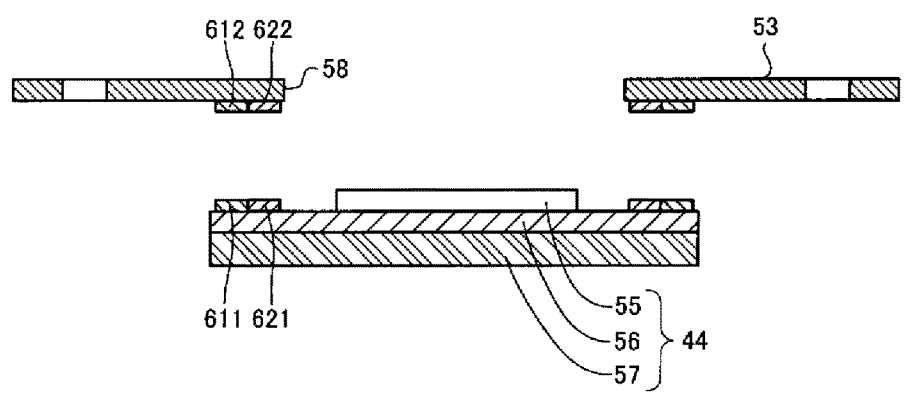
FIG. 6E Sectional view showing a condition of the fuel cell with separator in the process of manufacture.

(2) Disposing sealing material 621 (step S12; FIGS. 6B, 6D, and 6E)

The sealing material 621 is disposed on at least one of the fuel cell body 44 and the metal separator 53 at a position located toward the opening 58 or the cathode 55. For example, the sealing material 621 is disposed on at least one of the fuel cell body 44 and the metal separator 53 by printing the pasty sealing material. In place of the above method, a dispenser may be used to dispose the sealing material.

The sealing material 621 has, for example, a width of 1 mm to 4 mm and a thickness of 80 μm to 200 μm.

FIGS. 6B, 6D, and 6E show respectively a condition in which the sealing material 621 is disposed on only the fuel cell body 44, a condition in which the sealing material 622 is disposed on only the metal separator 53, and a condition in which the sealing materials 621 and 622 are disposed on the fuel cell body 44 and on the metal separator 53, respectively. In all of the conditions, the sealing materials 621 and 622 are disposed closer to the opening 58 and the cathode 55 than is the joint part (brazing filler metal) 61.

As mentioned above, preferably, the brazing filler metal is disposed on both of the fuel cell body 44 and the metal separator 53; by contrast, the sealing material may be disposed on one of the fuel cell body 44 and the metal separator 53. This results from the difference in wettability between the molten brazing filler metal and the molten sealing material. This is because the molten glass-containing sealing material is better than the molten brazing filler metal in wettability on the fuel cell body 44 and on the metal separator 53.

The metal separator 53 is formed of a material which forms an oxide film (oxide (alumina)) in the atmosphere at a high temperature, and the solid electrolyte layer 56 is also formed of an oxide. Thus, the metal separator 53 and the solid electrolyte layer 56 are better than the brazing filler metal in wettability to the sealing material (glass (oxide)).

The present embodiment performs "(1) Disposing brazing filler metals" and then "(2) Disposing a sealing material;" however, the order may be reversed, or the brazing filler metal and the sealing material may be disposed simultaneously.

(3) Joining (forming the joint part 61), and forming the sealing part 62 (step S13; FIG. 6C)

The brazing filler metals 611 and 612 are melted to join the fuel cell body 44 and the metal separator 53 (forming the joint part 61); at the same time, the sealing material 621 is melted to form the sealing part 62. The fuel cell body 44 and the metal separator 53 on which the brazing filler metals 611 and 612 and the sealing material 621 are disposed are brought into contact with each other and are then heated in the air atmosphere at a temperature of 850° C. to 1,100° C., whereby the brazing filler metals 611 and 612 and the sealing material 621 are melted, thereby forming the joint part and the sealing part simultaneously.

As mentioned above, the two brazing filler metals 611 and 612 disposed beforehand on the fuel cell body 44 and the metal separator 53, respectively, are melted and fused together, whereby a contact area is ensured, and thus the joining strength can be enhanced.

At this time, since the brazing filler metals 611 and 612 and the sealing material 621 are disposed adjacently, joining (forming the joint part 61), and forming the sealing part 62 are performed substantially at the same temperature in the same atmosphere.

At the time of joining, in order to bring the molten brazing filler metal into close contact with the fuel cell body 44 and with the metal separator 53, load is applied to the fuel cell body 44 and the metal separator 53 from above and underneath. As a result, load can also be applied to the sealing material 621 from above and underneath, so that a seal can be provided in a gapless manner.

Since the brazing filler metal contains Ag and is thus unlikely to be oxidized in the air atmosphere, brazing (joining) can be performed in the air atmosphere; thus, there can be prevented a deterioration in performance of the fuel cell body 44 (particularly, the cathode 55) caused by forming the joint part 61 and the sealing part 62 (step S13), specifically, a deterioration in electrode performance caused by a change in crystal structure of the cathode 55 (e.g., LSFC (lanthanum strontium cobalt ferrite)) of the fuel cell body 44 in forming the joint part 61 and the sealing part 62 (step S13).

Furthermore, since there is no need to employ an atmosphere of inert gas such as Ar in order to prevent a deterioration in performance of the fuel cell body 44, equipment and processes do not become complex, so that efficient equipment and processes can be implemented.

As mentioned above, in manufacturing method A, joining (forming the joint part 61), and forming the sealing part 62 are performed at the same temperature in the same atmosphere, so that manufacturing equipment is simplified, and manufacturing time is shortened, whereby the fuel cell with separator can be efficiently manufactured.

2. Manufacturing Method B

Figure 7:
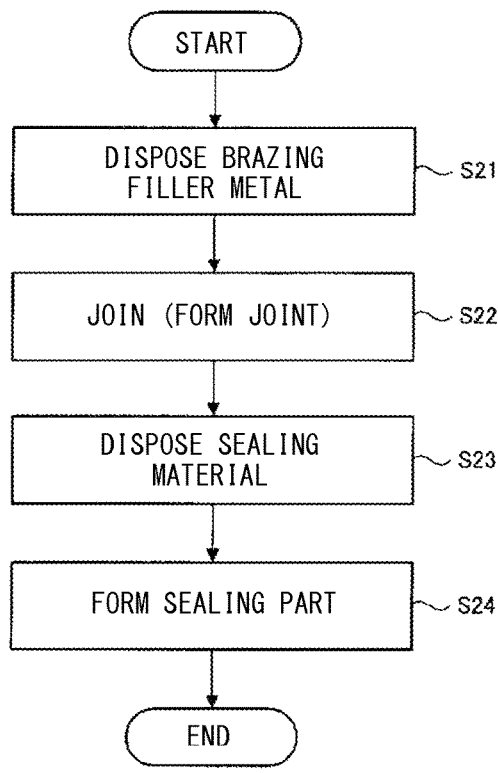
FIG. 7 Flowchart showing a process of manufacturing a fuel cell with separator.

In manufacturing method B, joining (forming the joint part 61), and forming the sealing part 62 are performed separately. FIG. 7 is a flowchart showing a process of manufacturing a fuel cell with separator according to manufacturing method B. FIGS. 8A to 8D are sectional views showing the conditions of the fuel cell with separator in the process of manufacture according to manufacturing method B.

Figure 8A:
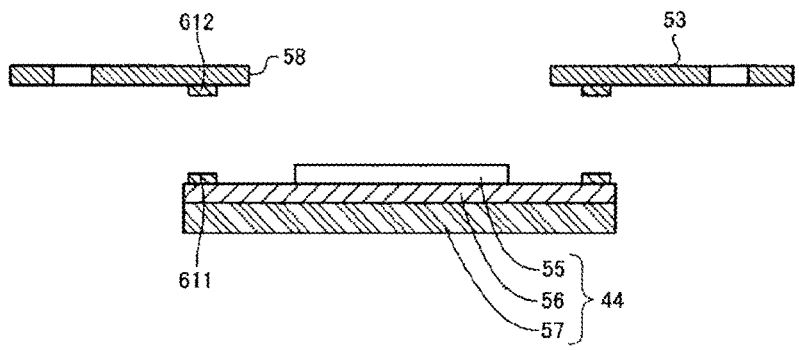
FIG. 8A Sectional view showing a condition of the fuel cell with separator in the process of manufacture.

(1) Disposing Brazing Filler Metals 611 and 612 (Step S21; FIG. 8A)

The brazing filler metals 611 and 612 are disposed on the fuel cell body 44 and on the metal separator 53, respectively. Since this step is similar to step S11 of manufacturing method A, detailed description thereof is omitted.

Figure 8B:
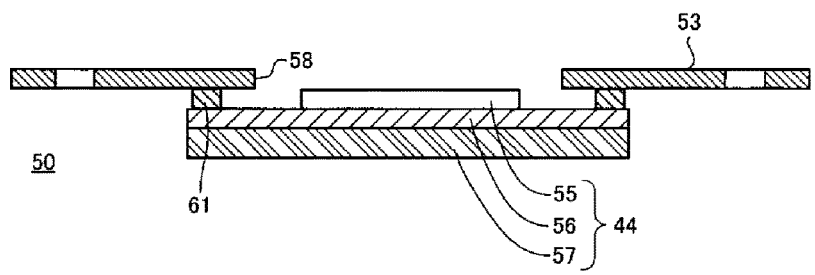
FIG. 8B Sectional view showing a condition of the fuel cell with separator in the process of manufacture.

(2) Joining (Forming the Joint Part 61) (Step S22; FIG. 8B)

The brazing filler metals 611 and 612 are melted to join the fuel cell body 44 and the metal separator 53 (forming the joint part 61). The fuel cell body 44 and the metal separator 53 on which the brazing filler metals 611 and 612 are disposed, respectively, are brought into contact with each other and are then heated at a temperature of 850° C. to 1,100° C., whereby the brazing filler metals 611 and 612 are melted to perform joining.

As mentioned above, the two brazing filler metals 611 and 612 disposed beforehand on the fuel cell body 44 and the metal separator 53, respectively, are melted and fused together, whereby a contact area is ensured, and thus the joining strength can be enhanced.

Figure 8C:
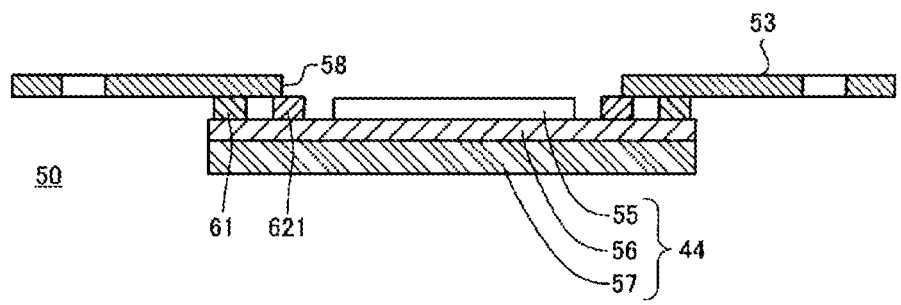
FIG. 8C Sectional view showing a condition of the fuel cell with separator in the process of manufacture.

(3) Disposing Sealing Material 621 (Step S23; FIG. 8C)

The sealing material 621 is disposed on at least one of the fuel cell body 44 and the metal separator 53. For example, the sealing material 621 can be disposed on at least one of the fuel cell body 44 and the metal separator 53 by printing a paste which contains the sealing material. As mentioned above, since the sealing material generally has good wettability, the sealing material can be disposed on either one of the fuel cell body 44 and the metal separator 53.

Figure 8D:
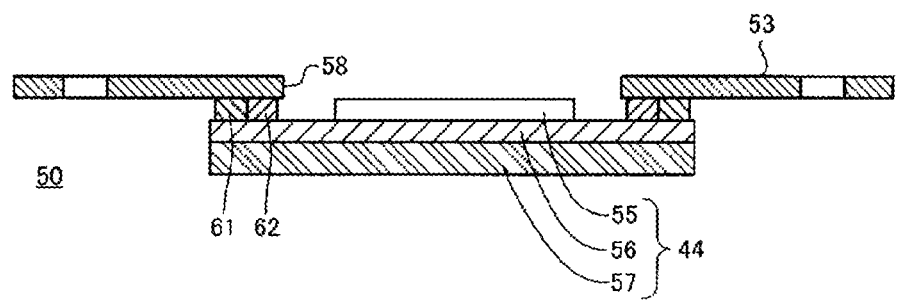
FIG. 8D Sectional view showing a condition of the fuel cell with separator in the process of manufacture.

(4) Forming Sealing Part 62 (Step S24; FIG. 8D)

The sealing material 621 is melted to form the sealing part 62. The metal separator 53 and the fuel cell body 44 which is joined to the metal separator 53 by the joint part 61 and on which the sealing material 621 is disposed are heated at a temperature of, for example, 850° C. to 1,100° C., thereby melting the sealing material 621 to provide a seal.

As mentioned above, in manufacturing method B, joining and sealing are performed separately, thereby enabling various combinations of brazing filler metals and sealing materials.

In order to perform joining and sealing simultaneously, preferably, the joining temperature of a brazing filler metal and the melting temperature of a sealing material are close to each other to a certain extent; therefore, employable brazing filler metals and sealing materials are limited. Generally, brazing filler metals are higher in melting point than sealing materials (glass). In the case where the joining temperature of the brazing filler metal and the melting temperature of the sealing material differ from each other, performing joining and sealing simultaneously may result in a failure to provide a seal due to the thinning of the sealing material caused by degeneration and transpiration of components of the sealing material.

(Method for Manufacturing Solid Oxide Fuel Cell Stack 10)

The end plates 11 and 12, the interconnectors 41 and 45, the cathode frame 51, and the anode frame 54 having respectively predetermined shapes are punched out from, for example, sheets of SUH21. Meanwhile, the insulation frame 52 is manufactured by working on a mica sheet.

The insulation frame 52, the cathode frame 51, and the interconnector 41 are disposed, in this order, on the metal separator 53 on the cathode 55 side of the fuel cell body 44 of the fuel cell with separator 50 manufactured by manufacturing method A or B described above, whereas the anode frame 54 and the interconnector 45 are disposed, in this order, on the metal separator 53 on the anode 57 side, thereby yielding the fuel cell 40.

A plurality of the fuel cells 40 are stacked; the end plates 11 and 12 are disposed on the top and the bottom, respectively, of the stack; by use of the bolts 21 to 23 and the nuts 35, the plurality of fuel cells 40 are fixedly held between the end plates 11 and 12, thereby yielding the solid oxide fuel cell stack 10.

Modification of First Embodiment

Figure 9:
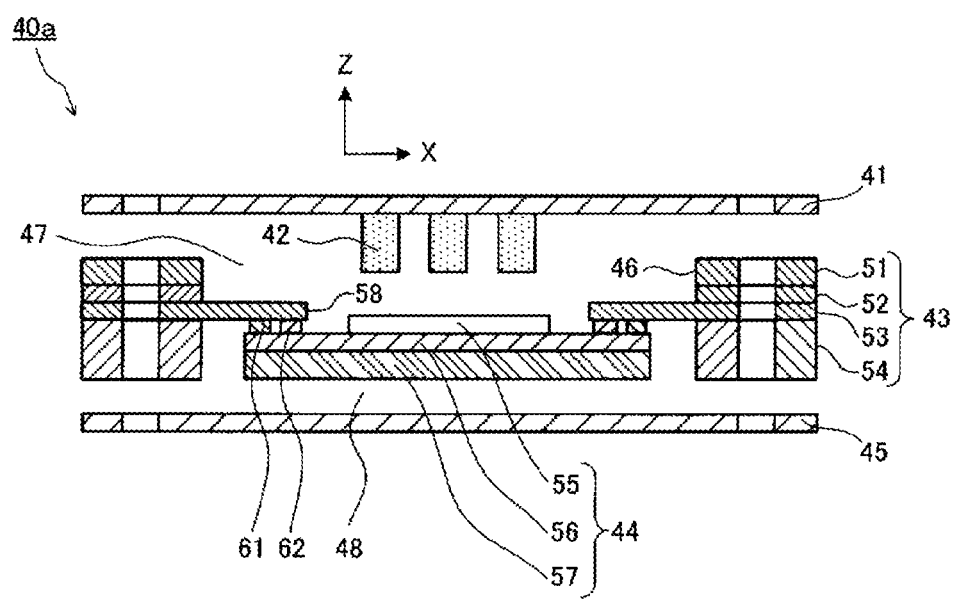
FIG. 9 Sectional view of a fuel cell 40a according to a modification of the first embodiment.
Figure 10:
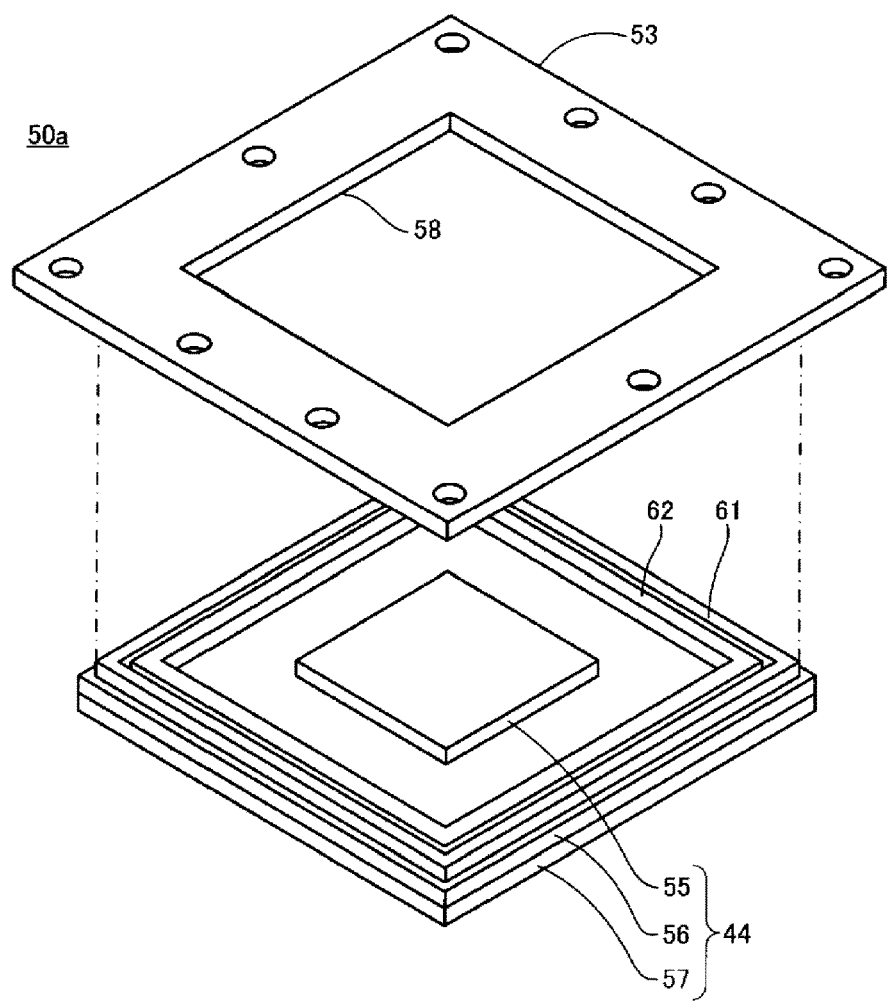
FIG. 10 Exploded perspective view showing, in an exploded condition, the fuel cell body 44 and the metal separator 53 (fuel cell with separator 50a).

A modification of the first embodiment will next be described. FIG. 9 is a sectional view of a fuel cell 40a according to the modification of the first embodiment. FIG. 10 is an exploded perspective view showing, in an exploded condition, the fuel cell body 44 and the metal separator 53 (fuel cell with separator 50a) according to the modification of the first embodiment.

The fuel cell 40a has a gap between the joint part 61 and the sealing part 62. In this manner, even though the joint part 61 and the sealing part 62 are not in contact with each other, the possibility of occurrence of cracking of the sealing part 62 can be reduced, and the diffusion of oxidizer gas in the joint part 61 can be prevented.

In the fuel cells 40 and 40a, the joint part 61 and the sealing part 62 are in contact with each other or have a gap therebetween, along the entire perimeter of the opening 58. In its conceivable intermediate mode, the joint part 61 and the sealing part 62 are in contact with each other along a portion of the perimeter of the opening 58 and are not in contact with each other along another portion of the perimeter of the opening 58.

Similar to the case of the first embodiment, the fuel cell with separator according to the modification of the first embodiment can be manufactured by manufacturing method A or B.

In this case, while the sealing material is disposed in such a manner as to be spaced from the brazing filler metal to a certain extent, the fuel cell body 44 and the metal separator 53 are joined.

Second Embodiment

Figure 11:
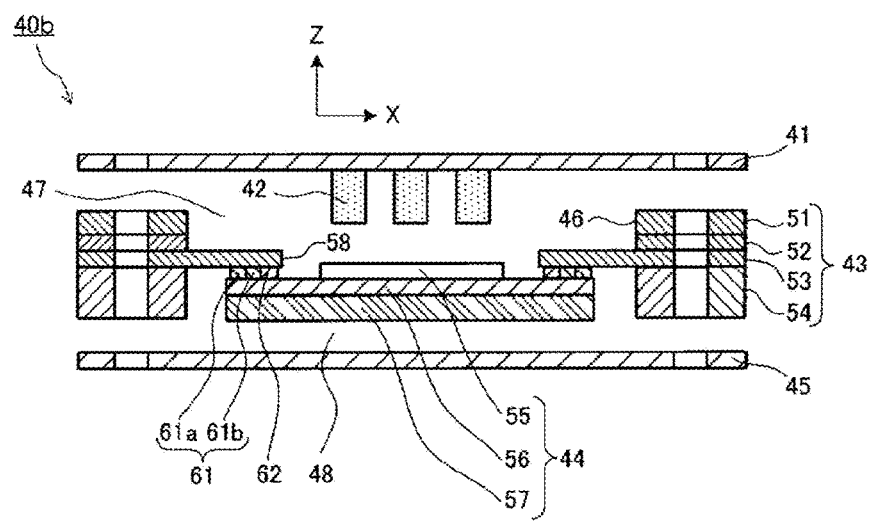
FIG. 11 Sectional view of a fuel cell 40b according to a second embodiment of the present invention.
Figure 12:
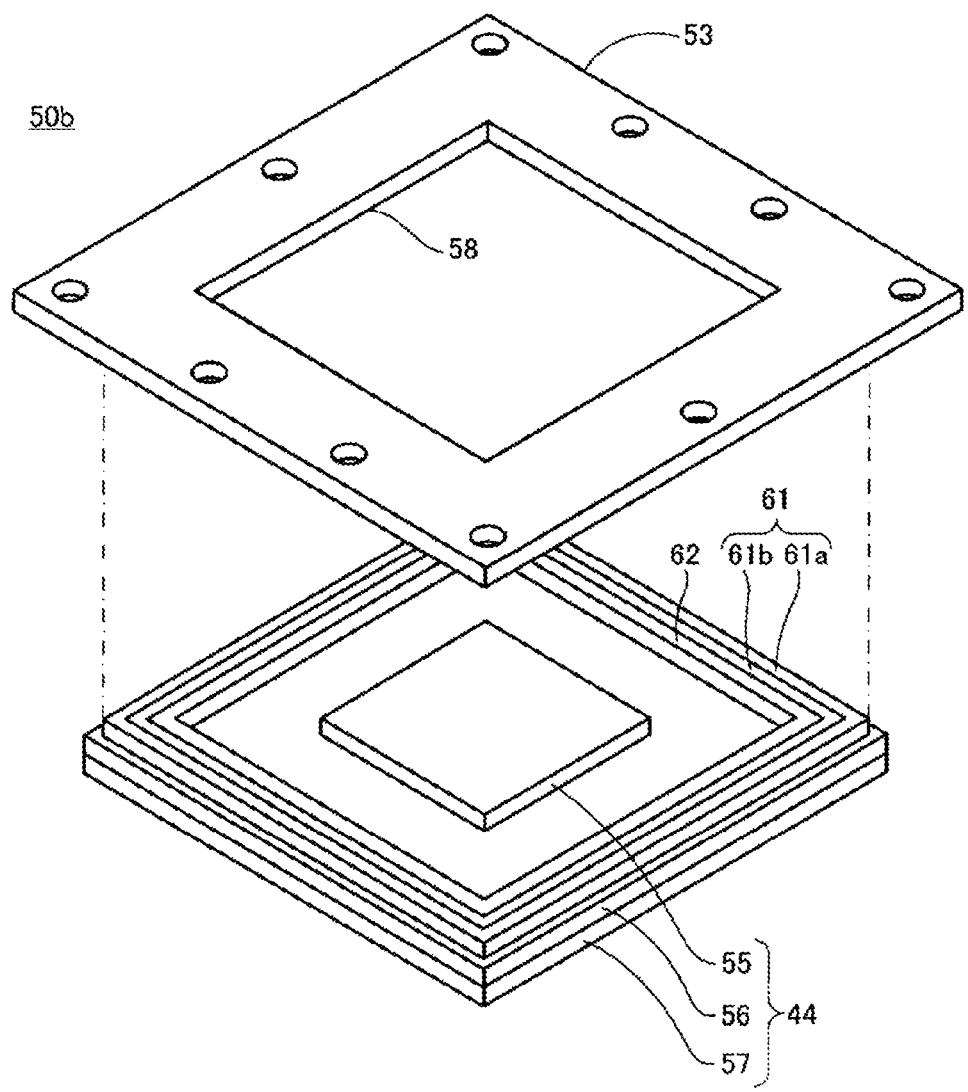
FIG. 12 Exploded perspective view showing, in an exploded condition, the fuel cell body 44 and the metal separator 53 (fuel cell with separator).

A second embodiment of the present invention will next be described. FIG. 11 is a sectional view of a fuel cell 40b according to the second embodiment. FIG. 12 is an exploded perspective view showing, in an exploded condition, the fuel cell body 44 and the metal separator 53 (fuel cell with separator 50b) according to the second embodiment.

In the fuel cell 40b, the joint part 61 is divided into a joint portion 61a disposed away from the opening 58, and a joint portion 61b disposed closer to the opening 58 than is the joint portion 61a. Also, a material of the joint portion 61b is lower in oxygen diffusion coefficient than a material of the joint portion 61a.

The joint portion 61b lower in oxygen diffusion coefficient than the joint portion 61a is disposed between the sealing part 62 and the joint portion 61a. That is, even though there exists oxidizer gas which has passed through the sealing part 62, since the joint portion 61b is low in oxygen diffusion coefficient, the joint portion 61b can restrain oxidizer gas from reaching the joint portion 61a. As a result, diffusion of oxygen in the joint portion 61a is restrained, whereby the generation of voids in the joint portion 61a caused by oxygen, etc., can be prevented; thus, reliability in joining the fuel cell 40b and the metal separator 53 can be improved.

For example, various brazing filler metals which contain Ag as a main component, such as the following materials 1) and 2), can be employed for forming the joint portion 61a.
1) Ag brazing filler metal which contains $Cr_2O_3$ (e.g., 1% by weight to 5% by weight) (Ag—$Cr_2O_3$ brazing filler metal).
2) Ag brazing filler metal which contains Pd (e.g., 2% by mass to 30% by mass, preferably 3% by mass to 10% by mass) (Ag—Pd brazing filler metal).

Material for the joint portion 61b can be selected as appropriate according to material (oxygen diffusion coefficient) for the joint portion 61a. Example materials for the joint portion 61b include Ni, Pt, and Au. Of these materials, Ni and Pt are preferred, since oxygen diffusion barrier properties are high (the oxygen diffusion coefficient is low). Particularly, Pt is further preferred as a diffusion barrier to oxygen, since oxidation does not progress under a condition of joining by use of Ag brazing filler metal in the atmosphere.

The fuel cell with separator according to a modification of the second embodiment can be manufactured by use of a method corresponding to manufacturing method A or B.

Specifically, in step S11 of manufacturing method A, two kinds of brazing filler metals corresponding to the joint portions 61a and 61b are disposed on both of the fuel cell body 44 and the metal separator 53. Subsequently, the sealing material 621 is disposed (a step corresponding to step S12), followed by application of heat to melt the two kinds of brazing filler metals and the sealing material for performing joining and sealing (a step corresponding to step S13).

In a method corresponding to manufacturing method B, the joint portions 61a and 61b and the seal part 62 are formed sequentially. In this case, preferably, in the descending order of melting point, materials for the joint portions 61a and 61b and the seal part 62 are disposed, and the joint portions 61a and 61b and the seal part 62 are formed (through application of heat).

Third Embodiment

Figure 13:
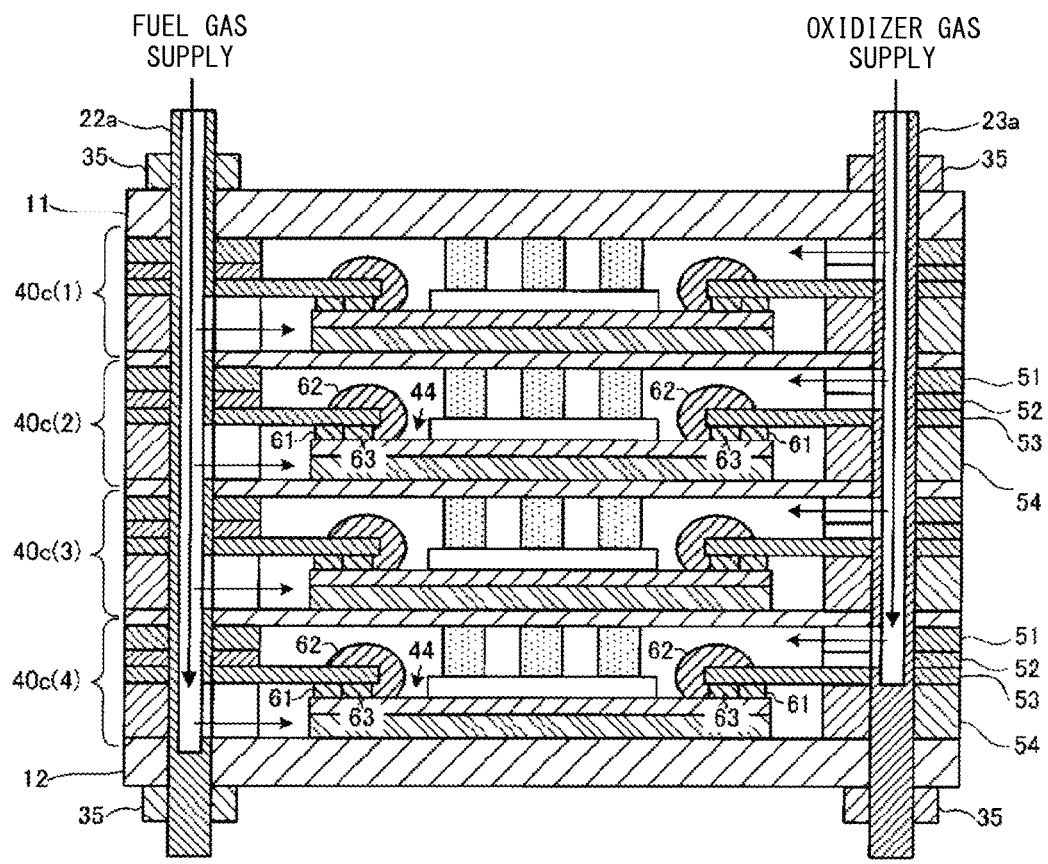
FIG. 13 Schematic sectional view of the solid oxide fuel cell stack 10 according to a third embodiment of the present invention.
Figure 14:
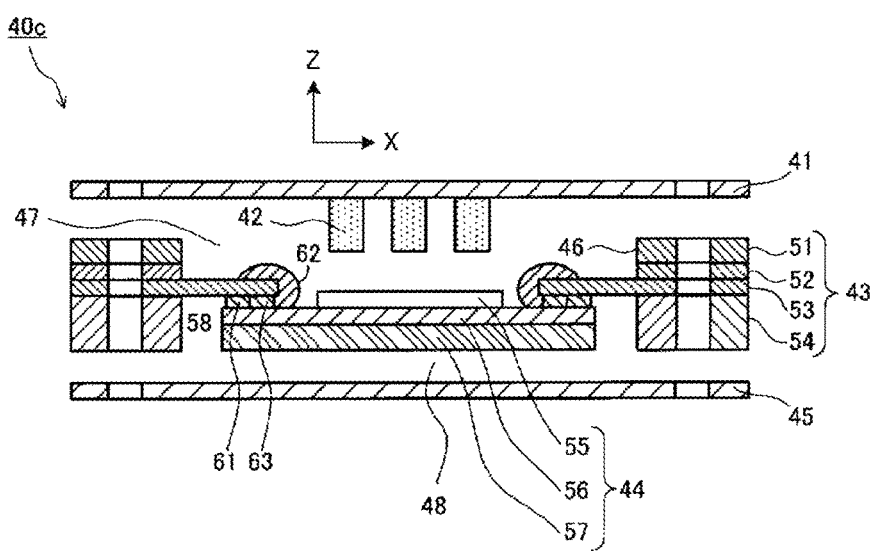
FIG. 14 Sectional view of a fuel cell 40c.
Figure 15:
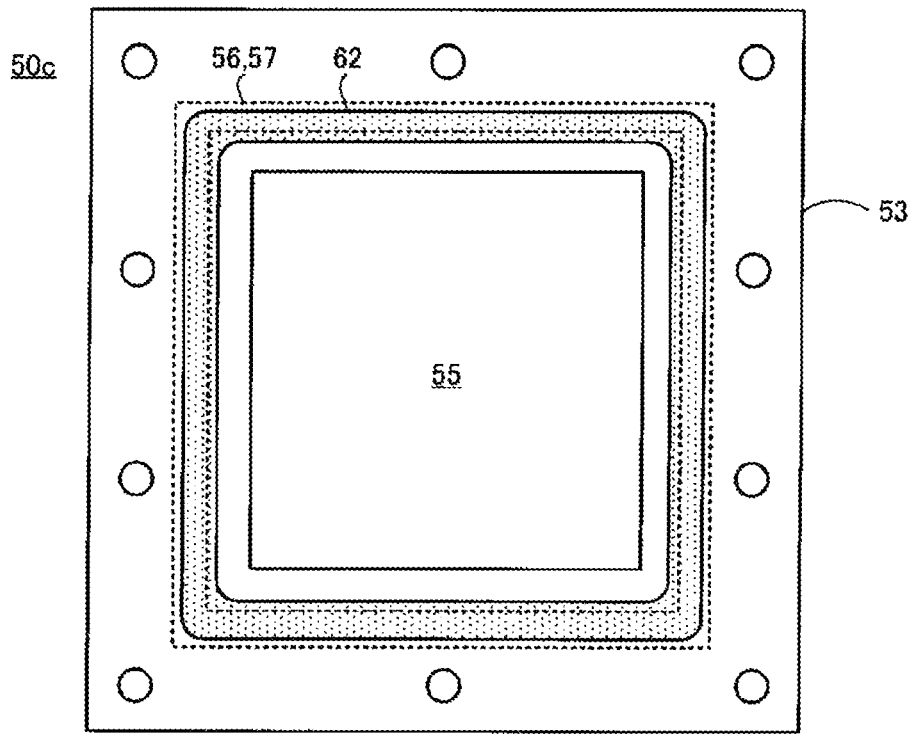
FIG. 15 Top view of a fuel cell with separator 50c.

A third embodiment of the present invention will next be described. FIG. 13 is a schematic sectional view of the solid oxide fuel cell stack 10 according to the third embodiment. FIG. 14 is a sectional view of a fuel cell 40c according to the third embodiment. FIG. 15 is a top view showing the fuel cell body 44 and the metal separator 53 (fuel cell with separator 50c) according to the third embodiment.

In the present embodiment, the joint part 61 and the sealing part 62 (including a mixed layer 63) are disposed between the fuel cell body 44 and the metal separator 53, thereby forming a fuel cell with separator 50c. Along the opening 58, the lower surface of the metal separator 53 and the upper surface of the solid electrolyte layer 56 are joined by the joint part 61, and the sealing part 62 (including the mixed layer 63) provides a seal between the lower surface and the upper surface.

The metal separator 53 is formed of a metal material which contains iron (Fe) and chromium (Cr) as main components. Preferably, the metal separator 53 contains Al. An alumina film is formed on the surface of the metal separator 53, whereby oxidation resistance is improved. Also, an affinity for the Al-containing Ag brazing filler metal of the joint part 61 becomes good, whereby joining strength can be ensured.

Preferably, the metal separator 53 contains Al in an amount of 1% by weight to less than 10% by weight (e.g., 3% by weight). At an Al content of less than 1% by weight, in joining through the joint part 61 (glass joining), the alumina film and glass partially react with each other; as a result, Al is exhausted, resulting in a deterioration in oxidation resistance. Also, the metal separator 53 having an Al content of 10% by weight or more becomes hard and thus difficulty is encountered in working and relaxing stress (the fuel cell body 44 may possibly crack in performing joining by use of Ag brazing filler metal).

Preferably, the metal separator 53 has a thickness of 0.5 mm or less (e.g., 0.1 mm). If the thickness exceeds 0.5 mm, a thermal expansion difference arises due to temperature distribution in the metal separator 53. Also, in the course of forming the solid fuel cell stack 10, stress applied to the joint part 61 and the sealing part 62 which connect the fuel cell body 44 and the metal separator 53 is not relaxed, potentially resulting in the occurrence of damage to (cracking of) the joint part 61 and the sealing part 62.

The joint part 61 is formed of Ag-containing brazing filler metal, is disposed along the entire perimeter of the opening 58, and joins the fuel cell body 44 and the metal separator 53. The joint part 61 (Ag brazing filler metal) has, for example, a width of 2 mm to 6 mm and a thickness of 10 μm to 80 μm.

Various brazing filler metals which contain Ag as a main component can be employed for forming the joint part 61. For example, a preferred brazing filler metal is a mixture of Ag and an oxide (e.g., a mixture of Ag and an oxide of Al or In ($Al_2O_3$ or $In_2O_3$). As mentioned above, in the case where the metal separator 53 contains Al, an alumina ($Al_2O_3$) film is formed on the surface of the metal separator. In this case, an oxide (e.g., an oxide of Al or In) contained in the joint part 61 (brazing filler metal) has a high affinity for the alumina film formed on the metal separator 53, whereby sufficient joining strength can be ensured. Also, by virtue of the joint part 61 (brazing filler metal) containing an oxide (e.g., an oxide of Al or In), the thermal expansion coefficient of the brazing filler metal reduces, whereby the occurrence of damage to (e.g., cracking of) the sealing part 62 can be restrained.

Also, an alloy of Ag and another metal (e.g., Ag—Ge—Cr, Ag—Ti, or Ag—Al) can be used as the brazing filler metal.

Even in the air atmosphere, an Ag-containing brazing filler metal (Ag brazing filler metal) is unlikely to be oxidized at a brazing temperature. Thus, Ag brazing filler metal is preferred in view of process efficiency, since the fuel cell body 44 and the metal separator 53 can be joined in the air atmosphere.

Preferably, an oxide contained in the joint part 61 has an oxygen dissociation pressure lower than $1 \times 10^{-13}$ Pa at 800° C. During operation of a fuel cell stack, generally, a hydrogen reduction atmosphere is established in the sealing part 62 (glass-containing sealing material); accordingly, the oxide may undergo reduction. In order to prevent the reduction, the oxygen dissociation pressure of the oxide contained in the joint part 61 (Ag-containing brazing filler metal) is rendered lower than the oxygen dissociation pressure of hydrogen ($1 \times 10^{-13}$ Pa at 800° C.).

The sealing part 62 is formed of, for example, glass, glass-ceramic (crystallized glass), or a composite of glass and ceramic and provides a seal between the fuel cell body 44 and the metal separator 53. The sealing part 62 is disposed closer to the opening 58 (cathode) than is the joint part 61 along the entire perimeter of the opening 58.

Since the sealing part 62 is disposed closer to the opening 58 (inner perimeter) than is the joint part 61, the joint part 61 is free from contact with oxidizer gas; i.e., movement of oxygen from the oxidizer gas channel 47 to the joint part 61 is suppressed. As a result, gas leakage can be prevented, which could otherwise result from generation of voids in the joint part 61 as a result of reaction of hydrogen and oxygen. Furthermore, since the sealing part 62 is disposed between the metal separator 53 and the fuel cell body 44, thermal stress acting on the sealing part 62 becomes shear stress rather than tensile stress. Thus, the sealing material becomes unlikely to crack, and there can be restrained separation at the interface between the sealing part 62 and the metal separator 53 or the fuel cell body 44, whereby the reliability of the sealing part 62 can be improved.

The sealing part 62 has, for example, a width of 1 mm to 4 mm and a thickness of 80 µm to 200 µm.

Herein, the sealing part 62 is disposed on the upper surface and on the side surface (within the opening 58) of the metal separator 53, thereby enhancing the strength of connecting the sealing part 62 and the metal separator 53. However, as will be described later, even though the sealing part 62 is not disposed on the upper surface and the side surface of the metal separator 53, the sealing part 62 can improve the reliability of the joint part 61.

A portion of the sealing part 62 located toward the joint part 61 assumes the form of the mixed layer 63 disposed between the joint part 61 and the sealing part 62.

The mixed layer 63 contains both of a constituent material (Ag) of the joint part 61 and a constituent material (glass) of the sealing part 62. As a result, the mixed layer 63 has intermediate properties (e.g., thermal expansion coefficient) between the joint part 61 and the sealing part 62, so that the thermal expansion difference between the sealing part 62 and the joint part 61 is relaxed, and thus the occurrence of damage to (e.g., cracking of) the sealing part 62 can be prevented.

Generally, in many cases, the joint part 61 (Ag-containing brazing filler metal) is flexible, but is high in thermal expansion coefficient. As a result, there is generated thermal stress between the joint part 61 and the sealing part 62 being caused by the difference in thermal expansion between the joint part 61 and the sealing part 62, potentially resulting in the occurrence of damage to (e.g., cracking of) the sealing part 62. The mixed layer 63 is disposed between the joint part 61 and the sealing part 62 for relaxing thermal stress, whereby the occurrence of damage to (e.g., cracking of) the sealing part 62 is prevented.

In the mixed layer 63, preferably, Ag content is highest at a portion located toward the joint part 61.

No precipitous change in Ag content arises at the interface between the joint part 61 (Ag-containing brazing filler metal) and the mixed layer 63, thereby relaxing thermal stress at the interface. Preferably, Ag content increases stepwise or continuously between the joint part 61 and the mixed layer 63. Through employment of such Ag content feature, properties such as thermal expansion coefficient change stepwise or continuously between the mixed layer 63 and the joint part 61, thereby relaxing thermal stress.

Preferably, the sealing part 62 has a thermal expansion coefficient of 8 ppm/K to 12 ppm/K within a temperature range of room temperature to 300° C., and the mixed layer 63 has a width of 50 µm or more. Through impartment to the sealing part 62 of a thermal expansion coefficient of the range and impartment to the mixed layer 63 of a width of the range, a thermal expansion difference is relaxed, whereby the occurrence of damage to (e.g., cracking of) the sealing part can be prevented.

(Definition of Width of Mixed Layer 63)

Figure 16:
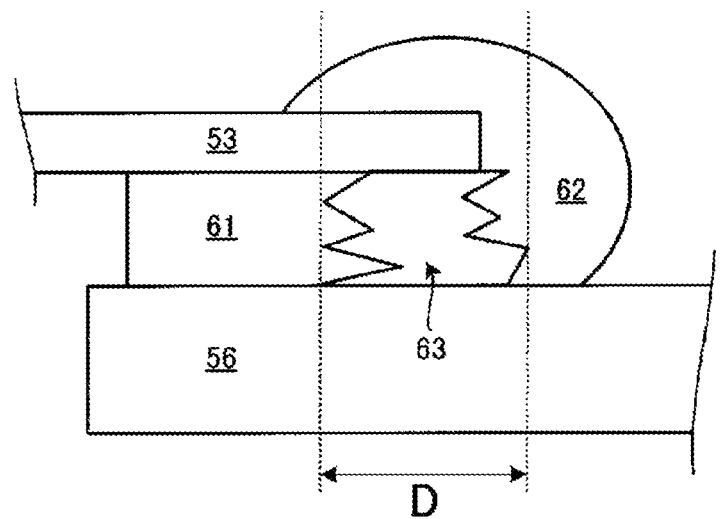
FIG. 16 Enlarged fragmentary sectional view showing a mixed layer 63 and its periphery of an example of the fuel cell 40c.
Figure 17:
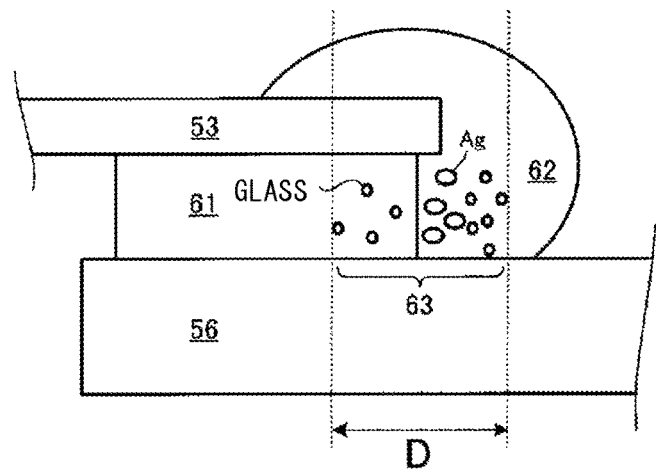
FIG. 17 Enlarged fragmentary sectional view showing the mixed layer 63 and its periphery of another example of the fuel cell 40c.

FIGS. 16 and 17 show, on an enlarged scale, the mixed layer 63 and its periphery. In FIG. 16, the boundary between the joint part 61 and the mixed layer 63 and the boundary between the mixed layer 63 and the sealing part 62 have complicated shapes and cannot be represented by simple planes. In FIG. 17, the boundary between the joint part 61 and the mixed layer 63 and the boundary between the mixed layer 63 and the sealing part 62 cannot be clearly indicated. The boundary exists between the joint part 61 and the sealing part 62. A portion of the joint part 61 contains glass (e.g., Si, Al, Mg, Ba, and Ca), and a portion of the sealing part 62 contains Ag. As a result, the mixed layer 63 exists in such a manner as to extend into the joint part 61 and into the sealing part 62.

The boundary of the mixed layer 63 is not necessarily clear as mentioned above, since the mixed layer 63 has an intermediate composition between the joint part 61 and the sealing part 62. If the composition changes discontinuously between the mixed layer 63 and the joint part 61 and between the mixed layer 63 and the sealing part 62, a boundary is likely to be recognized rather clearly. By contrast, if the composition changes continuously between the mixed layer 63 and the joint part 61 and between the mixed layer 63 and the sealing part 62, a clear boundary does not exist.

Even though the boundary of the mixed layer 63 is not clear as mentioned above, width D of the mixed layer 63 can be determined. That is, the width of a region where both of Ag and glass exist can be defined as the width D of the mixed layer 63.

Specifically, by use of an electron probe micro analyzer (EPMA), surface analysis is performed on a vertical section of the fuel cell body 44 to find out a limit point at which Ag becomes undetectable (0.1% by weight (detection limit of EPMA) or less), and a limit point at which glass becomes undetectable (0.1% by weight (detection limit of EPMA) or less).

The distance between the point at which Ag on the fuel cell body 44 side becomes undetectable and the point at which glass on the metal separator 53 side becomes undetectable is defined as the width D of the mixed layer 63. In view of variation of the distribution of the mixed layer 63, 10 sections are cut from the fuel cell with separator 50; the widths of the mixed layers 63 in the sections are measured; and the average of the measured widths is defined as the width D of the mixed layer 63 of the fuel cell with separator 50.

(Forming Fuel Cell with Separator 50*c*)

The fuel cell with separator 50*c* having the mixed layer 63 can be formed as follows.

Figure 18A:
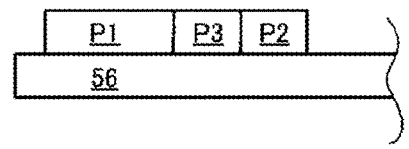
FIG. 18A Sectional view showing a condition of a fuel cell with separator in the process of manufacture.

(1-1) Ag brazing filler metal paste P1, glass-Ag-brazing-filler-metal mixed paste P3, and glass paste P2 are printed adjacent to each other on the fuel cell body 44 (see FIG. 18A).

Figure 18B:
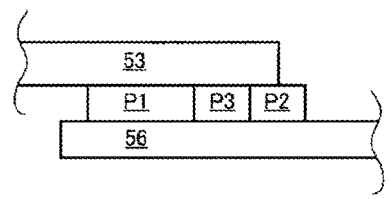
FIG. 18B Sectional view showing a condition of the fuel cell with separator in the process of manufacture.
Figure 18C:
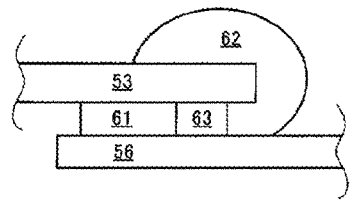
FIG. 18C Sectional view showing a condition of the fuel cell with separator in the process of manufacture.

(1-2) The fuel cell body 44 and the metal separator 53 are brought into contact with each other (see FIG. 18B), followed by application of heat (e.g., 1,000° C.) to join the fuel cell body 44 and the metal separator 53 and to provide a seal therebetween (see FIG. 18C). The Ag brazing filler metal allows brazing in the atmosphere.

Figure 19A:
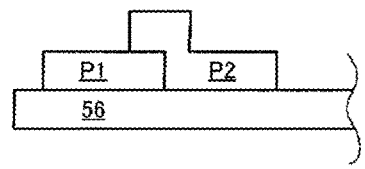
FIG. 19A Sectional view showing a condition of the fuel cell with separator in the process of manufacture.

(2-1) The Ag brazing filler metal paste P1 is printed on the fuel cell body 44; subsequently, glass paste P2 is printed in such a manner as to overlap the applied Ag brazing filler metal paste P1 (see FIG. 19A). In place of printing Ag brazing filler metal paste P1, Ag brazing filler metal foil may be disposed.

Figure 19B:
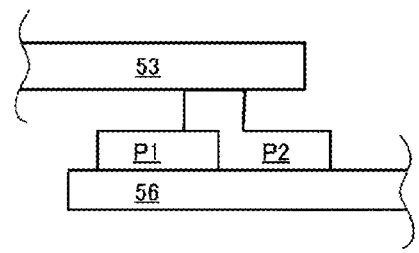
FIG. 19B Sectional view showing a condition of the fuel cell with separator in the process of manufacture.
Figure 19C:
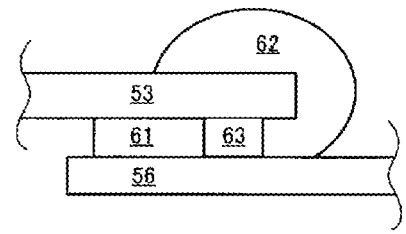
FIG. 19C Sectional view showing a condition of the fuel cell with separator in the process of manufacture.

(2-2) The fuel cell body 44 and the metal separator 53 are brought into contact with each other (see FIG. 19B), followed by application of heat (e.g., 1,000° C.) to join the fuel cell body 44 and the metal separator 53 and to provide a seal therebetween (see FIG. 19C). The Ag brazing filler metal allows brazing in the atmosphere.

Modification of Third Embodiment

Figure 20:
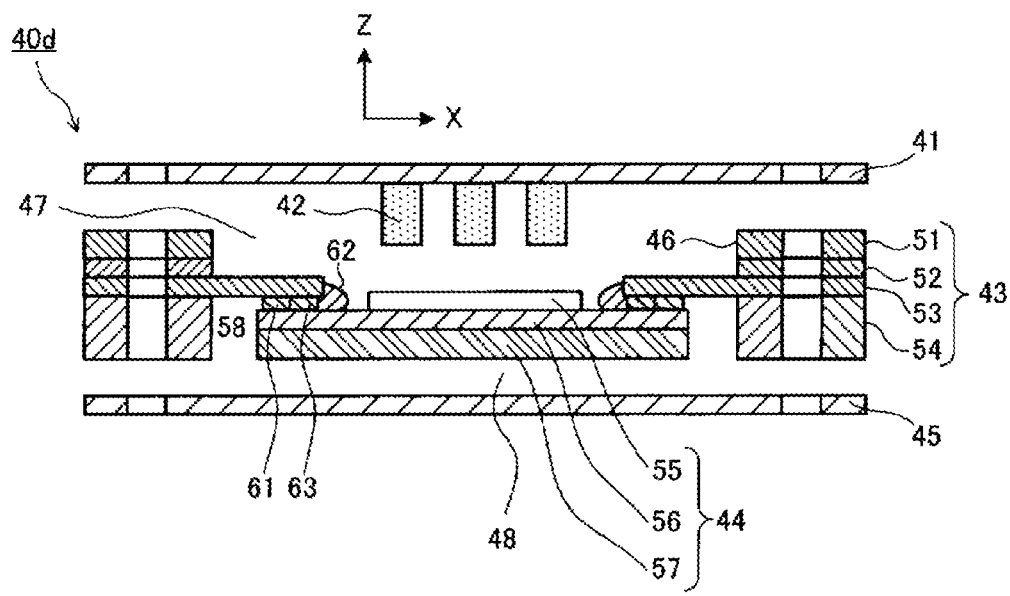
FIG. 20 Sectional view of a fuel cell 40d according to modification 1 of the third embodiment.

Modifications 1 and 2 of the third embodiment will next be described. FIGS. 20 and 21 are sectional views of fuel cells 40d and 40e according to modifications 1 and 2, respectively, of the third embodiment.

In the fuel cell 40d, the sealing part 62 is not disposed on the upper surface of the metal separator 53. In the fuel cell 40e, the sealing part 62 is disposed only on the lower surface of the metal separator 53 (the sealing part 62 does not extend externally of the metal separator 53). In this manner, even though the sealing part 62 is not disposed on the upper surface and on the side surface of the metal separator 53, the sealing part 62 can improve the reliability of the joint part 61.

Examples

The samples of the fuel cell with separator 50c are prepared and subjected to a hydrogen test (heating test in hydrogen/air) and a heat cycle test.

FIG. 22 is a sectional view showing a condition of the hydrogen test (heating test in hydrogen/air). The fuel cell with separator 50c is fixed to the end of a pipe 71 by use of a Swagelok joint 72. A mixed gas of hydrogen and steam (H2+H2O) is supplied into the pipe 71; the atmosphere exists externally of the pipe 71; and the fuel cell with separator 50c is heated to 850° C. If sealing provided by the sealing part 62 is insufficient, hydrogen in the pipe 71 and oxygen in the atmosphere diffuse and bond together in the joint part 61, resulting in the possibility of generation of voids.

FIGS. 23 and 24 are tables showing the results of the 500-hour and 1,000-hour hydrogen tests (heating tests in hydrogen/air), respectively.

The metal separator 53 is formed of a metal which contains Fe, Cr, and Al. The Al content was varied in a range of 0.5% by weight to 13% by weight by varying the Cr content in a range of 10% by weight to 22% by weight.

The joint part 61 is formed of Ag—$Al_2O_3$ (a mixture of Ag and $Al_2O_3$ (alumina)). The joint part 61 had a thickness of 10 μm to 80 μm and a width of 2 mm to 6 mm.

The sealing part 62 is formed of Ba—Al—Si—O-containing glass. The sealing part 62 has a thickness of 80 μm to 200 μm and a width of 1 mm to 4 mm. Some samples have the sealing part 62, whereas other samples do not have the sealing part 62.

The mixed layer 63 is formed of a mixture of Ag and Ba—Al—Si—O-containing glass. The mixed layer 63 has a thickness of 10 μm to 80 μm and a width of 50 μm to 100 μm.

In the test, the samples which have the sealing part 62 and in which the metal separator 53 contains Al in an amount of 1% by weight to 10% by weight exhibit good results. The existence of the sealing part 62 can prevent the generation of voids. Also, the metal separators 53 having an Al content of 1% by weight to 10% by weight exhibit good durability.

If the sealing part 62 does not exist, voids are generated; as a result, the sealing part 62 is likely to suffer leakage.

The metal separator 53 having an Al content of 13% by weight is hard; as a result, in performing brazing, the fuel cell body 44 is apt to break. Also, the metal separator 53 having an Al content of 0.5% by weight is oxidized, resulting in the generation of leakage.

FIG. 25 is a table showing the results of execution of both of the heat cycle test (heat cycle test in the atmosphere) and the hydrogen test (heating test in hydrogen/air).

The metal separator 53 is formed of a metal which contains Fe, Cr, and Al. The Cr and Al contents are 18% by weight and 3% by weight, respectively.

The joint part 61 is formed of Ag—$Al_2O_3$ (a mixture of Ag and $Al_2O_3$ (alumina)). The joint part 61 has a thickness of 10 μm to 80 μm and a width of 2 mm to 6 mm.

The sealing part 62 is formed of Ba—Al—Si—O-containing glass. The sealing part 62 has a thickness of 80 μm to 200 μm and a width of 1 mm to 4 mm. Samples which differ in thermal expansion coefficient are prepared by varying the Si/Ba compositional ratio.

The mixed layer 63 is formed of a mixture of Ag and Ba—Al—Si—O-containing glass. The mixed layer 63 has a thickness of 10 μm to 80 μm and a width of 10 μm to 150 μm.

In the heat cycle test, the following heat cycle is repeated 10 times: the fuel cell with separator 50c is heated within an electric furnace (at a rate of temperature increase of 5° C./min), is held at 800° C. for 5 hours, and is then cooled within the electric furnace. Subsequently, the 500-hour hydrogen test (heating test in hydrogen/air) is conducted.

Good test results were exhibited at a thermal expansion coefficient of the sealing part 62 of 8 ppm/K to 12 ppm/K and a width D of the mixed layer 63 of 50 μm or more.

Fourth Embodiment

Figure 26:
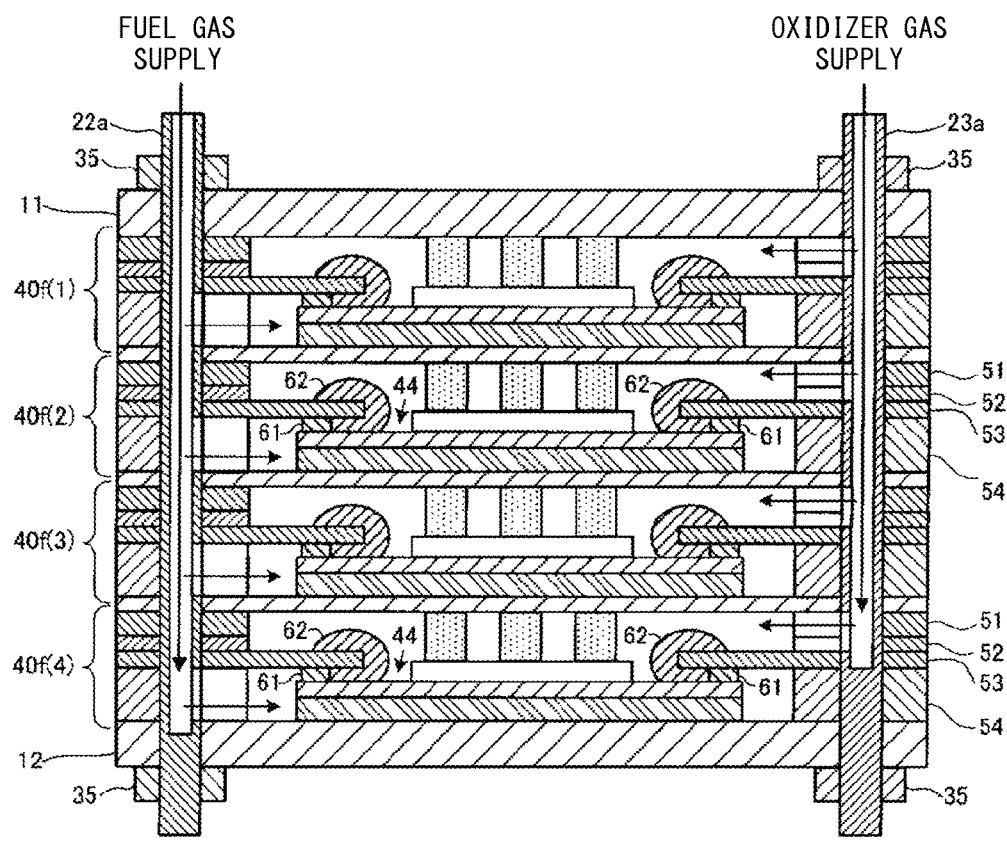
FIG. 26 Schematic sectional view of the solid oxide fuel cell stack 10 according to a fourth embodiment of the present invention.
Figure 27:
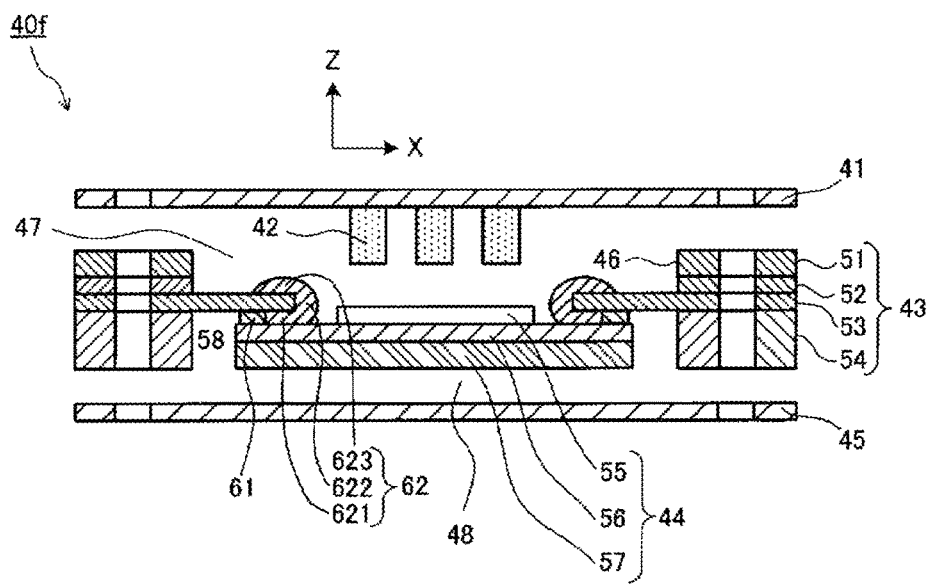
FIG. 27 Sectional view of a fuel cell 40f.
Figure 28:
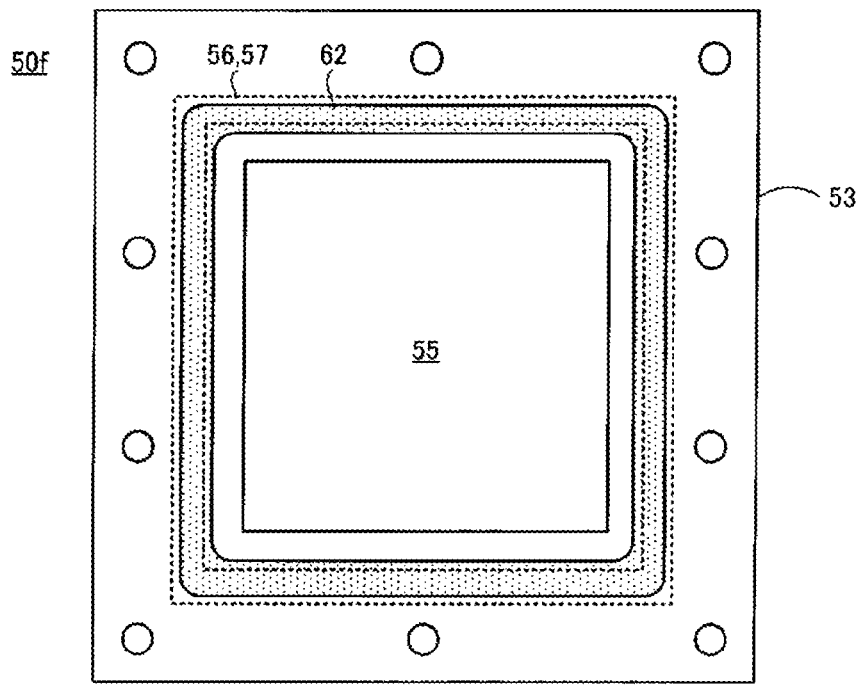
FIG. 28 Top view of a fuel cell with separator 50f.

A fourth embodiment of the present invention will next be described. FIG. 26 is a schematic sectional view of the solid oxide fuel cell stack 10 according to the fourth embodiment. FIG. 27 is a sectional view of a fuel cell 40f according to the fourth embodiment. FIG. 28 is a top view showing the fuel cell body 44 and the metal separator 53 (fuel cell with separator 50f) according to the fourth embodiment.

In the present embodiment, the joint part 61 and the sealing part 62 are disposed between the fuel cell body 44 and the metal separator 53, thereby forming a fuel cell with separator 50f. Along the opening 58, the lower surface of the metal separator 53 and the upper surface of the solid electrolyte layer 56 are joined by the joint part 61, and the sealing part 62 provides a seal between the lower surface and the upper surface.

The metal separator 53 is formed of a metal material which contains iron (Fe) and chromium (Cr) as main components and Al. As a result, an alumina film is formed on the surface of the metal separator 53, whereby oxidation resistance is improved. Also, an affinity for the Al-containing Ag brazing filler metal of the joint part 61 and the Al-containing glass of the sealing part 62 becomes good, whereby joining strength, and airtightness of the seal (gapless seal at the interface with the metal separator 53) can be ensured.

Preferably, the metal separator 53 contains Al in an amount of 1.5% by mass to less than 10% by mass (e.g., 3% by mass). This is for the following reason: at an Al content of less than 1.5% by mass, in joining through the joint part 61 (glass joining), the alumina film and glass partially react with each other; as a result, Al is apt to be exhausted, resulting in a deterioration in oxidation resistance (at an amount of addition of Al of less than 1 wt. %, Al is exhausted in a short period of time; therefore, the effect of oxidation resistance cannot be expected).

In view of resistance to exhaustion of Al, preferably, the metal separator 53 contains Al in an amount of 2% by mass or more. Meanwhile, the metal separator 53 having an Al content of 10% by mass or more becomes hard and thus difficulty is encountered in working and relaxing stress.

Also, if the Al content is 1.5% by mass or more, an affinity is established between the alumina film of the metal separator 53 and an Al-containing oxide contained in the joint part 61 (Ag brazing filler metal), thereby producing an anchoring effect and thus enhancing joining.

Preferably, the metal separator 53 has a thickness of 0.5 mm or less (e.g., 0.1 mm). If the thickness exceeds 0.5 mm, in forming the solid oxide fuel cell stack 10, stress applied to the joint part 61 and the sealing part 62 which connect the fuel cell body 44 and the metal separator 53 is not relaxed, potentially resulting in the occurrence of damage to (cracking of) the joint part 61 and the sealing part 62.

The joint part 61 has, for example, a width of 2 mm to 6 mm and a thickness of 10 μm to 80 μm, is disposed along the entire perimeter of the opening 58, and joins the fuel cell body 44 and the metal separator 53.

Preferably, the joint part 61 is formed of a brazing filler metal (Ag brazing filler metal) which contains Ag as a main component and an oxide or compound oxide of Al. Examples of such a brazing filler metal include an alloy which contains Ag, and a filler which is stable even in a reducing atmosphere, such as $Al_2O_3$, an Al-containing spinel-type oxide (e.g., $MgAl_2O_4$), or mullite (a compound of aluminum oxide with silicon dioxide), and an alloy which contains Ag and at least Al as additive. They may be combined.

Preferably, in the joining step, the brazing filler metal is melted in the atmosphere for brazing, since a material used to form the cathode 55 changes in characteristics in a vacuum or a reducing atmosphere. Ag is unlikely to be oxidized at a brazing temperature even in the air atmosphere. Thus, by use of Ag brazing filler metal, the fuel cell body 44 and the metal separator 53 can be joined in the air atmosphere.

Since an oxide or compound oxide of Al contained in the joint part 61 has an affinity for the alumina film formed on the surface of the metal separator 53 and serves as an anchoring material, joining strength is enhanced. At the same time, since wettability is improved, in brazing, there can be prevented a problem in that the metal separator 53 repels Ag brazing filler metal. Also, when the joint part 61 suffers sagging of brazing filler metal or misregistration, the joint part 61 must be brought into contact with the sealing part 62. Even in such a case, formation of a gap at the interface between Ag brazing filler metal and the sealing material can be prevented, since there is an affinity between Al-containing glass and an oxide or compound oxide of Al existing on the surface of Ag brazing filler metal.

The amount of addition of an oxide or compound oxide of Al in the joint part 61 is 1% by volume (more preferably, 2% by volume) to 25% by volume (more preferably, 15% by volume). If the amount of addition exceeds 25% by volume, the necking between Ag molecules in the joint part 61 weakens; as a result, strength weakens.

The sealing part 62 has, for example, a width of 1 mm to 4 mm and a thickness of 80 μm to 200 μm and is disposed closer to the opening 58 (inner perimeter) than is the joint part 61 along the entire perimeter of the opening 58. The sealing part 62 provides a seal between the fuel cell body 44 and the metal separator 53 in order to prevent the mixing of oxidizer gas existing in the opening 58 of the metal separator 53 and fuel gas existing externally of the opening 58. Since the sealing part 62 is disposed closer to the opening 58 than is the joint part 61, the joint part 61 is free from contact with oxidizer gas; i.e., movement of oxygen from the oxidizer gas channel 47 to the joint part 61 is suppressed. As a result, gas leakage can be prevented, which could otherwise result from generation of voids in the joint part 61 as a result of reaction of hydrogen and oxygen. Furthermore, since the sealing part 62 is disposed between the metal separator 53 and the fuel cell body 44, thermal stress acting on the sealing part 62 becomes shear stress rather than tensile stress. Thus, the sealing material becomes unlikely to crack, and there can be restrained separation at the interface between the sealing part 62 and the metal separator 53 or the fuel cell body 44, whereby the reliability of the sealing part 62 can be improved.

The sealing part 62 is formed of a glass-containing sealing material. The glass contains Al, Mg, and Zr (or their oxides ($Al_2O_3$, MgO, and $ZrO_2$).

Preferably, the glass contains Al in an amount of 1 wt. % (more preferably 2 wt. %) to 30 wt. % (more preferably 20 wt. %) as reduced to $Al_2O_3$. If the amount of addition of Al in glass is less than 1 wt. %, the joint part 61 and the alumina film of the metal separator 53 lose an affinity for Ag brazing filler metal; as a result, in performing sealing (heat treatment), the joint part 61 and the alumina film are apt to repel Ag brazing filler metal. If the amount of addition of $Al_2O_3$ exceeds 30 wt. %, the thermal expansion coefficient reduces; as a result, the thermal expansion difference between glass and the metal separator 53 potentially causes the occurrence of cracking of the sealing material.

The sealing part 62 can be divided into a sealing function portion 621, a restraint 623, and a connection 622. The sealing function portion 621 provides a seal between the metal separator 53 and the fuel cell body 44 to prevent oxidizer gas from coming into contact with the joint part 61. The restraint 623 is disposed on the upper surface (front surface) of the metal separator 53 at a position opposite the sealing function portion 621. Since the restraint 623 cancels stress being caused by the thermal expansion difference between the metal separator 53 and the sealing function portion 621, the separation of the metal separator 53 and the sealing function portion 621 can be prevented. The connection portion 622 connects the seal functioning portion 621 and the restraint 623. The connection of the sealing function portion 621 and the restraint 623 for their integration further improves reliability in joining and sealing.

(Modification 1)

Figure 29:
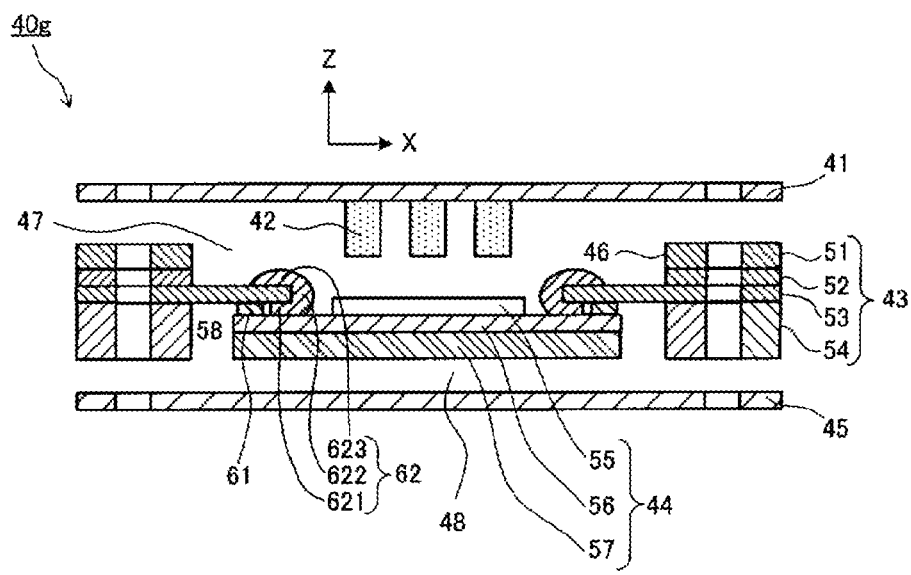
FIG. 29 Sectional view of a fuel cell 40g according to modification 1 of the fourth embodiment.

Modification 1 of the fourth embodiment will next be described. FIG. 29 is a sectional view of a fuel cell 40g according to modification 1 of the fourth embodiment.

The fuel cell 40g has a gap between the joint part 61 and the sealing part 62.

In this manner, even though the joint part 61 and the sealing part 62 are not in contact with each other, reliability in joining and sealing can be improved.

In the fuel cells 40f and 40g, the joint part 61 and the sealing part 62 are in contact with each other or have a gap therebetween along the entire perimeter of the opening 58. In its conceivable intermediate mode, the joint part 61 and the sealing part 62 are in contact with each other along a portion of the perimeter of the opening 58 and are not in contact with each other along another portion of the perimeter of the opening 58.

(Modification 2)

Figure 30:
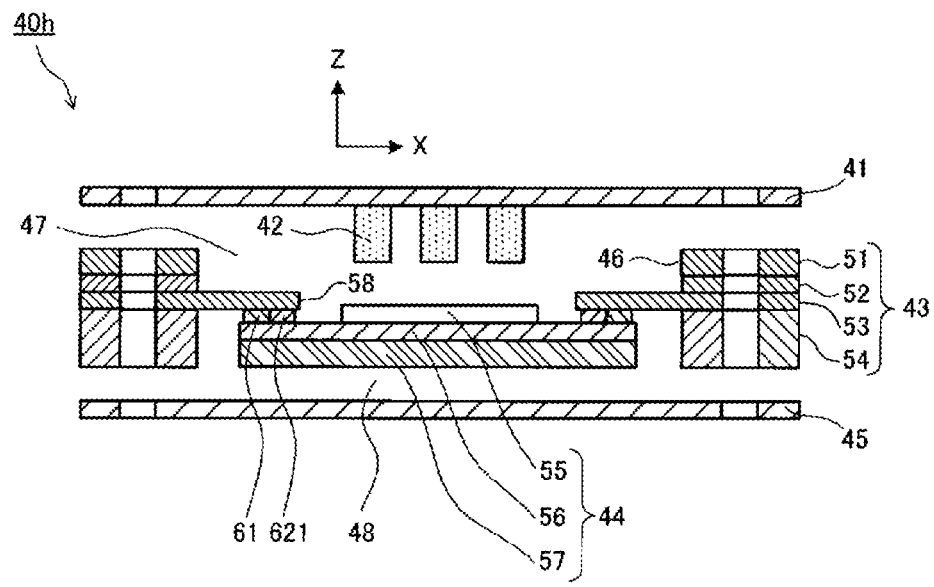
FIG. 30 Sectional view of a fuel cell 40h according to modification 2 of the fourth embodiment.

Modification 2 of the fourth embodiment will next be described. FIG. 30 is a sectional view of a fuel cell 40h according to modification 2.

The fuel cell 40h has only the seal functioning portion 621 and does not have the restraint 623 and the connection 622. In this manner, even though only the sealing function portion 621 is provided, reliability in joining and sealing can be improved.

(Modification 3)

Figure 31:
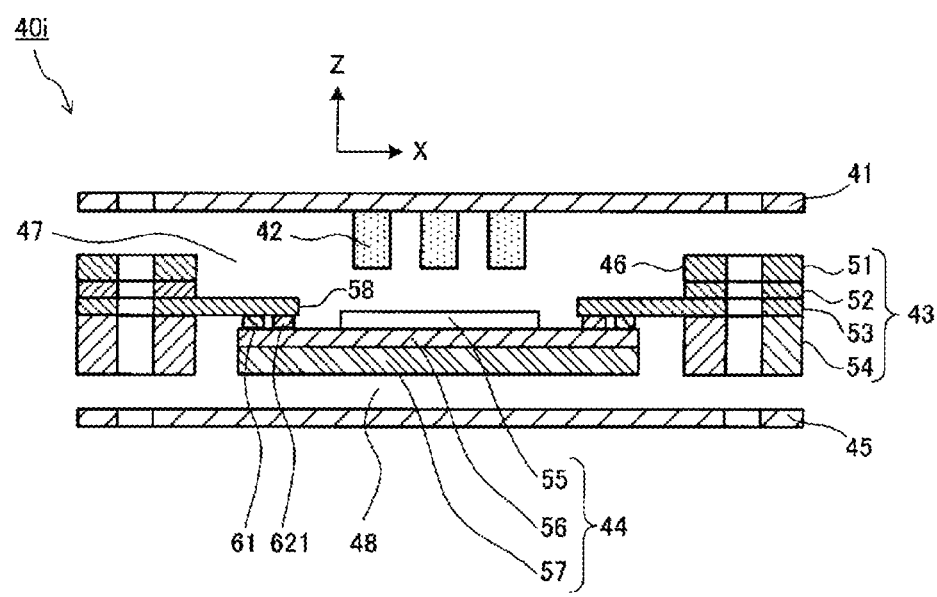
FIG. 31 Sectional view of a fuel cell 40i according to modification 3 of the fourth embodiment.

Modification 3 of the fourth embodiment will next be described. FIG. 31 is a sectional view of a fuel cell 40*i* according to modification 3.

The fuel cell 40*i* has a gap between the joint part 61 and the sealing function portion 621. In this manner, even though the joint part 61 and the sealing function portion 621 are not in contact with each other, reliability in joining and sealing can be improved.

(Modification 4)

Figure 32:
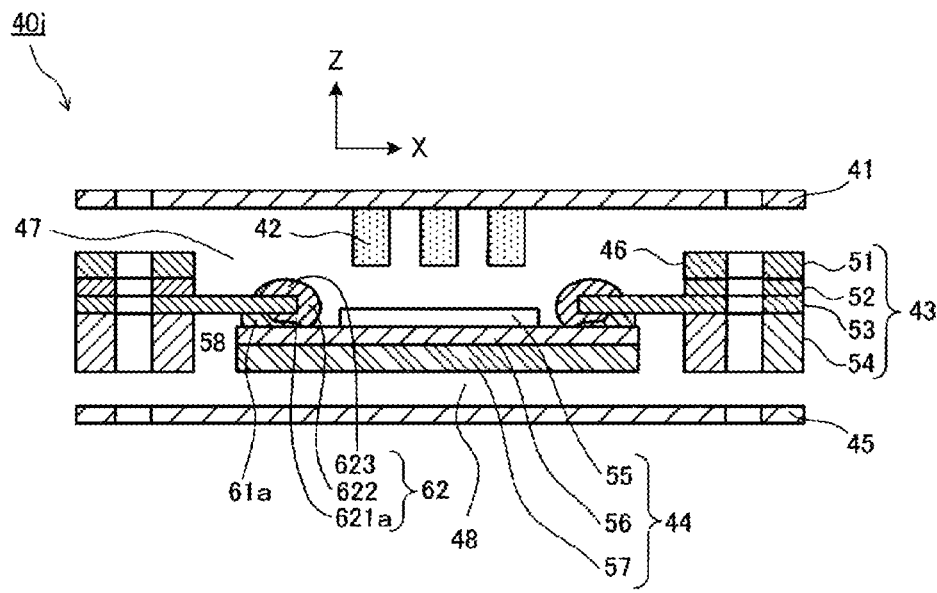
FIG. 32 Sectional view of a fuel cell 40j according to modification 4 of the fourth embodiment.

Modification 4 of the fourth embodiment will next be described. FIG. 32 is a sectional view of a fuel cell 40*j* according to modification 4.

In the fuel cell 40*j*, the boundary between the joint part 61 and the sealing part 62 is inclined. This inclination arises as a result of, for example, sagging of Ag brazing filler metal or misregistration in performing joining. As a result, the contact area between the metal separator 53 and the sealing part 62 reduces. Even in this case, since an affinity between the sealing material and the metal separator 53 is high, a sufficient seal is provided.

Examples

Figure 33:
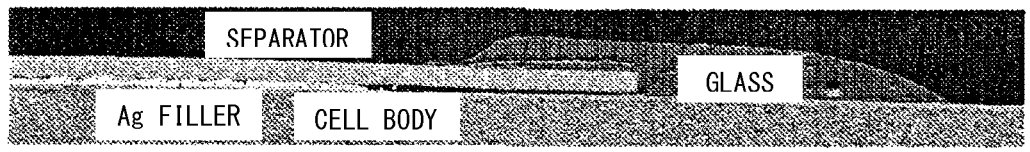
FIG. 33 Photo of the section of a fuel cell according to Example.
Figure 34:
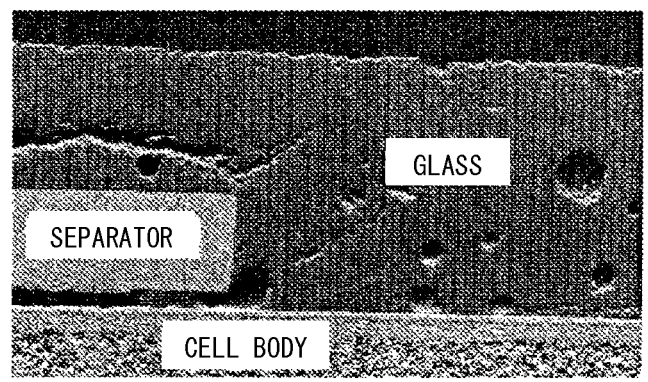
FIG. 34 Photo showing, on an enlarged scale, the section of the fuel cell according to Example.
Figure 35:
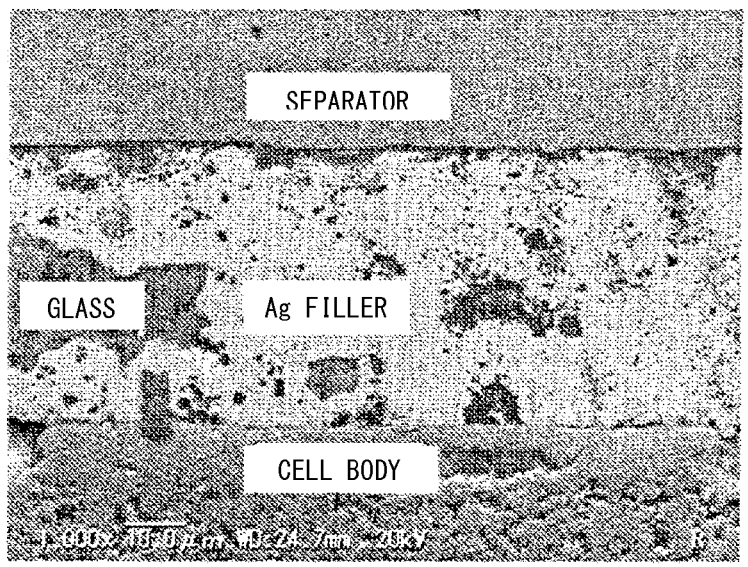
FIG. 35 Photo showing, on an enlarged scale, the section of the fuel cell according to Example.

FIGS. 33 to 35 are photos showing the section of a fuel cell according to Example. The degree of magnification increases in the order of FIGS. 33 to 35. In this Example, all of the metal separator 53, the joint part 61, and the sealing part 62 contain Al; the joint part 61 is formed of Ag brazing filler metal which contains $Al_2O_3$ powder as additive; and the sealing part 62 is formed of a sealing material of $Al_2O_3$-added glass.

As shown in FIGS. 34 and 35, the metal separator 53, the joint part 61, and the sealing part 62 are in contact with each other with no gap formed therebetween. An alumina film is formed on the metal separator 53, and, because of a good affinity between the film and glass, the metal separator 53 is joined without repelling glass. Also, because of a good affinity between the Al-containing film of the metal separator 53 and $Al_2O_3$ contained in Ag brazing filler metal, the metal separator 53 is joined to Ag brazing filler metal with no gap formed at the interface therebetween.

Comparative Example

Figure 36:
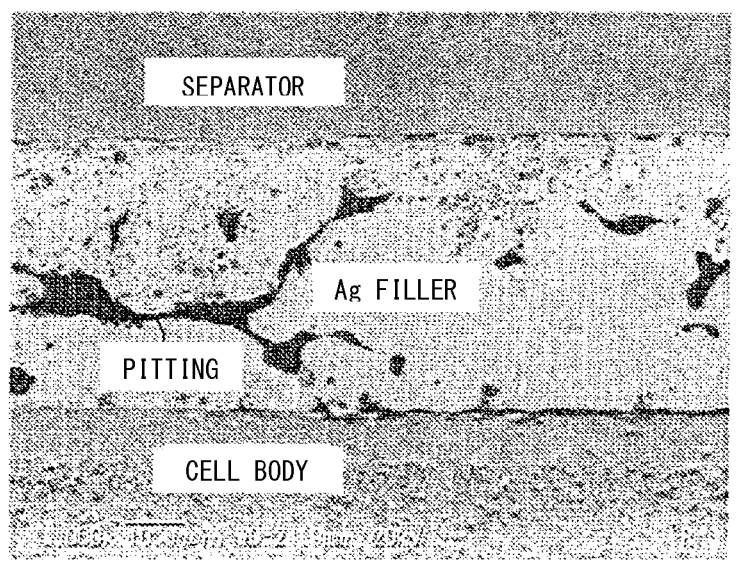
FIG. 36 Photo showing, on an enlarged scale, the section of a fuel cell according to Comparative Example.

FIG. 36 is a photo showing the section of a fuel cell according to Comparative Example. FIG. 36 is similar to FIG. 35 in the degree of magnification. In this Comparative Example, the fuel cell has the joint part 61, but does not have the sealing part 62. As shown in FIG. 36, as a result of the sealing part 62 being not provided, voids are likely to be generated in the joint part 61 due to diffusion and bonding of oxygen and hydrogen in the joint part 61.

FIG. 37 is a table showing the results of evaluation of those fuel cells which differ in the composition of the metal separator 53, the amount of addition of $Al_2O_3$ to Ag brazing filler metal, and the amount of addition of $Al_2O_3$ to glass.

In the "Repellence" columns of the table, the parenthesized letters indicate the following: S: repellence to separator; A: repellence to Ag brazing filler metal; and G: repellence to glass.

Evaluation items are as follows:

(1) Oxidation Resistance of Metal Separator 53

Oxidation resistance of the metal separator 53 is judged from whether or not abnormal oxidation is observed after an 850° C.-1,000-hour durability test in the atmosphere which contains steam.

(2) Deformability of Metal Separator 53

Deformability of the metal separator 53 is judged from whether or not a steel sheet material having a thickness t of 0.2 mm cracks after it is bent at 90° and then stretched.

(3) Repellence of Ag Brazing Filler Metal

The occurrence of repellence of Ag brazing filler metal is judged from whether or not repellence to the metal separator 53 is observed after joining (heat treatment) is performed by use of Ag brazing filler metal.

(4) Strength of Ag Brazing Filler Metal

The strength of Ag brazing filler metal is judged from whether or not a steel sheet material having a thickness t of 0.2 mm joined to the metal separator 53 at a joint (5 mm wide) separates from the metal separator 53 when peeling at the joint is attempted.

(5) Repellence of Glass

The occurrence of repellence of glass is judged from whether or not repellence to the metal separator 53 is observed after sealing (heat treatment) is performed by use of glass.

(6) Cracking of Glass

The occurrence of cracking of glass is judged by red check method.

The results of the above evaluation indicate that the following compositional features are preferred: the Al content of the metal separator 53 is 1.5% by weight to 10% by weight; the Al oxide content of Ag brazing filler metal is 1% by weight to 25% by weight; and the Al oxide content of glass is 1% by weight to 30% by weight.

When the Al content of the metal separator 53 is 0.5% by weight, oxidation resistance of the metal separator 53, the strength of joining the metal separator 53 to Ag brazing filler metal, and the affinity of the metal separator 53 for glass are not sufficient. When the Al content of the metal separator 53 is 1% by weight, the strength of joining the metal separator 53 to Ag brazing filler metal is not sufficient. When the Al content of the metal separator 53 is 13% by weight, the deformability of the metal separator 53 is not sufficient. When the Al oxide content of Ag brazing filler metal is 0.5% by weight, an affinity between Ag brazing filler metal and the metal separator 53 and between Ag brazing filler metal and glass, and the strength of joining Ag brazing filler metal to the metal separator 53 are not sufficient.

When the Al oxide content of Ag brazing filler metal is 28% by weight, the strength of joining Ag brazing filler metal to the metal separator 53 is not sufficient. When the Al oxide content of glass is 0.5% by weight, an affinity between glass and Ag brazing filler metal is not sufficient. When the Al oxide content of glass is 35% by weight, glass is apt to crack.

Fifth Embodiment

Figure 38:
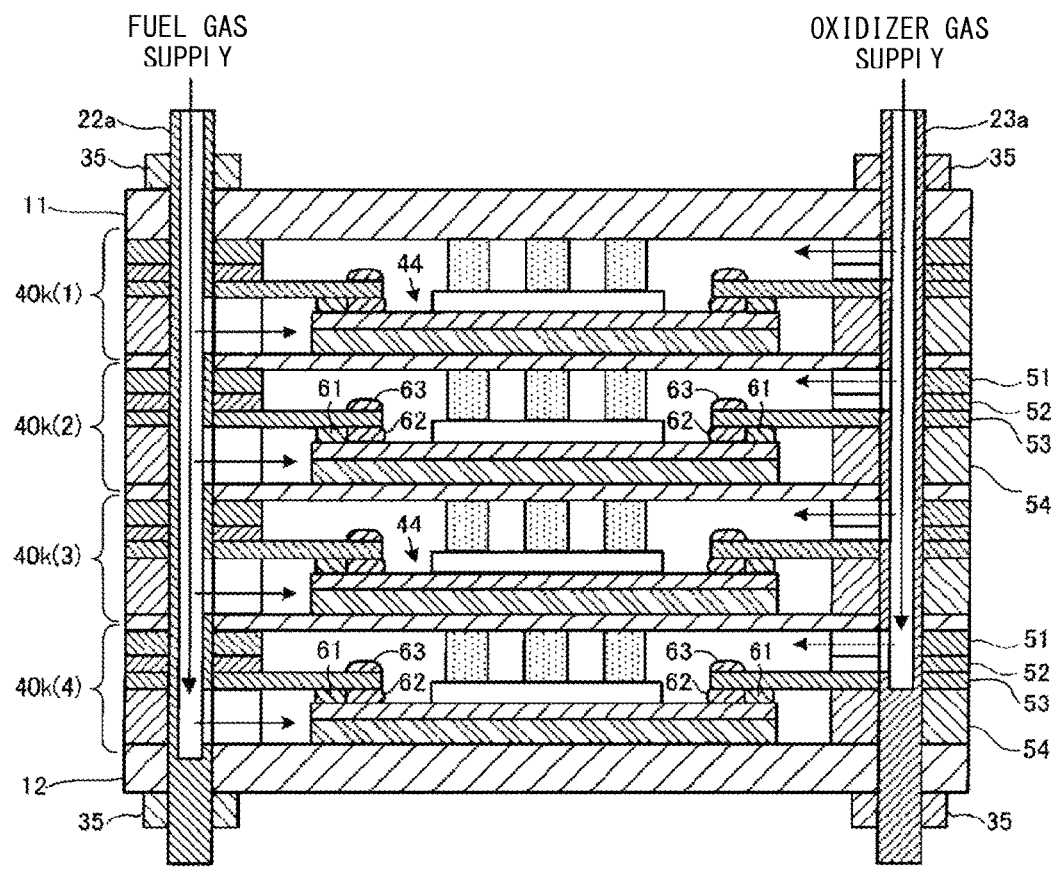
FIG. 38 Schematic sectional view of the solid oxide fuel cell stack 10 according to a fifth embodiment of the present invention.
Figure 39:
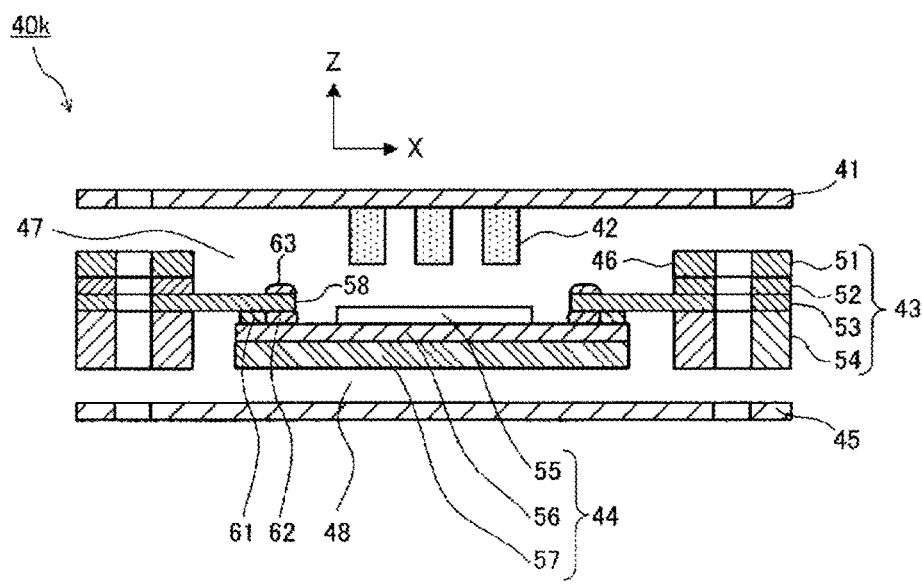
FIG. 39 Sectional view of a fuel cell 40k.
Figure 40:
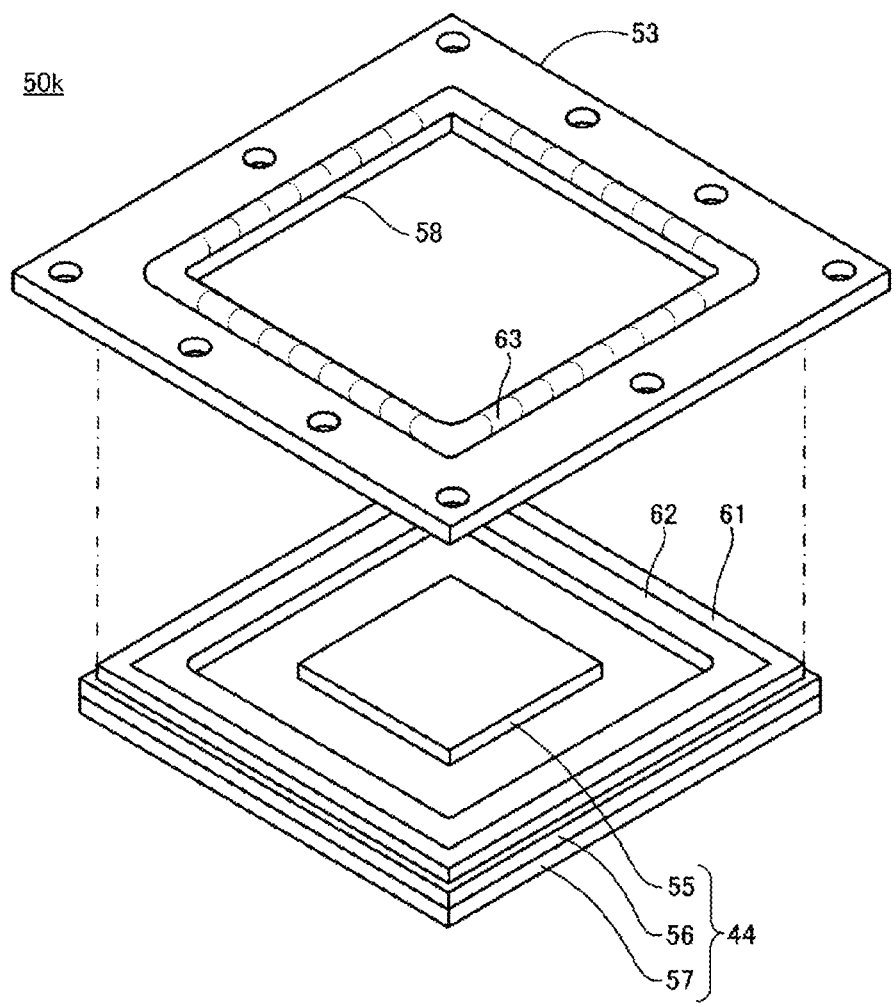
FIG. 40 Exploded perspective sectional view showing, in an exploded condition, the fuel cell body 44 and the metal separator 53 (fuel cell with separator 50k).

A fifth embodiment of the present invention will next be described. FIG. 38 is a schematic sectional view of the solid oxide fuel cell stack 10 according to the fifth embodiment. FIG. 39 is a sectional view of a fuel cell 40*k* according to the fifth embodiment. FIG. 40 is a top view showing the fuel cell body 44 and the metal separator 53 (fuel cell with separator 50*k*) according to the fifth embodiment.

The fuel cell with separator 50*k* according to the present embodiment has the joint part 61, the sealing part 62, and a restraint 63. The joint part 61 and the sealing part 62 are disposed between the fuel cell body 44 and the metal separator 53. Along the opening 58, the lower surface of the metal separator 53 and the upper surface of the solid electrolyte layer 56 are joined by the joint part 61, and the sealing part 62 provides a seal between the lower surface and the upper surface. The restraint 63 is disposed, corresponding to the sealing part 62, on the upper surface of the metal separator 53.

The joint part 61 is formed of Ag-containing brazing filler metal and joins the fuel cell body 44 and the metal separator 53 along the entire perimeter of the opening 58. The joint part 61 (Ag brazing filler metal) has, for example, a width of 2 mm to 6 mm and a thickness of 10 μm to 80 μm.

Various brazing filler metals which contain Ag as a main component can be employed for forming the joint part 61. An example brazing filler metal is a mixture of Ag and an oxide, such as $Ag-Al_2O_3$ (a mixture of Ag and $Al_2O_3$ (alumina)). Other examples of a mixture of Ag and an oxide include $Ag-CuO$, $Ag-TiO_2$, $Ag-Cr_2O_3$, and $Ag-SiO_2$. Also, an alloy of Ag and another metal (e.g., $Ag-Ge-Cr$, $Ag-Ti$, or $Ag-Al$) can be used as the brazing filler metal.

Even in the air atmosphere, an Ag-containing brazing filler metal (Ag brazing filler metal) is unlikely to be oxidized at a brazing temperature. Thus, Ag brazing filler metal is preferred in view of process efficiency, since the fuel cell body 44 and the metal separator 53 can be joined in the air atmosphere by use of Ag brazing filler metal.

The sealing part 62 is disposed closer to the opening 58 (inner perimeter) than is the joint part 61 along the entire perimeter of the opening 58 and provides a seal between the fuel cell body 44 and the metal separator 53 in order to prevent the mixing of oxidizer gas existing in the opening 58 of the metal separator 53 and fuel gas existing externally of the opening 58. Since the sealing part 62 is disposed closer to the opening 58 than is the joint part 61, the joint part 61 is free from contact with oxidizer gas; i.e., movement of oxygen from the oxidizer gas channel 47 to the joint part 61 is suppressed. As a result, gas leakage can be prevented, which could otherwise result from generation of voids in the joint part 61 as a result of reaction of hydrogen and oxygen. Furthermore, since the sealing part 62 is disposed between the metal separator 53 and the fuel cell body 44, thermal stress acting on the sealing part 62 becomes shear stress rather than tensile stress. Thus, the sealing material becomes unlikely to crack, and there can be restrained separation at the interface between the sealing part 62 and the metal separator 53 or the fuel cell body 44, whereby the reliability of the sealing part 62 can be improved.

The sealing part 62 has, for example, a width of 0.2 mm to 4 mm and a thickness of 10 μm to 80 μm.

The restraint 63 is disposed on the main surface (front surface) of the metal separator 53 at a position opposite the 62 along the entire perimeter of the opening 58.

The restraint 63 is formed of a material higher in thermal expansion coefficient than a material (sealing material) used to form the sealing part 62.

Thus, in the course of use of the solid oxide fuel cell stack 10 (at about 700° C.), the metal separator 53 is curved toward the sealing part 62; accordingly, force acts on the sealing part 62 in a direction of pressing (pressure welding) the sealing part 62, whereby separation at the interface between the sealing part 62 and the metal separator 53 (deterioration in sealing performance of the sealing part 62) is restrained, so that an airtight seal is improved.

Also, since the sealing part 62 is disposed along the entire perimeter of the opening 58, through disposition of the restraint 63 along the entire perimeter of the opening 58, the deformation of the metal separator 53 can be restrained along the entire perimeter of the opening 58.

The sealing part 62 and the restraint 63 can be formed of a sealing material, such as glass, glass-ceramic (crystallized glass), or a composite of glass and ceramic.

The sealing part 62 is formed of a sealing material having a thermal expansion coefficient of 8 ppm/K to 12 ppm/K within a temperature range of room temperature to 300° C., and the restraint 63 is formed of a restraining material which is 0.5 ppm/K to 2 ppm/K higher in thermal expansion coefficient than the sealing material.

A material used to form the restraint 63 may be lower in thermal expansion coefficient than the metal separator 53.

The metal separator 53 and the restraint 63 are formed of metal and glass, respectively; thus, usually, the restraint 63 is lower in thermal expansion coefficient than the metal separator 53. Even under such a condition, the restraint 63 can restrain deformation (deflection) of the metal separator 53.

In view of oxidation resistant durability, the metal separator 53 is formed of Al-containing ferritic stainless steel such as SUH21 (18Cr-3Al). Thus, the metal separator 53 has a thermal expansion coefficient of 10 ppm/K to 14 ppm/K within a temperature range of room temperature to 300° C. The sealing material is vulnerable to tensile stress and is apt to crack upon reception of tensile stress, but is resistant to compressive stress; thus, preferably, the sealing material is lower in thermal expansion coefficient than the metal separator 53; specifically, preferably, the sealing material has a thermal expansion coefficient of 8 ppm/K to 12 ppm/K within a temperature range of room temperature to 300° C.

As mentioned above, through control of the shape of deformation of the metal separator 53, damage to the sealing part 62 can be restrained. As a result, separation at the interface between the sealing part 62 and the metal separator 53 is restrained, thereby prolonging the life of the joint part 61.

(Method for Manufacturing the Fuel Cell with Separator 50k)

A method for manufacturing the fuel cell with separator 50k will next be described. FIGS. 41A to 41E are sectional views showing the fuel cell with separator 50k in the process of manufacture.

First, the metal separator 53 having the opening 58 is punched out from, for example, a sheet of SUH21. Also, a sheet of the solid electrolyte layer 56 is affixed to one surface of a green sheet of the anode 57 to form a laminate, and the laminate is once fired. Subsequently, a material for the cathode 55 is printed on the fired laminate, followed by firing to form the fuel cell body 44.

Figure 41A:
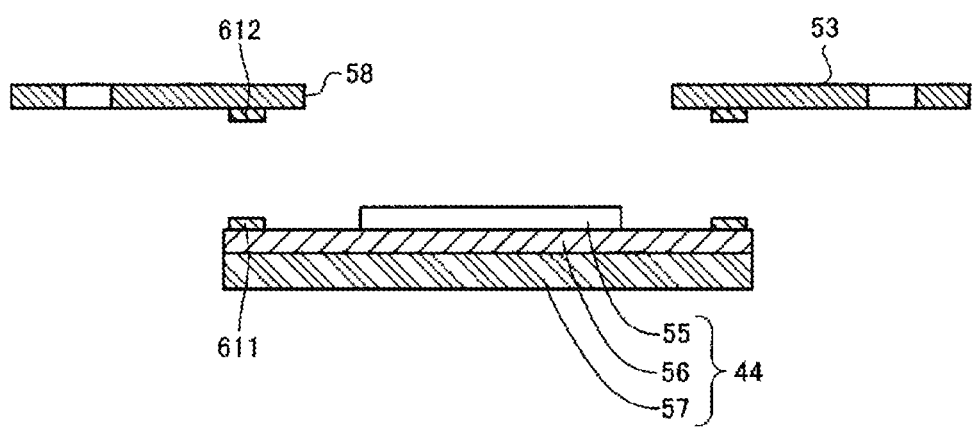
FIG. 41A Sectional view showing the fuel cell with separator 50k in the process of manufacture.

The brazing filler metals 611 and 612 are disposed on the fuel cell body 44 and the metal separator 53, respectively (see FIG. 41A). For example, a pasty Ag-containing brazing filler metal is printed, in a predetermined shape, on the upper surface of the solid electrolyte layer 56 of the fuel cell body 44 and on the lower surface of the metal separator 53, thereby disposing the brazing filler metals 611 and 612 on the fuel cell body 44 and the metal separator 53, respectively. In place of the above method, a dispenser may be used to dispose the brazing filler metals 611 and 612.

Each of the brazing filler metals 611 and 612 has, for example, a width of 2 mm to 6 mm and a thickness of 10 μm to 80 μm.

Figure 41B:
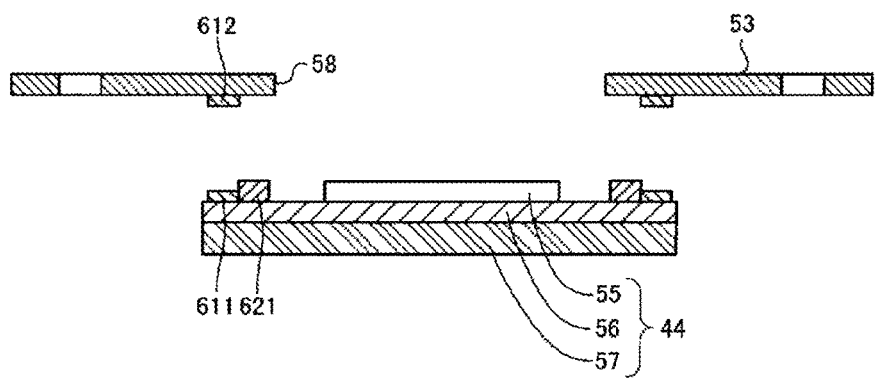
FIG. 41B Sectional view showing the fuel cell with separator 50k in the process of manufacture.

Next, the sealing material 621 is disposed on the upper surface of the solid electrolyte layer 56 of the fuel cell body 44 (see FIG. 41B). For example, the sealing material 621 can be disposed on the upper surface of the solid electrolyte layer 56 of the fuel cell body 44 by printing a glass-containing paste as the sealing material. In place of the above method, a dispenser may be used to dispose the sealing material 621. Also, the sealing material 621 may be printed on the lower surface of the metal separator 53.

The sealing material 621 has, for example, a width of 0.2 mm to 4 mm and a thickness of 10 μm to 80 μm.

Figure 41C:
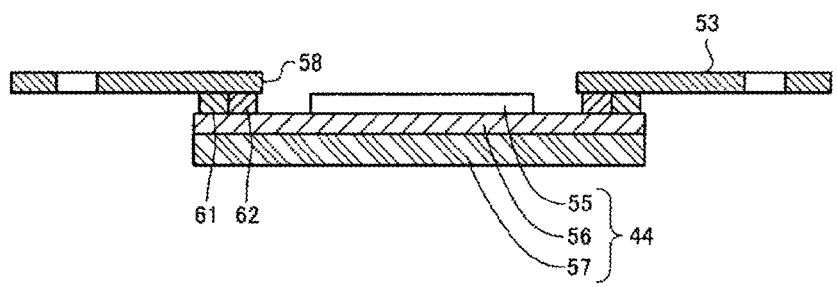
FIG. 41C Sectional view showing the fuel cell with separator 50k in the process of manufacture.

The brazing filler metals 611 and 612 and the sealing material 621 are melted to join the fuel cell body 44 and the metal separator 53 (forming the joint part 61) and to form the sealing part 62 (see FIG. 41C). The fuel cell body 44 and the metal separator 53 on which the brazing filler metals 611 and 612 are disposed are brought into contact with each other and are then heated at a temperature of, for example, 850° C. to 1,100° C., whereby the brazing filler metals 611 and 612 are melted to join the fuel cell body 44 and the metal separator 53. At this time, the sealing material 621 is also melted simultaneously to provide a seal between the fuel cell body 44 and the metal separator 53 (forming the sealing part 62).

Figure 41D:
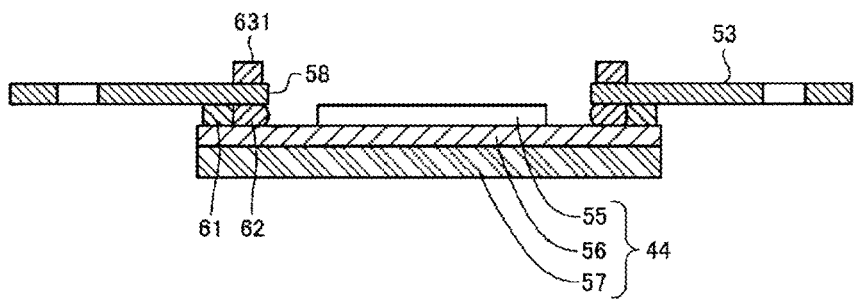
FIG. 41D Sectional view showing the fuel cell with separator 50k in the process of manufacture.

A restraining material 631 which is 0.5 ppm/K to 2 ppm/K higher in thermal expansion coefficient than the sealing material 621 is disposed on the metal separator 53 (see FIG. 41D). For example, by printing a glass-containing paste as the restraining material 631 on the upper surface of the metal separator 53, the restraining material 631 can be disposed at a predetermined position. In place of the above method, a dispenser may be used to dispose the restraining material 631.

The restraining material 631 has, for example, a width of 0.2 mm to 4 mm and a thickness of 10 μm to 200 μm and is thicker than the sealing material 621.

Figure 41E:
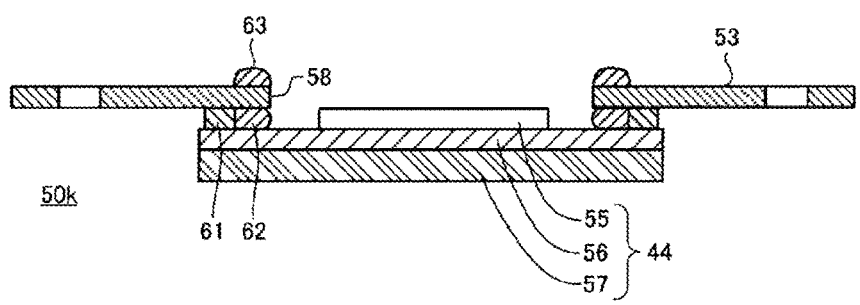
FIG. 41E Sectional view showing the fuel cell with separator 50k in the process of manufacture.

The sealing material 621 and the restraining material 631 are melted to form the restraint 63 (see FIG. 41E). The fuel cell body 44 and the metal separator 53 which are joined by the joint part 61 and have the sealing part 62 formed therebetween and the restraining material 631 formed thereon are heated at a temperature of, for example, 850° C. to 1,100° C., whereby the restraining material 631 is melted to form the restraint 63.

By the process mentioned above, the fuel cell with separator 50k (the fuel cell body 44 to which the metal separator 53 is joined) of the present embodiment is manufactured.

(Method for Manufacturing the Solid Oxide Fuel Cell Stack 10)

The cathode frame 51 and the anode frame 54 having respectively predetermined shapes are punched out from, for example, a sheet of SUH21. Meanwhile, the end plates 11 and 12 and the interconnectors 41 and 45 having respectively predetermined shapes are punched out from, for example, a sheet of ZMG232, a product of Hitachi Metals, Ltd. The insulation frame 52 is manufactured by working on, for example, a mica sheet.

The insulation frame 52, the cathode frame 51, and the interconnector 41 are disposed, in this order, on the metal separator 53 on the cathode 55 side of the fuel cell body 44 of the fuel cell with separator 50k manufactured by the manufacturing method described above, whereas the anode frame 54 and the interconnector 45 are disposed, in this order, on the metal separator 53 on the anode 57 side, thereby yielding the fuel cell 40k.

A plurality of the fuel cells 40k are stacked; the end plates 11 and 12 are disposed on the top and the bottom, respectively, of the stack; by use of the bolts 21 to 23 and the nuts 35, the plurality of fuel cells 40k are fixedly held between the end plates 11 and 12, thereby yielding the solid oxide fuel cell stack 10.

Sixth Embodiment

Figure 42:
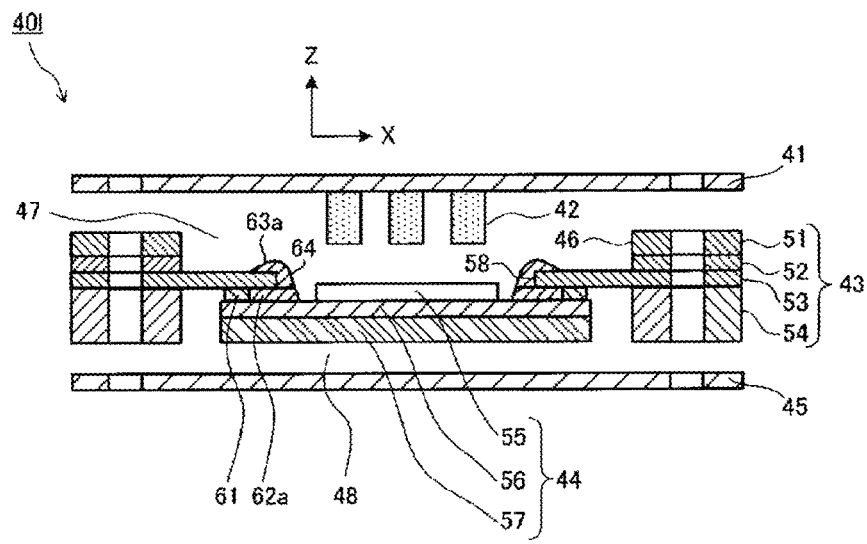
FIG. 42 Sectional view of a fuel cell 40l according to a sixth embodiment of the present invention.
Figure 43:
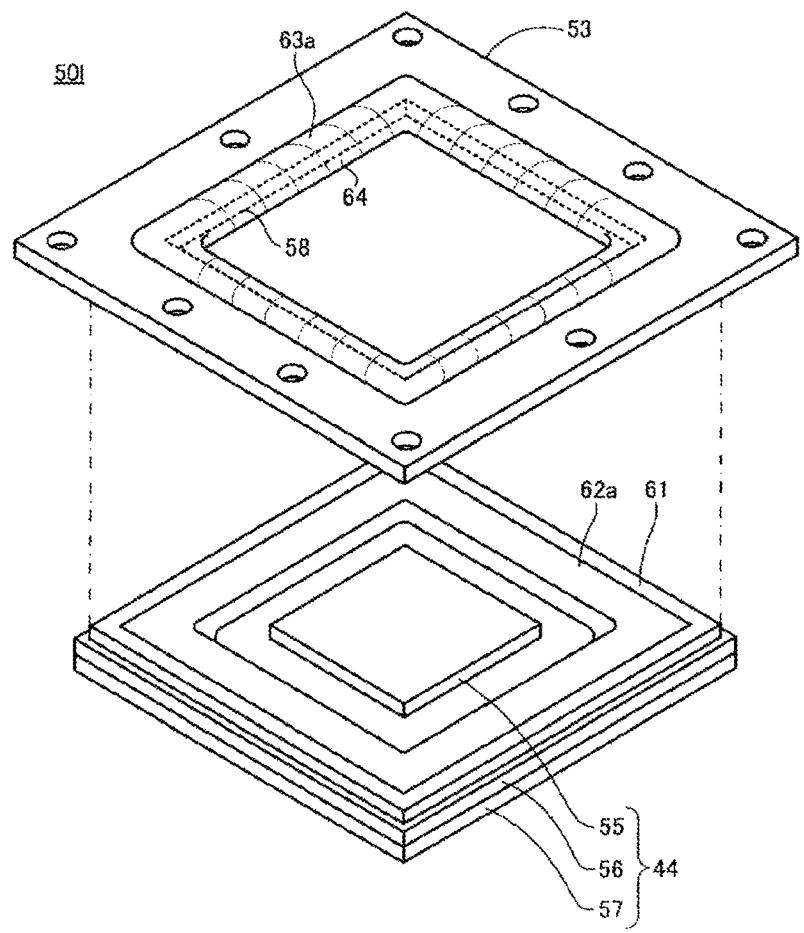
FIG. 43 Exploded perspective view showing, in an exploded condition, the fuel cell body 44 and the metal separator 53 (fuel cell with separator 50l).

A sixth embodiment of the present invention will next be described. FIG. 42 is a sectional view of a fuel cell 40*l* according to the sixth embodiment. FIG. 43 is an exploded perspective view showing, in an exploded condition, the fuel cell body 44 and the metal separator 53 of the sixth embodiment (fuel cell with separator 50*l*).

The fuel cell 40*l* has a connection part 64 disposed on the side surface of the opening 58. That is, the connection part 64 connects and thus integrates a sealing part 62*a* and a restraint 63*a*. The integration of the sealing part 62*a* and the restraint 63*a* further enhances restraining force, whereby the deformation (deflection) of the metal separator 53 can be further restrained.

As mentioned above, the restraint 63*a* is formed of a material higher in thermal expansion coefficient than a material (sealing material) used to form the sealing part 62*a*, and holds, together with the sealing part 62*a*, the metal separator 53 therebetween. Thus, in the course of use of the solid oxide fuel cell stack 10, the metal separator 53 is curved toward the sealing part 62*a*; accordingly, force acts on the sealing part in a direction of pressing (pressure welding) the sealing part 62*a*. This force restrains separation at the interface between the sealing part 60 62*a* and the metal separator 53 (deterioration in sealing performance of the sealing part 62), thereby improving an airtight seal.

The connection part 64 formed of the sealing material 621 or the restraining material 631 is also disposed, along the opening 58, on the side surface of the opening 58 in addition to the upper and lower surfaces of the metal separator 53, whereby deformation of the metal separator 53 is further effectively hindered. That is, the sealing part 62*a*, the restraint 63*a*, and the connection part 64 fix the metal separator 53 in a gripping manner, thereby further restraining separation at the interface between the sealing part 62*a* and the metal separator 53.

Also, the integration of the sealing part 62*a* and the restraint 63*a* contributes to a substantial increase in the width of the sealing part 62*a*, thereby reliably improving sealing provided by the sealing part 62*a*. As mentioned above, the sealing part 62*a* suppresses movement of oxidizer gas from the oxidizer gas channel 47 to the joint part 61. The integration of the sealing part 62*a* and the restraint 63*a* increases the length (width, seal path) of the sealing part 62*a* on a path extending from the oxidizer gas channel 47 to the joint part 61. As a result, sealing provided by the sealing part 62*a* reliably improves.

In FIG. 42, the connection part 64 and the restraint 63*a* are formed of the same material. However, it is also possible to form the connection part 64 and the sealing part 62*a* from the same material; even in such configuration, as compared with the case where the connection part 64 is not provided, there can be reliably improved restraint of separation at the interface between the sealing part 62*a* and the metal separator 53 and the reliability of sealing attained through an increase in seal path.

As is understandable from the above, the boundary between the material of the sealing part 62*a* and the material of the restraint 63*a* is allowed to shift to a certain extent in the thickness direction of the metal separator 53.

In the present embodiment, the boundary between the material of the sealing part 62*a* and the restraint 63*a* is relatively clear such that components vary discontinuously. By contrast, at the boundary between the material of the sealing part 62a and the restraint 63a, components vary continuously; accordingly, the boundary is allowed to be unclear (blurred).

Modification of Sixth Embodiment

Figure 44:
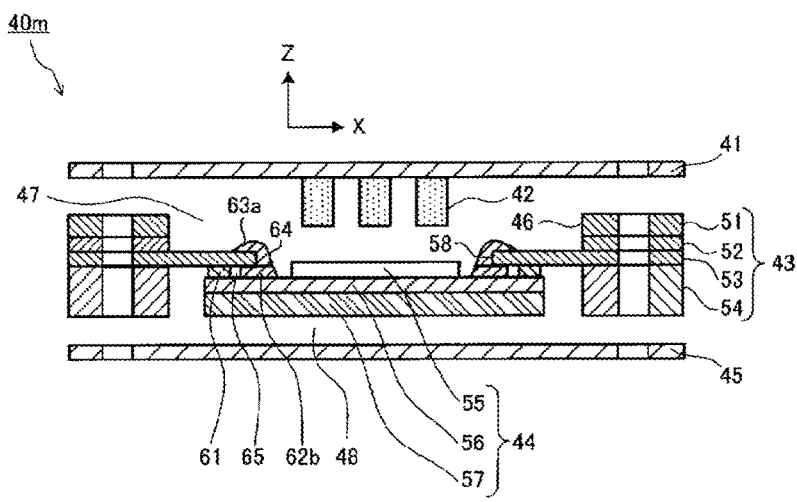
FIG. 44 Sectional view of a fuel cell 40m according to a modification of the sixth embodiment.
Figure 45:
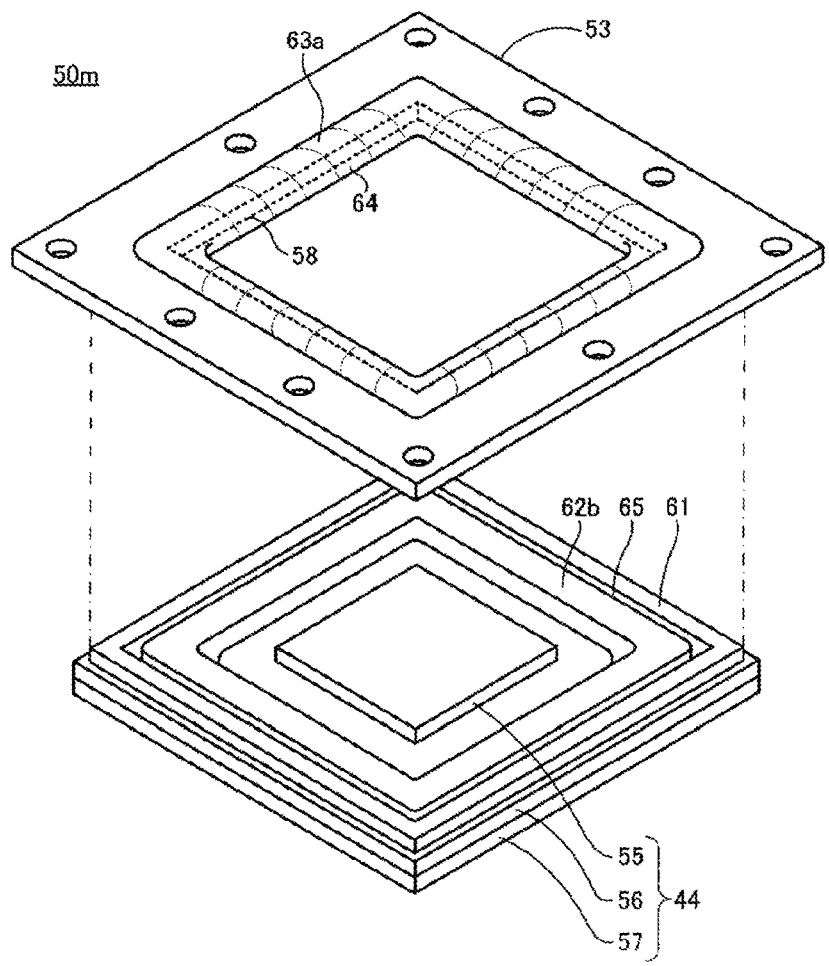
FIG. 45 Exploded perspective view showing, in an exploded condition, the fuel cell body 44 and the metal separator 53 (fuel cell with separator 50m).

A modification of the sixth embodiment will next be described. FIG. 44 is a sectional view of a fuel cell 40m according to the modification of the sixth embodiment. FIG. 45 is an exploded perspective view showing, in an exploded condition, the fuel cell body 44 and the metal separator 53 (fuel cell with separator 50m) according to the modification of the sixth embodiment.

The fuel cell 40m has a gap (space) between the joint part 61 and the sealing part 62b. In this manner, even though the joint part 61 and the sealing part 62b are not in contact with each other, the deformation (deflection) of a portion of the metal separator 53, which portion overlaps with the sealing part 62b, can be restrained.

In the fuel cells 40l and 40m, the joint part 61 and the seals 62a and 62b are in contact with each other or have a gap 65 therebetween, along the entire perimeter of the opening 58. In its conceivable intermediate mode, the joint part 61 and the seal 62a are in contact with each other along a portion of the perimeter of the opening 58 and the joint part 61 and the seal 62b are not in contact with each other along another portion of the perimeter of the opening 58.

Also, as in the case of the fuel cell 40k, the gap (space) 65 may be provided between the joint part 61 and the sealing part 62b without the connection part 64 being provided.

Seventh Embodiment

Figure 46:
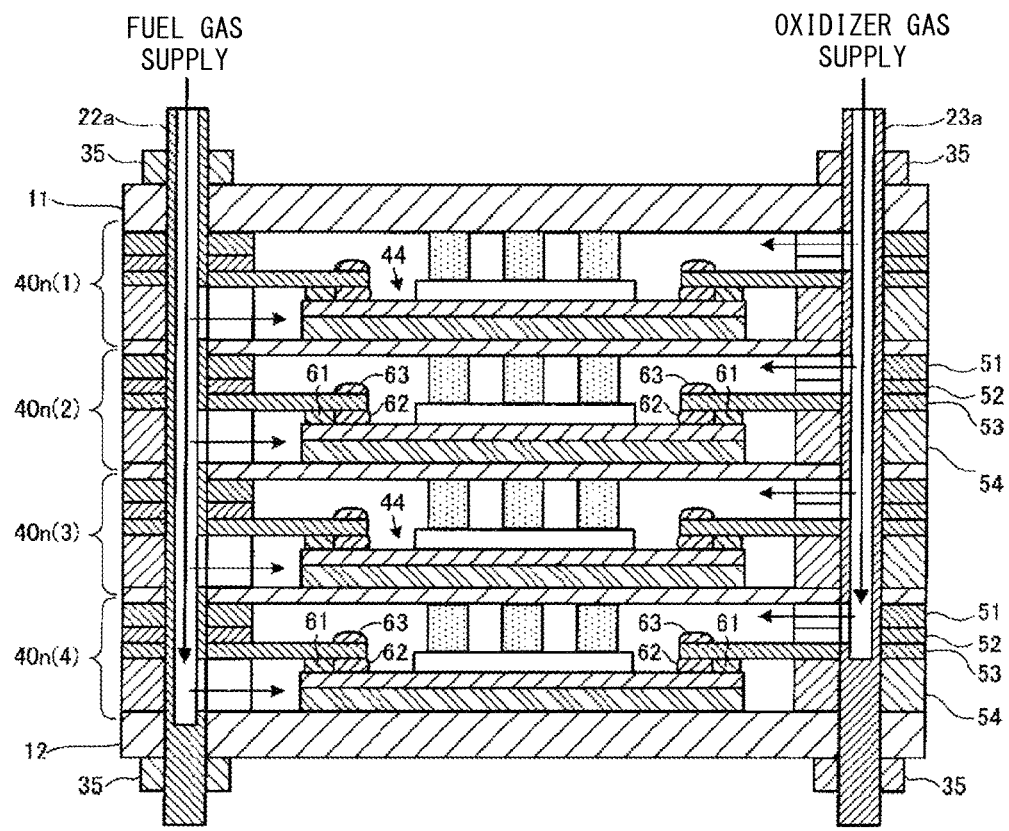
FIG. 46 Schematic sectional view of a solid oxide fuel cell stack 10 according to a seventh embodiment of the present invention.
Figure 47:
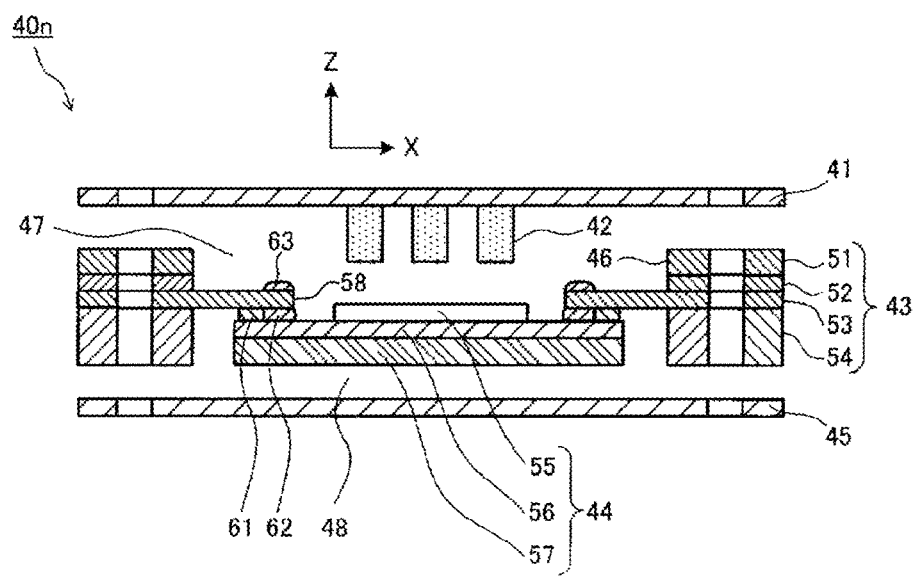
FIG. 47 Sectional view of a fuel cell 40n.
Figure 48:
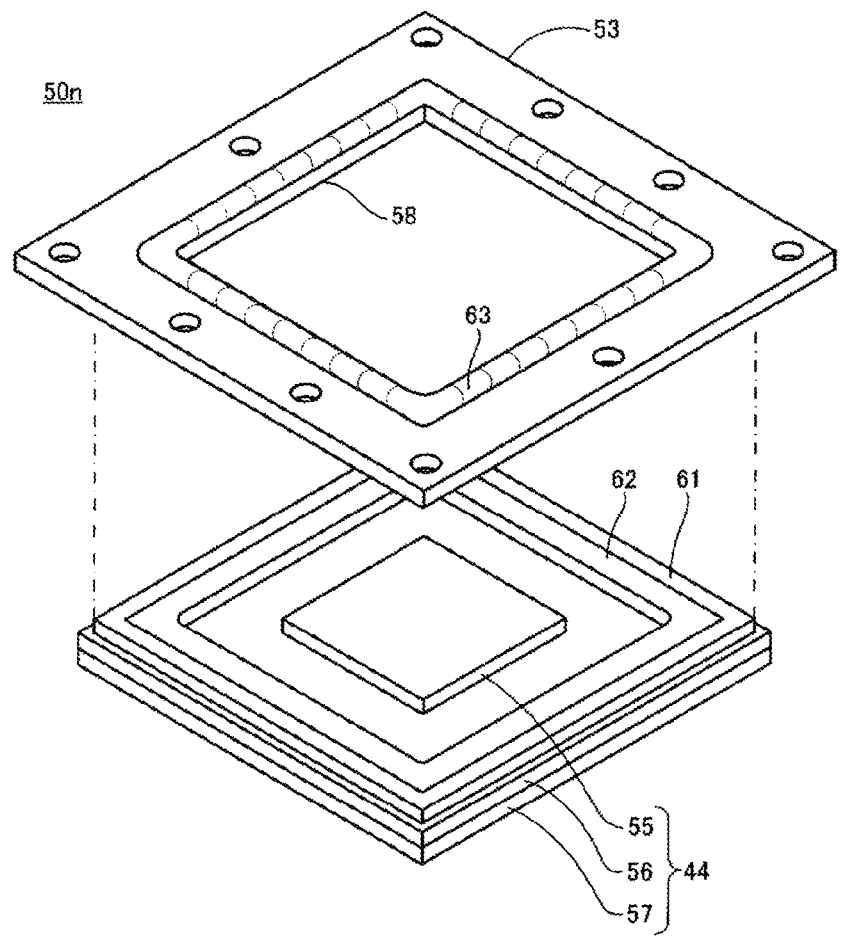
FIG. 48 Exploded perspective view showing, in an exploded condition, the fuel cell body 44 and the metal separator 53 (fuel cell with separator 50n).

A seventh embodiment of the present invention will next be described. FIG. 46 is a schematic sectional view of the solid oxide fuel cell stack 10 according to the seventh embodiment. FIG. 47 is a sectional view of a fuel cell 40n according to the seventh embodiment. FIG. 48 is an exploded perspective view showing, in an exploded condition, the fuel cell body 44 and the metal separator 53 (fuel cell with separator 50n) according to the seventh embodiment.

The fuel cell with separator 50n according to the present embodiment has the joint part 61, the sealing part 62, and the restraint 63. The joint part 61 and the sealing part 62 are disposed between the fuel cell body 44 and the metal separator 53. Along the opening 58, the lower surface of the metal separator 53 and the upper surface of the solid electrolyte layer 56 are joined by the joint part 61, and the sealing part 62 provides a seal between the lower surface and the upper surface. The restraint 63 is disposed, corresponding to the sealing part 62, on the upper surface of the metal separator 53.

The joint part 61 is formed of Ag-containing brazing filler metal and joins the fuel cell body 44 and the metal separator 53 along the entire perimeter of the opening 58. The joint part 61 (Ag brazing filler metal) has, for example, a width of 2 mm to 6 mm and a thickness of 10 μm to 80 μm.

Various brazing filler metals which contain Ag as a main component can be employed for forming the joint part 61. An example brazing filler metal is a mixture of Ag and an oxide, such as Ag—Al$_2$O$_3$ (a mixture of Ag and Al$_2$O$_3$ (alumina)). Other examples of a mixture of Ag and an oxide include Ag—CuO, Ag—TiO$_2$, Ag—Cr$_2$O$_3$, and Ag—SiO$_2$. Also, an alloy of Ag and another metal (e.g., Ag—Ge—Cr, Ag—Ti, or Ag—Al) can be used as the brazing filler metal.

Even in the air atmosphere, an Ag-containing brazing filler metal (Ag brazing filler metal) is unlikely to be oxidized at a brazing temperature. Thus, Ag brazing filler metal is preferred in view of process efficiency, since the fuel cell body 44 and the metal separator 53 can be joined in the air atmosphere by use of Ag brazing filler metal.

The sealing part 62 is disposed closer to the opening 58 (inner perimeter) than is the joint part 61 along the entire perimeter of the opening 58 and provides a seal between the fuel cell body 44 and the metal separator 53 in order to prevent the mixing of oxidizer gas existing in the opening 58 of the metal separator 53 and fuel gas existing externally of the opening 58.

Since the sealing part 62 is disposed closer to the opening 58 (inner perimeter) than is the joint part 61, the joint part 61 is free from contact with oxidizer gas; i.e., movement of oxygen from the oxidizer gas channel 47 to the joint part 61 is suppressed. As a result, gas leakage can be prevented, which could otherwise result from generation of voids in the joint part 61 as a result of reaction of hydrogen and oxygen.

The sealing part 62 has, for example, a width of 0.2 mm to 4 mm and a thickness of 10 μm to 80 μm.

The restraint 63 is disposed on the front surface of the metal separator 53 at a position opposite the 62 along the entire perimeter of the opening 58.

The restraint 63 is formed of the same material (i.e., having the same thermal expansion coefficient) as that used to form the sealing part 62, and holds, together with the sealing part 62, the metal separator 53 therebetween. As a result, the deformation of the metal separator 53 is restrained at the time of operation of the fuel cell stack 10.

Notably, the "same material" encompasses not only the completely same material but also substantially the same material. A material which differs in composition to some extent is acceptable so long as the material contributes to prevention of the above-mentioned separation (deterioration in sealing performance). For example, a material which differs in percentage composition by about 1% by weight may be considered as substantially the same material.

In the case where the restraint 63 is not disposed, at the time of operation of the solid oxide fuel cell stack 10, both of the metal separator 53 and the sealing part 62 are heated to about 700° C. and are deformed (thermally expanded). Since the metal separator 53 and the sealing part 62 differ in thermal expansion coefficient, they differ in the amount of deformation; accordingly, thermal stress is generated between the metal separator 53 and the sealing part 62 to cause warpage of the metal separator 53. As a result, separation may possibly occur at the interface between the sealing part 62 and the metal separator 53, potentially resulting in deterioration in sealing performance of the sealing part 62.

If the restraint 63 formed of the same material as the sealing material is disposed at a position opposite the sealing part 62, at the time of operation of the solid oxide fuel cell stack 10, thermal stress generated between the metal separator 53 and the sealing part 62 (on the back surface side of the metal separator 53) balances with thermal stress generated between the metal separator 53 and the restraint 63 (on the front surface side of the metal separator 53). As a result, warpage of the metal separator 53 is restrained; accordingly, separation at the interface between the metal separator 53 and the sealing part 62 (deterioration in sealing performance of the sealing part 62) is prevented.

When the metal separator 53 is thick, rigidity of the metal separator 53 increases; accordingly, difficulty is encountered in mitigating stress generated from the thermal expansion difference between the fuel cell body 44 and the metal separator 53, potentially resulting in the occurrence of cracking of the fuel cell body 44. Meanwhile, when the metal separator 53 is thin, rigidity reduces; accordingly, mitigation of stress generated from thermal expansion difference is facilitated to restrain the generation of cracking of the fuel cell body 44; however, warpage of the metal separator 53 is apt to occur in the course of cooling due to the thermal expansion difference between the joining material of the joint part 61 and the sealing material of the sealing part 62. The present embodiment employs a thin metal separator 53 to facilitate mitigation of stress generated from the thermal expansion difference between the joining material and the sealing material, as well as the restraint 63 to prevent the warpage.

In the present embodiment, similar to the joint part 61 (brazing filler metal), the sealing part 62 is disposed between the metal separator 53 and the fuel cell body 44. Thus, stress applied to the sealing part 62 is shear stress; therefore, the sealing part 62 becomes unlikely to crack.

Because of its position, the sealing part 62 has a thickness equivalent to that of the joint part 61 (brazing filler metal).

If the restraint 63 is thin, a restraining effect is small; thus, preferably, the restraint 63 has a thickness equivalent to or greater than that of the sealing part 62.

The sealing part 62 can be formed of a glass-containing sealing material, such as glass, glass-ceramic (crystallized glass), or a composite of glass and ceramic. For example, glass G018-311, a product of SCHOTT, can be used.

Since the sealing part 62 is disposed along the entire perimeter of the opening 58, by means of the restraint 63 being disposed along the entire perimeter of the opening 58, deformation of the metal separator 53 can be restrained along the entire perimeter of the opening 58.

The material of the restraint 63 may be lower in thermal expansion coefficient than the metal separator 53.

The metal separator 53 and the restraint 63 are formed of metal and glass, respectively; thus, usually, the restraint 63 is lower in thermal expansion coefficient than the metal separator 53. Even under such condition, the restraint 63 can restrain deformation of the metal separator 53.

As will be described later, preferably, the sealing material has a thermal expansion coefficient of 8 ppm/K to 12 ppm/K within a temperature range of room temperature to 300° C.

As mentioned above, damage to the sealing part 62 resulting from deformation of the metal separator 53 is restrained. As a result, the generation of voids in the joint part 61 is restrained, thereby prolonging the life of the fuel cell with separator 50n.

(Method for Manufacturing the Fuel Cell with Separator 50n)

A method for manufacturing the fuel cell with separator 50n (the fuel cell body 44 to which the metal separator 53 is joined) will next be described. FIGS. 49A to 49E are sectional views showing the fuel cell with separator 50n in the process of manufacture.

First, the metal separator 53 having the opening 58 is punched out from, for example, a sheet of SUH21 (18Cr-3Al (Al-containing ferritic stainless steel)).

A sheet of the solid electrolyte layer 56 is affixed to one surface of a green sheet of the anode 57 to form a laminate, and the laminate is once fired. Subsequently, a material for the cathode 55 is printed on the fired laminate, followed by firing to form the fuel cell body 44.

Figure 49A:
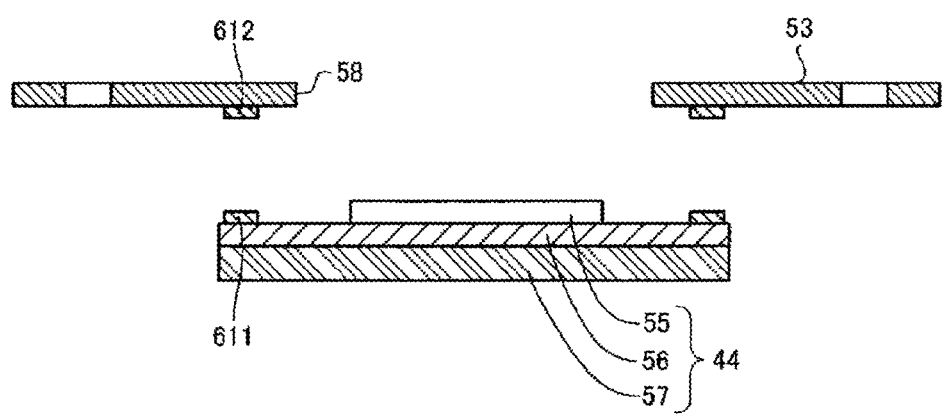
FIG. 49A Sectional view showing the fuel cell with separator 50n in the process of manufacture.

The brazing filler metals 611 and 612 are disposed on the fuel cell body 44 and the metal separator 53, respectively (see FIG. 49A). For example, a pasty Ag-containing brazing filler metal is printed, in a predetermined shape, on the upper surface of the solid electrolyte layer 56 of the fuel cell body 44 and on the lower surface of the metal separator 53, thereby disposing the brazing filler metals 611 and 612 on the fuel cell body 44 and the metal separator 53, respectively.

In place of the above method, a dispenser or the like may be used to dispose the brazing filler metals 611 and 612.

Each of the brazing filler metals 611 and 612 has, for example, a width of 2 mm to 6 mm and a thickness of 10 μm to 80 μm.

Figure 49B:
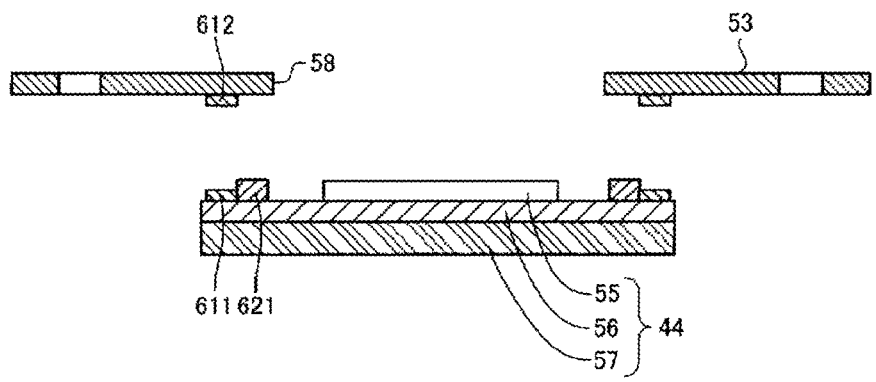
FIG. 49B Sectional view showing the fuel cell with separator 50n in the process of manufacture.

Next, the sealing material 621 is disposed on the upper surface of the solid electrolyte layer 56 of the fuel cell body 44 (see FIG. 49B). For example, the sealing material 621 can be disposed on the upper surface of the solid electrolyte layer 56 of the fuel cell body 44 by printing a glass-containing paste as the sealing material.

The sealing material 621 has, for example, a width of 0.2 mm to 4 mm and a thickness of 10 μm to 80 μm.

In place of the above method, a dispenser may be used to dispose the sealing material 621.

The sealing material 621 may be printed on the lower surface of the metal separator 53 rather than on the upper surface of the solid electrolyte layer 56. Also, the sealing material 621 may be disposed on both of the upper surface of the solid electrolyte layer 56 and the lower surface of the metal separator 53.

Figure 49C:
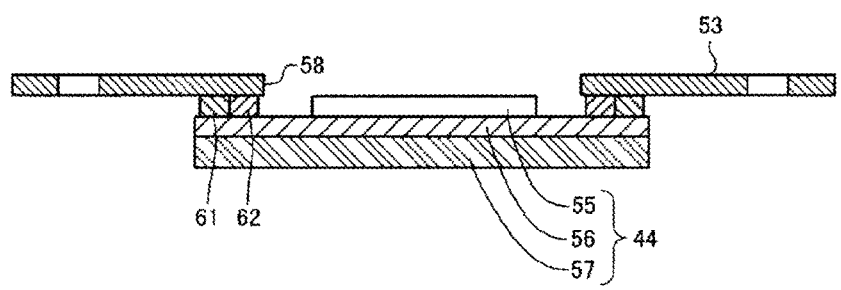
FIG. 49C Sectional view showing the fuel cell with separator 50n in the process of manufacture.

The brazing filler metals 611 and 612 and the sealing material 621 are melted to join the fuel cell body 44 and the metal separator 53 (forming the joint part 61) and to form the sealing part 62 (see FIG. 49C). The fuel cell body 44 and the metal separator 53 on which the brazing filler metals 611 and 612 are disposed are brought into contact with each other and are then heated at a temperature of 850° C. to 1,100° C., whereby the brazing filler metals 611 and 612 are melted to join the fuel cell body 44 and the metal separator 53. At this time, the sealing material 621 is also melted simultaneously to provide a seal between the fuel cell body 44 and the metal separator 53.

Figure 49D:
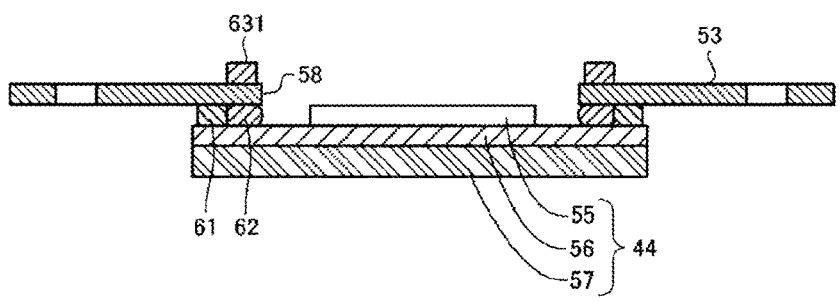
FIG. 49D Sectional view showing the fuel cell with separator 50n in the process of manufacture.

A restraining material 631 having the same composition as that of the sealing material 621 is disposed on the metal separator 53 (see FIG. 49D). For example, by printing a glass-containing paste as the restraining material on the upper surface of the metal separator 53, the restraining material 631 can be disposed at a predetermined position. In place of the above method, a dispenser may be used to dispose the restraining material 631.

The restraining material 631 has, for example, a width of 0.2 mm to 4 mm and a thickness of 10 μm to 200 μm and is thicker than the sealing material 621.

Figure 49E:
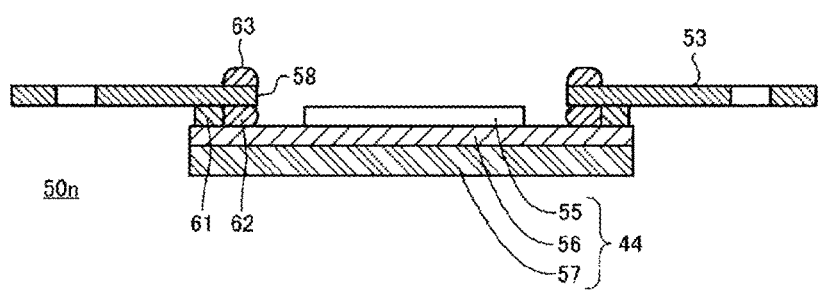
FIG. 49E Sectional view showing the fuel cell with separator 50n in the process of manufacture.

The sealing material 621 and the restraining material 631 are melted to form the restraint 63 (see FIG. 49E). The fuel cell body 44 and the metal separator 53 which are joined by the joint part 61 and are sealed by the sealing part 62 and which have the restraining material 631 formed thereon are heated at a temperature of, for example, 850° C. to 1,100° C., whereby the restraining material 631 is melted to form the restraint 63.

By the process mentioned above, the fuel cell with separator 50n (the fuel cell body 44 to which the metal separator 53 is joined) of the present embodiment is manufactured.

(Method for Manufacturing the Solid Oxide Fuel Cell Stack 10)

The cathode frame 51 and the anode frame 54 having respectively predetermined shapes are punched out from, for example, a sheet of SUH21. Meanwhile, the end plates 11 and 12 and the interconnectors 41 and 45 having respectively predetermined shapes are punched out from, for example, a sheet of ZMG232, a product of Hitachi Metals, Ltd. The insulation frame 52 can be manufactured by working on, for example, a mica sheet.

The insulation frame 52, the cathode frame 51, and the interconnector 41 are disposed, in this order, on the metal separator 53 on the cathode 55 side of the fuel cell body 44 of the fuel cell with separator 50n manufactured by the manufacturing method described above, whereas the anode frame 54 and the interconnector 45 are disposed, in this order, on the metal separator 53 on the anode 57 side, thereby yielding the fuel cell 40n.

A plurality of the fuel cells 40n are stacked; the end plates 11 and 12 are disposed on the top and the bottom, respectively, of the stack; by use of the bolts 21 to 23 and the nuts 35, the plurality of fuel cells 40n are fixedly held between the end plates 11 and 12, thereby yielding the solid oxide fuel cell stack 10.

Eighth Embodiment

Figure 50:
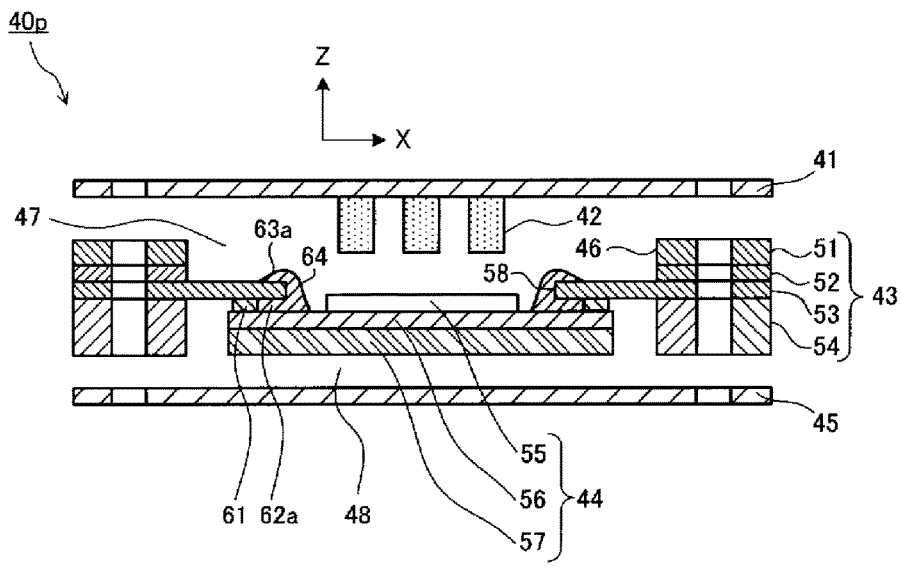
FIG. 50 Sectional view of a fuel cell 40p according to an eighth embodiment of the present invention.
Figure 51:
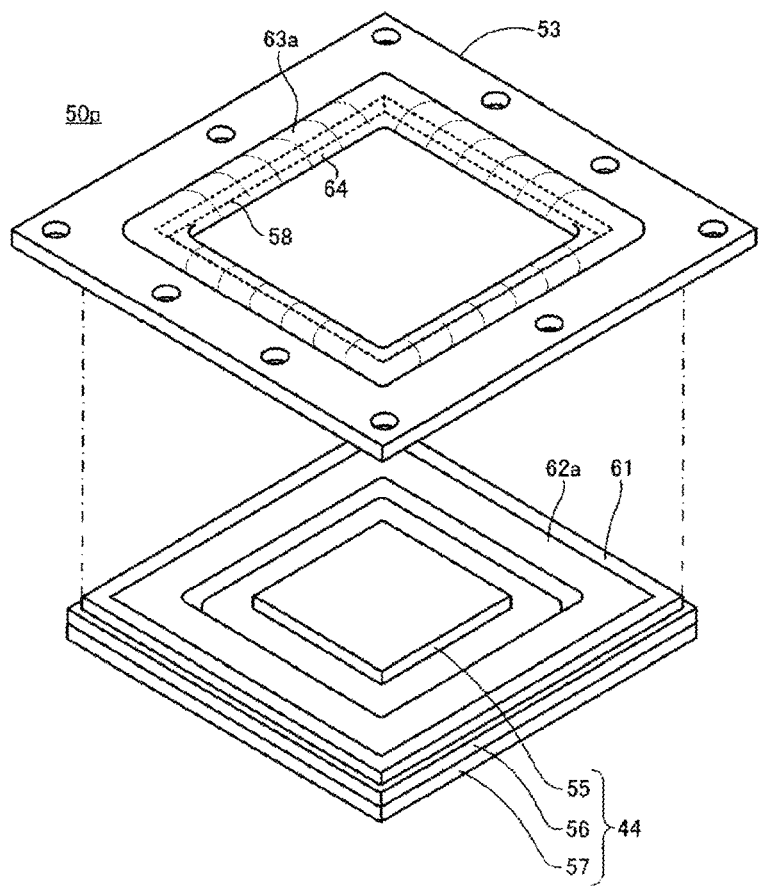
FIG. 51 Exploded perspective view showing, in an exploded condition, the fuel cell body 44 and the metal separator 53 (fuel cell with separator 50p).

An eighth embodiment of the present invention will next be described. FIG. 50 is a sectional view of a fuel cell 40p according to the eighth embodiment. FIG. 51 is an exploded perspective view showing, in an exploded condition, the fuel cell body 44 and the metal separator 53 (fuel cell with separator 50p).

The fuel cell 40p has the connection part 64 disposed on the side surface of the opening 58 and formed of the same material as the material (sealing material) of the sealing part 62a. That is, the connection part 64 connects and thus integrates the sealing part 62a and the restraint 63a.

The integration of the sealing part 62a and the restraint 63a further restrains the deformation (deflection) of the metal separator 53. As mentioned above, the restraint 63a is formed of the same material (i.e., having the same thermal expansion coefficient) as that used to form the sealing part 62a, and holds, together with the sealing part 62a, the metal separator 53 therebetween, whereby the deformation of the metal separator 53 is restrained at the time of operation of the solid oxide fuel cell stack 10. The same material (having substantially the same thermal expansion coefficient) as that (sealing material) of the sealing part 62a is also disposed, along the opening 58, on the side surface of the opening 58 in addition to the upper and lower surfaces of the metal separator 53, whereby deformation of the metal separator 53 is further effectively hindered.

Also, the integration of the sealing part 62a and the restraint 63a contributes to a substantial increase in the width of the sealing part 62a, so-called the seal path, thereby reliably improving sealing performance of the sealing part 62a. As mentioned above, since the sealing part 62a hinders movement of oxidizer gas from the oxidizer gas channel 47 to the joint part 61, the integration of the sealing part 62a and the restraint 63a increases the length of the sealing part 62a (seal path) on a path extending from the oxidizer gas channel 47 to the joint part 61. As a result, the sealing performance of the sealing part 62a is enhanced.

The fuel cell with separator 50p (the fuel cell body 44 to which the metal separator 53 is joined) of the present embodiment can be manufactured by the following method. FIGS. 52A to 52E are sectional views showing the fuel cell with separator 50p in the process of manufacture.

Except for the steps of forming the joint part 61, the sealing part 62a, and the restraint 63a, similar steps are employed; thus, the description of the similar steps is omitted, and the steps of forming the joint part 61, the sealing part 62a, and the restraint 63a will be described below.

Figure 52A:
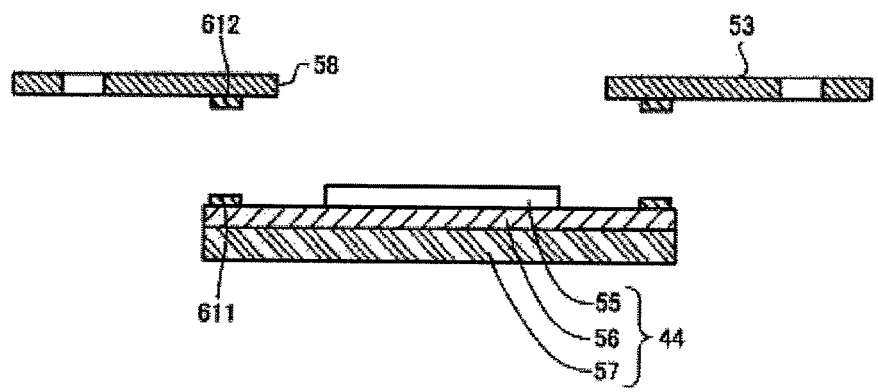
FIG. 52A Sectional view showing the fuel cell with separator 50p in the process of manufacture.

The brazing filler metals 611 and 612 are disposed on the fuel cell body 44 and the metal separator 53, respectively (see FIG. 52A). For example, a pasty Ag-containing brazing filler metal is printed, in a predetermined shape, on the upper surface of the solid electrolyte layer 56 of the fuel cell body 44 and on the lower surface of the metal separator 53, thereby disposing the brazing filler metals 611 and 612 on the fuel cell body 44 and the metal separator 53, respectively.

In place of the above method, a dispenser or the like may be used to dispose the brazing filler metals 611 and 612.

Each of the brazing filler metals 611 and 612 has, for example, a width of 2 mm to 6 mm and a thickness of 10 μm to 80 μm.

Figure 52B:
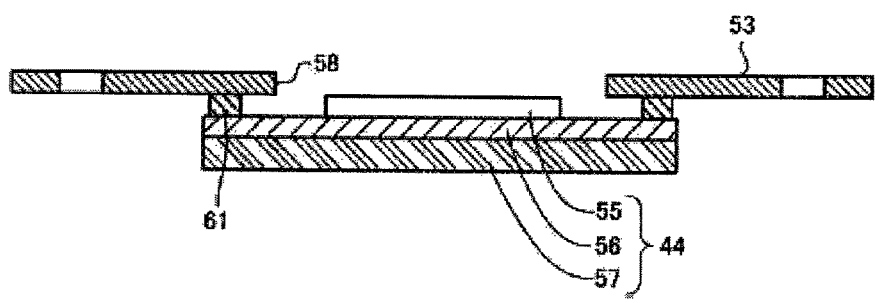
FIG. 52B Sectional view showing the fuel cell with separator 50p in the process of manufacture.

The brazing filler metals 611 and 612 are melted to join the fuel cell body 44 and the metal separator 53 (forming the joint part 61; see FIG. 52B). The fuel cell body 44 and the metal separator 53 on which the brazing filler metals 611 and 612 are disposed are brought into contact with each other and are then heated at a temperature of, for example, 850° C. to 1,100° C., whereby the brazing filler metals 611 and 612 are melted to join the fuel cell body 44 and the metal separator 53.

Figure 52C:
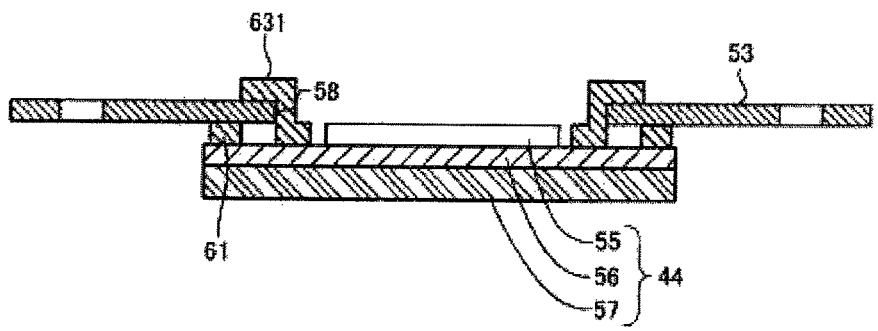
FIG. 52C Sectional view showing the fuel cell with separator 50p in the process of manufacture.

The restraining material 631 having the same composition as that of the sealing material 621 is disposed such that the restraining material 631 extends from the fuel cell body 44 onto the metal separator 53 (see FIG. 52C). For example, a glass-containing paste is applied as the sealing material by use of a dispenser, whereby the restraining material 631 can be disposed in a region ranging from the fuel cell body 44 to the metal separator 53. In place of the above method, printing may be performed to dispose the restraining material 631.

The restraining material 631 has, for example, a width of 0.2 mm to 4 mm and a thickness of 10 μM to 200 μm.

Figure 52D:
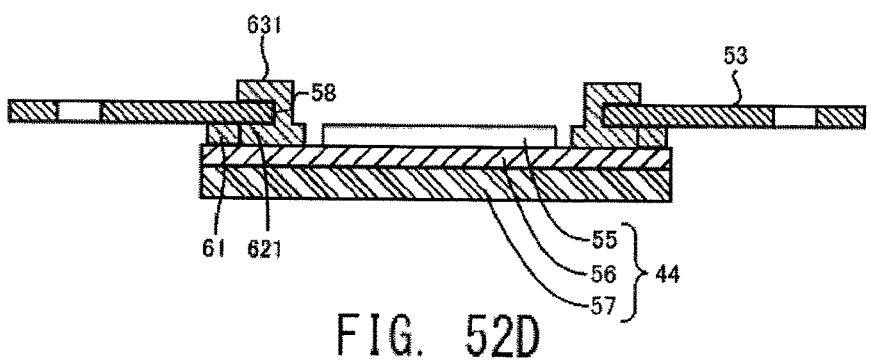
FIG. 52D Sectional view showing the fuel cell with separator 50p in the process of manufacture.

The sealing material 621 is disposed between the fuel cell body 44 and the metal separator 53 (see FIG. 52D). For example, by vacuum defoaming, air bubbles are evacuated from a space between the fuel cell body 44 and the metal separator 53, whereby the sealing material 621 can be disposed.

Vacuum defoaming is performed, for example, as follows: the fuel cell body 44 and the metal separator 53 are placed within a container; then, air is evacuated from the container by use of a vacuum pump or the like to establish a vacuum within the container. This evacuates air bubbles (air) from the gap between the fuel cell body 44 and the metal separator 53 to the interior of the container through the sealing material 621 (vacuum defoaming). As a result, the gap between the fuel cell body 44 and the metal separator 53 is filled with the sealing material 621 (disposing the sealing material 621).

Preferably, for evacuation of air bubbles, the sealing material 621 is low in viscosity to a certain extent. Conceivably, for example, the temperature of the sealing material 621 is increased above room temperature to decrease viscosity.

Figure 52E:
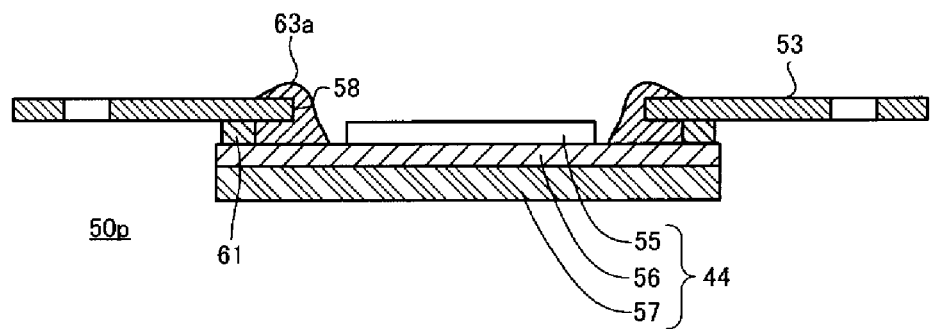
FIG. 52E Sectional view showing the fuel cell with separator 50p in the process of manufacture.

The sealing material 621 and the restraining material 631 are melted to form the sealing part 62a and the restraint 63a (see FIG. 52E). The fuel cell body 44 and the metal separator 53 which are joined by the joint part 61 and on which the sealing material 621 and the restraining material 631 are disposed are heated at a temperature of, for example, 850

□C. to 1,100 □C., whereby the sealing material 621 and the restraining material 631 are melted to form the sealing part 62a and the restraint 63a.

By the process mentioned above, the fuel cell with separator 50p (the fuel cell body 44 to which the metal separator 53 is joined) is manufactured.

Modification of Eighth Embodiment

Figure 53:
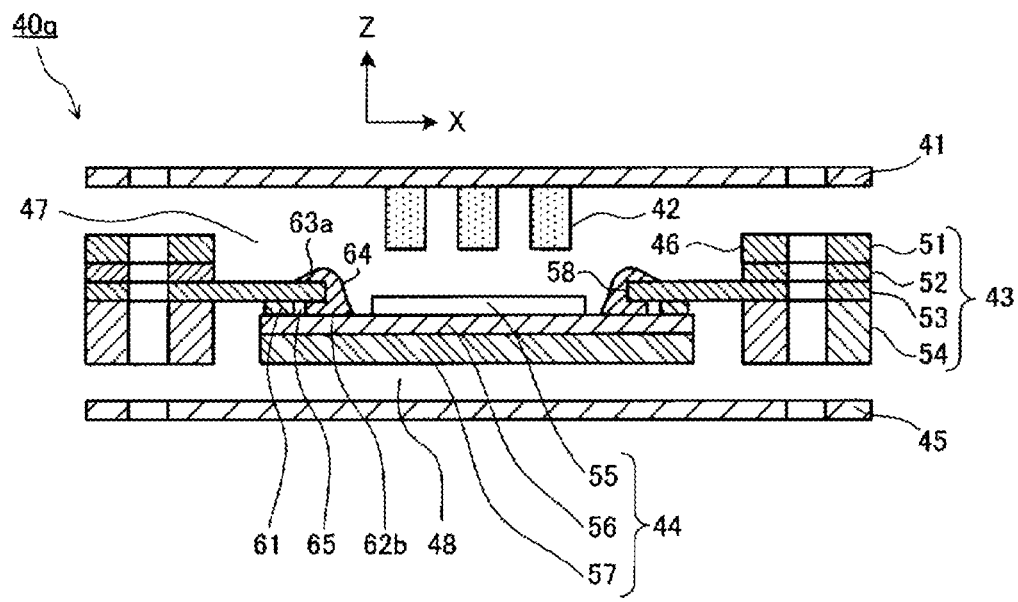
FIG. 53 Sectional view of a fuel cell 40q according to a modification of the eighth embodiment.
Figure 54:
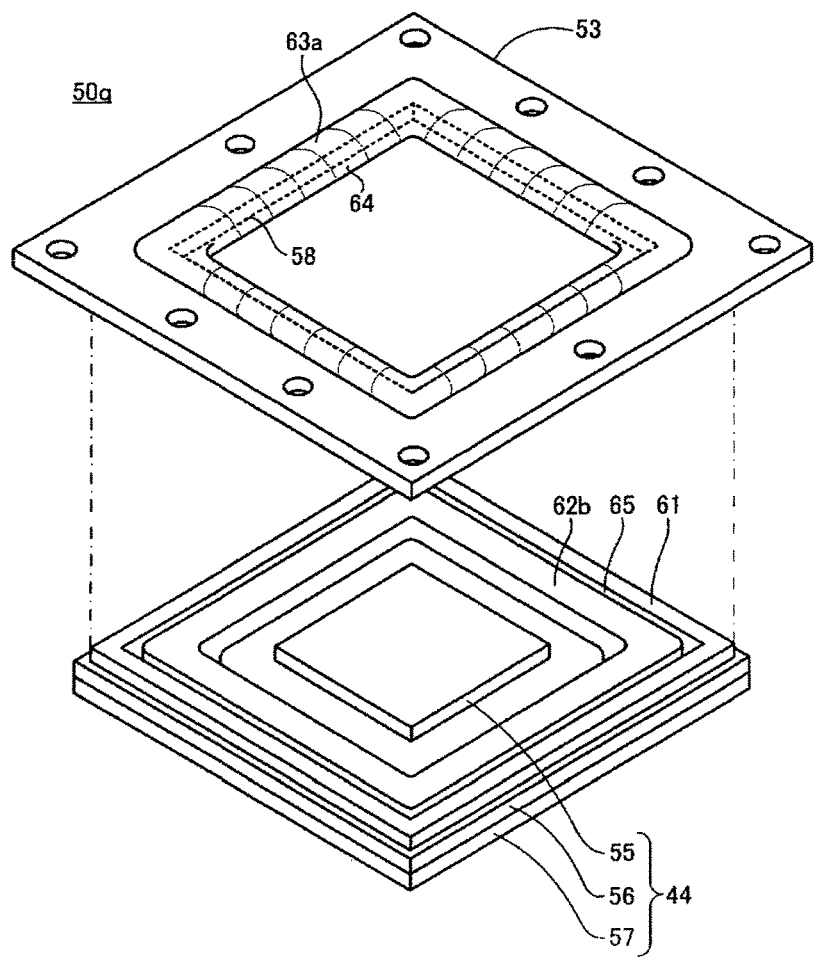
FIG. 54 Exploded perspective view showing, in an exploded condition, the fuel cell body 44 and the metal separator 53 (fuel cell with separator 50q).

A modification of the eighth embodiment will next be described. FIG. 53 is a sectional view of a fuel cell 40q according to the modification of the eighth embodiment. FIG. 54 is an exploded perspective view showing, in an exploded condition, the fuel cell body 44 and the metal separator 53 (fuel cell with separator 50q) according to the modification of the eighth embodiment.

The fuel cell 40q has a gap (space) between the joint part 61 and the sealing part 62b. In this manner, even though the joint part 61 and the sealing part 62b are not in contact with each other, the deformation of the metal separator 53 can be restrained.

In the fuel cells 40p and 40q, the joint part 61 and the seals 62a and 62b are in contact with each other or have a gap therebetween, along the entire perimeter of the opening 58. In its conceivable intermediate mode, the joint part 61 and the seal 62a are in contact with each other along a portion of the perimeter of the opening 58 and the joint part 61 and the seal 62b are not in contact with each other along another portion of the perimeter of the opening 58.

Also, as in the case of the fuel cell 40n, the gap (space) may be provided between the joint part 61 and the sealing part 62 without the connection part 64 being provided.
(Durability Test of Solid Oxide Fuel Cell Stack 10)

The durability test of the solid oxide fuel cell stack 10 will next be described. Herein, the solid oxide fuel cell stacks 10 corresponding to the second embodiment are manufactured and tested.
<Samples>

The prepared samples (solid oxide fuel cell stacks 10) are described below. The following samples which differ in the boundary length L are manufactured. The boundary length L is a direct distance between the interface of the sealing material 621 with the oxidizer gas atmosphere and the interface of the sealing material 621 with the fuel gas atmosphere.

Metal separator 53
Material of metal separator 53: ferritic SUS (SUH21)
Joint part 61
Material of joint part 61: Ag brazing filler metal
Thickness of joint part 61: 10 μm to 80 μm
Width of joint part 61: 4 mm
Method of forming joint part 61: A paste which contains brazing filler metal is printed and melted in the atmosphere.
Sealing part 62, restraint 63, connection part 64
Material of sealing part 62, restraint 63, and connection part 64: glass having a thermal expansion coefficient of 10 ppm/K
<Test Method>

Hydrogen and the air were used as fuel gas and oxidizer gas, respectively, and the samples of the solid oxide fuel cell stacks 10 were operated for 500 hours while the metal separators 53 were held at 750° C.

The tested samples are measured for porosity of the joint parts 61. The samples are disassembled, and the cross sections of the joint parts 61 are observed for measuring porosity. Specifically, the images of the cross sections were captured by the optical microscope, and the area ratio between pores (black portions) and sound portions (white portions) was calculated to obtain porosity. A porosity of 0% indicates that no pores exist.

Figure 55:
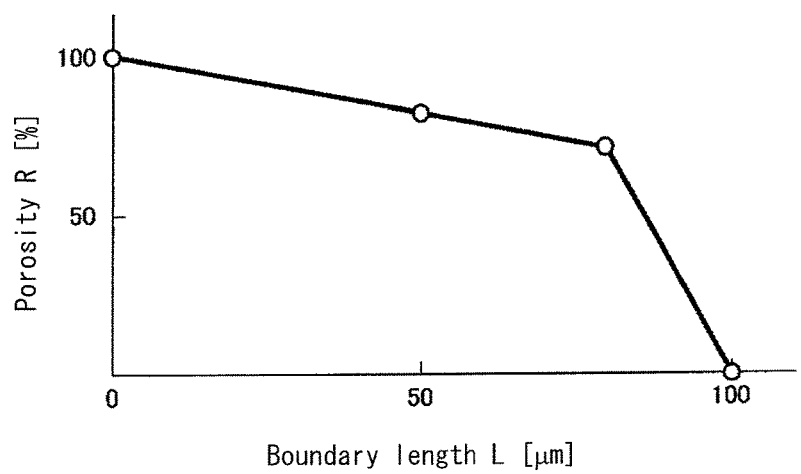
FIG. 55 Graph showing the results of the durability test on the solid oxide fuel cell stacks 10.

FIG. 55 shows the relation between the boundary length (width) L and porosity R. The test results reveal that the employment of a boundary length (width) L of 100 μm or more significantly reduces the porosity R. This indicates that connecting the sealing part 62 and the restraint 63 (forming the connection part 64) is effective for improving the reliability of sealing provided by the sealing part 62 and preventing the generation of pores in the joint part 61.

A certain amount of difference in thermal expansion coefficient is acceptable. Sealing materials having a thermal expansion coefficient of about 8 ppm/K to 12 ppm/K within a temperature range of room temperature to 300° C. are usable.

Other Embodiments

The present invention is not limited to the above embodiments, but may be embodied in expanded or modified forms, and such expanded or modified embodiments are encompassed by the technical scope of the present invention.

In the above embodiments, for application to the anode-support-type fuel cells, the metal separator 53 is joined to the upper surface of the solid electrolyte layer 56 (on the cathode 55 side). By contrast, in the case of, for example, the solid electrolyte support type and the cathode support type, the metal separator 53 may be joined to the lower surface of the solid electrolyte layer 56 (on the anode 57 side). In this case, the anode 57 is formed smaller than the solid electrolyte layer 56 and is disposed within the opening 58 to be not exposed to oxidizer gas.

DESCRIPTION OF REFERENCE NUMERALS

10: solid oxide fuel cell stack; 11, 12: end plate; 21, 22: bolt; 31, 32: through hole; 35: nut; 40: fuel cell; 41, 45: interconnector; 42: current collector; 43: frame; 44: fuel cell body; 46: opening; 47: oxidizer gas channel; 48: fuel gas channel; 50: fuel cell with separator; 51: cathode frame; 52: insulation frame; 53: metal separator; 54: anode frame; 55: cathode; 56: solid electrolyte layer; 57: anode; 58: opening; 61, 61a, 61b: joint part; 611, 612: brazing filler metal; and 62: sealing part.

The invention claimed is:
1. A fuel cell with separator comprising
a fuel cell body having a cathode, an anode, and a solid electrolyte layer disposed between the cathode and the anode;
a plate-like metal separator having first and second main surfaces and an opening which opens at the first and second main surfaces;
a joint formed of an Ag-containing brazing filler metal and adapted to join the fuel cell body and the first main surface of the metal separator; and
a seal formed of a glass-containing sealing material and disposed closer to the opening than is the joint, the seal being located between the first main surface and the fuel cell body and extending along the entire perimeter of the opening and having a sealing part,
wherein the sealing part is in contact with the first main surface of the metal separator,
and wherein the seal is disposed closer to the opening than all joints so as to hinder the flow of oxidizer gas to the metal of all joints.

2. A fuel cell with separator according to claim 1, wherein
the joint has a first joint portion and a second joint portion located closer to the opening than is the first joint portion, and
the second joint portion is lower in oxygen diffusion coefficient than the first joint portion.

3. A fuel cell with separator according to claim 1, wherein the metal separator contains Al in an amount of 0.1% by mass to 10% by mass.

4. A fuel cell with separator according to claim 1, wherein the metal separator has a thickness of 0.5 mm or less.

5. A fuel cell with separator according to claim 1, wherein a gap exists between the joint and the seal.

6. A fuel cell with separator according to claim 1, wherein the brazing filler metal is higher in melting temperature than the sealing material.

7. A fuel cell with separator according to claim 1, wherein a portion of the seal located toward the joint has an Ag-containing mixed layer.

8. A fuel cell with separator according to claim 7, wherein in the mixed layer, Ag content is highest at a portion located toward the joint.

9. A fuel cell with separator according to claim 7, wherein the joint and the mixed layer are disposed along the entire perimeter of the opening.

10. A fuel cell with separator according to claim 7, wherein the seal has a thermal expansion coefficient of 8 ppm/K to 12 ppm/K within a temperature range of room temperature to 300° C., and the mixed layer has a width of 50 μm or more.

11. A fuel cell with separator according to claim 7, wherein the joint contains an oxide whose oxygen dissociation pressure is lower than $1 \times 10^{-13}$ Pa at 800° C.

12. A fuel cell with separator according to claim 11, wherein the oxide contained in the joint is of Al or In.

13. A fuel cell with separator according to claim 1, wherein
the metal separator contains Al in an amount of 1.5% by mass to 10% by mass;
the joint contains an oxide or compound oxide of Al in an amount of 1% by volume to 25% by volume; and
the seal contains Al in an amount of 1% by mass to 30% by mass as reduced to $Al_2O_3$.

14. A fuel cell with separator according to claim 13, wherein
the metal separator contains Al in an amount of 2% by mass to 10% by mass;
the joint contains an oxide or compound oxide of Al in an amount of 2% by volume to 15% by volume; and
the seal contains Al in an amount of 2% by mass to 20% by mass as reduced to $Al_2O_3$.

15. A fuel cell with separator according to claim 13, wherein at least a portion of the oxide or compound oxide of Al is disposed at the interface between the metal separator and the joint.

16. A fuel cell with separator according to claim 13, wherein the oxide or compound oxide of Al is $Al_2O_3$, an Al-containing spinel-type oxide, or mullite.

17. A fuel cell with separator according to claim 13, further comprising a restraint formed of the same material as the sealing material and disposed on the second main surface of the metal separator at a position opposite the seal.

18. A fuel cell with separator according to claim 17, wherein the seal and the restraint are integrated through a connection disposed on a side surface of the opening of the metal separator.

19. A fuel cell with separator according to claim 1, further comprising a restraint formed of the same material as the sealing material or a material higher in thermal expansion coefficient than the sealing material and disposed on the second main surface of the metal separator at a position opposite the seal.

20. A fuel cell with separator according to claim 19, wherein the restraint is disposed along the entire perimeter of the opening.

21. A fuel cell with separator according to claim 19, wherein the seal and the restraint are integrated through a connection disposed on a side surface of the opening of the metal separator.

22. A fuel cell with separator according to claim 19, wherein a material of the restraint is lower in thermal expansion coefficient than the metal separator.

23. A fuel cell with separator according to claim 19, wherein a gap exists between the seal and the joint.

24. A fuel cell with separator according to claim 19, wherein the sealing material has a thermal expansion coefficient of 8 ppm/K to 12 ppm/K within a temperature range of room temperature to 300° C.

25. A fuel cell stack comprising a fuel cell with separator according to claim 1.

26. A method for manufacturing a fuel cell with separator, the fuel cell with separator comprising
a fuel cell body having a cathode, an anode, and a solid electrolyte layer disposed between the cathode and the anode;
a plate-like metal separator having first and second main surfaces and an opening which opens at the first and second main surfaces;
a joint formed of an Ag-containing brazing filler metal and adapted to join the fuel cell body and the first main surface of the metal separator; and
a seal formed of a glass-containing sealing material and disposed closer to the opening than is the joint, the seal being located between the first main surface and the fuel cell body and extending along the entire perimeter of the opening and having a sealing part,
wherein the sealing part is in contact with the first main surface of the metal separator,
and wherein the seal is disposed closer to the opening than all joints so as to hinder the flow of oxidizer gas to the metal of all joints;
the method comprising:
disposing an Ag-containing brazing filler metal on both of the metal separator and the fuel cell body, and
disposing the glass-containing sealing material on at least one of the metal separator on which the brazing filler metal is disposed, and the fuel cell body on which the brazing filler metal is disposed.

27. A method for manufacturing a fuel cell with separator according to claim 26, further comprising
joining the metal separator and the fuel cell body by melting the brazing filler metal disposed on both of the metal separator and the fuel cell body.

28. A method for manufacturing a fuel cell with separator according to claim 27, wherein
in the joining, the brazing filler metal is melted in the atmosphere.

29. A method for manufacturing a fuel cell with separator according to claim 28, further comprising
forming the seal by melting the glass-containing sealing material disposed on at least one of the metal separator and the fuel cell body.

30. A method for manufacturing a fuel cell with separator according to claim 29, wherein the joining and the forming are performed simultaneously.

31. A method for manufacturing a fuel cell with separator according to claim 29, wherein after the joining, the disposing and the forming are performed.

* * * * *